US012063542B2

(12) United States Patent
Jiang et al.

(10) Patent No.: US 12,063,542 B2
(45) Date of Patent: Aug. 13, 2024

(54) DATA PROCESSING METHOD AND RELATED APPARATUS

(71) Applicant: HUAWEI TECHNOLOGIES CO., LTD., Guangdong (CN)

(72) Inventors: Xiaobin Jiang, Shanghai (CN); Xiaoqiong Long, Shanghai (CN); Ligang Ren, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 17/831,537

(22) Filed: Jun. 3, 2022

(65) Prior Publication Data

US 2022/0312254 A1 Sep. 29, 2022

Related U.S. Application Data

(63) Continuation of application No. PCT/CN2020/126953, filed on Nov. 6, 2020.

(30) Foreign Application Priority Data

Dec. 4, 2019 (CN) .......................... 201911228886.4

(51) Int. Cl.
*H04W 28/00* (2009.01)
*H04L 5/14* (2006.01)
*H04W 28/02* (2009.01)

(52) U.S. Cl.
CPC ....... *H04W 28/0236* (2013.01); *H04L 5/1469* (2013.01)

(58) Field of Classification Search
None
See application file for complete search history.

(56) References Cited

U.S. PATENT DOCUMENTS

2010/0284274 A1\* 11/2010 Ghanadan ........... H04L 47/2441
370/230.1
2012/0276896 A1 11/2012 Ren et al.
(Continued)

FOREIGN PATENT DOCUMENTS

CN 101917767 A 12/2010
CN 102223210 A 10/2011
(Continued)

OTHER PUBLICATIONS

1 Office Action in Chinese Appln. No. 201911228886.4, dated Nov. 2, 2022, 6 pages (with English translation).
(Continued)

*Primary Examiner* — Brandon M Renner
(74) *Attorney, Agent, or Firm* — Fish & Richardson P.C.

(57) ABSTRACT

One example data processing method includes obtaining an industry identifier and a service identifier, determining, based on a first preset mapping table, a target packet delay value corresponding to the industry identifier and the service identifier, obtaining a translation parameter including at least one of a scheduling feature identifier, a quantity of retransmissions, and a modulation and coding scheme (MCS) number, and calculating a base station packet delay value based on a preset terminal processing delay, a preset base station processing delay, a first time division duplex air interface waiting delay, a preset time division duplex air interface transmission delay, and the translation parameter. When the base station packet delay value is greater than the target packet delay value, the translation parameter is adjusted, and execution of the previous step is triggered.

20 Claims, 15 Drawing Sheets

(56) References Cited

U.S. PATENT DOCUMENTS

| | | | |
|---|---|---|---|
| 2018/0279315 A1 | 9/2018 | Salem et al. | |
| 2019/0116606 A1 | 4/2019 | Chen et al. | |
| 2020/0077124 A1* | 3/2020 | Shi | H04N 21/6587 |
| 2020/0145876 A1* | 5/2020 | Dao | H04L 12/1407 |

FOREIGN PATENT DOCUMENTS

| | | |
|---|---|---|
| CN | 109151853 A | 1/2019 |
| CN | 110048799 A | 7/2019 |
| WO | 2011032274 A1 | 3/2011 |

OTHER PUBLICATIONS

3GPP TR 28.801 V15.1.0 (Jan. 2018), "3rd Generation Partnership Project; Technical Specification Group Services and System Aspects; Telecommunication management; Study on management and orchestration of network slicing for next generation network (Release 15)," Jan. 2018, 75 pages.

3GPP TS 22.261 V17.0.1 (Oct. 2019), "3rd Generation Partnership Project; Technical Specification Group Services and System Aspects; Service requirements for the 5G system; Stage 1 (Release 17)," Sep. 2019, 82 pages.

3GPP TS 38.104 V16.1.0 (Sep. 2019), "3rd Generation Partnership Project; Technical Specification Group Radio Access Network; NR; Base Station (BS) radio transmission and reception (Release 16)," Sep. 2019, 229 pages.

3GPP TS 38.214 V15.7.0 (Sep. 2019), "3rd Generation Partnership Project; Technical Specification Group Radio Access Network; NR; Physical layer procedures for data (Release 15)," Sep. 2019, 106 pages.

Office Action issued in Chinese Application No. 201911228886.4 on May 19, 2022, 14 pages (with English translation).

PCT International Search Report and Written Opinion issued in International Application No. PCT/CN2020/126953 on Jan. 27, 2021, 21 pages (with English translation).

* cited by examiner

DATA PROCESSING METHOD AND RELATED APPARATUS

CROSS-REFERENCE TO RELATED APPLICATIONS

This application is a continuation of International Application No. PCT/CN2020/126953, filed on Nov. 6, 2020, which claims priority to Chinese Patent Application No. 201911228886.4, filed on Dec. 4, 2019. The disclosures of the aforementioned applications are hereby incorporated by reference in their entireties.

TECHNICAL FIELD

This application relates to the communications field, and in particular, to a data processing method and a related apparatus.

BACKGROUND

With development of network technologies, various services have increasingly high requirements for communication service quality.

In the communication field, using a quality of service (quality of service, QoS) mechanism to ensure communication quality of service is a common means. A priority is set in the QoS mechanism, and resource allocation and service guarantee are performed based on the priority, to provide quality of service that matches a requirement of a user terminal as much as possible. When resources are insufficient, access of a user terminal with a low priority is rejected. Alternatively, a user terminal with a high priority preempts a resource occupied by a user terminal with a low priority, to avoid overload of a base station.

In actual application, the QoS mechanism provides best-effort quality of service. When radio resources are insufficient, the base station may reduce bandwidth of some terminals, and consequently, quality of service of the terminals deteriorates. It can be learned that the QoS mechanism cannot sufficiently guarantee the quality of service.

SUMMARY

In view of this, this application provides a data processing method and a related apparatus, so that a base station packet delay value can be calculated based on a translation parameter, and the translation parameter can be adjusted based on a result of comparison between the base station packet delay value and a target packet delay value, to obtain a base station packet delay less than the target packet delay through calculation based on the adjusted translation parameter. In this way, when scheduling service data based on the adjusted translation parameter, the base station can meet a packet delay requirement specified in a service level agreement.

According to a first aspect, a data processing method is provided. In the method, interface information is obtained, where the interface information includes an industry identifier and a service identifier; a target packet delay value corresponding to the industry identifier and the service identifier is determined based on a first preset mapping table; a translation parameter is obtained, where the translation parameter includes at least one of a scheduling feature identifier, a quantity of retransmissions, and a modulation and coding scheme MCS number; a base station packet delay value is calculated based on a preset terminal processing delay, a preset base station processing delay, a first time division duplex air interface waiting delay, a preset time division duplex air interface transmission delay, and the translation parameter; and when the base station packet delay value is greater than the target packet delay value, the translation parameter is adjusted, the adjusted translation parameter is used as the translation parameter, and execution of the step of calculating a base station packet delay value based on a preset terminal processing delay, a preset base station processing delay, a first time division duplex air interface waiting delay, a preset time division duplex air interface transmission delay, and the translation parameter is triggered; or when the base station packet delay value is less than or equal to the target packet delay value, a translation parameter corresponding to the base station packet delay value is used as a target translation parameter, the target translation parameter is sent to a base station, and the base station schedules service data based on the target translation parameter. The service data corresponds to the industry identifier and the service identifier. The target packet delay value is a packet delay value specified in a service level agreement.

In this implementation, a base station packet delay value in a time division duplex scenario can be calculated based on the translation parameter, and the translation parameter can be adjusted based on a result of comparison between the base station packet delay value and the target packet delay value, to obtain a base station packet delay less than the target packet delay through calculation based on the adjusted translation parameter. In this way, when scheduling service data based on the adjusted translation parameter, the base station can meet a packet delay requirement specified in the service level agreement, to provide better quality of service.

In a possible implementation, the interface information further includes a quantity of concurrent service links, a service data packet size, and a service data packet interval; before the base station packet delay value is calculated based on the preset terminal processing delay, the preset base station processing delay, the first time division duplex air interface waiting delay, the preset time division duplex air interface transmission delay, and the translation parameter, a base station configuration parameter is obtained, where the base station configuration parameter includes first cell channel bandwidth, a cell subcarrier spacing, and a quantity of space division layers; and the calculating a base station packet delay value based on a preset terminal processing delay, a preset base station processing delay, a first time division duplex air interface waiting delay, a preset time division duplex air interface transmission delay, and the translation parameter may include: dividing a product of the service data packet size and a time division duplex frame period by the service data packet interval, to obtain an amount of to-be-scheduled data in each time division duplex frame period; when the translation parameter includes the MCS number, the scheduling feature identifier, and the quantity of retransmissions, determining a first transport block set value based on the first cell channel bandwidth, the cell subcarrier spacing, the quantity of concurrent service links, the MCS number, and the quantity of space division layers; determining a first weighted value based on a result of comparison between the amount of to-be-scheduled data and the first transport block set value; determining a second weighted value based on the scheduling feature identifier; and determining the base station packet delay based on the preset terminal processing delay, the preset base station processing delay, the first time division duplex air interface waiting delay, the preset time division duplex air interface transmission delay, the first weighted value, the second weighted value, and the quantity of retransmissions, where the preset terminal processing delay $t_{ue}$, the preset base station processing delay $t_{bs}$, the first time division duplex air interface waiting delay $t_{tddwait}$, the preset time division duplex air interface transmission delay $t_{tddtran}$, the first weighted value $q_1$, the second weighted value $q_2$, the quantity $N_r$ of retransmissions, and the base station packet delay T meet the following formula: $T=(t_{ue}+t_{bs}+t_{tddwait}+t_{tddtran}*q_1)*N_r*q_2$. In this way, a specific method for calculating the base station packet delay is provided. In actual application, one or more of the MCS number, the quantity of retransmissions, and the scheduling feature identifier may be selected and adjusted based on an actual situation.

In another possible implementation, the determining a first transport block set value based on the first cell channel bandwidth, the cell subcarrier spacing, the quantity of concurrent service links, the MCS number, and the quantity of space division layers includes: determining, based on a second preset mapping table, spectrum efficiency corresponding to the MCS number; determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers. In this way, a specific method for calculating the first transport block set value is provided.

In another possible implementation, the determining a first weighted value based on a result of comparison between the amount of to-be-scheduled data and the first transport block set value includes: when the amount of to-be-scheduled data is greater than the first transport block set value and the amount of to-be-scheduled data can be exactly divided by the first transport block set value, determining that the first weighted value is a quotient obtained after the amount of to-be-scheduled data is divided by the first transport block set value; when the amount of to-be-scheduled data is greater than the first transport block set value and the amount of to-be-scheduled data cannot be exactly divided by the first transport block set value, determining that the first weighted value is 1 plus a quotient obtained after the amount of to-be-scheduled data is divided by the first transport block set value; or when the amount of to-be-scheduled data is less than or equal to the first transport block set value, determining that the first weighted value is 1. In this way, a specific method for calculating the first weighted value is provided, to obtain a base station packet delay in a non-fragment scenario or a base station packet delay in a fragment scenario.

In another possible implementation, the determining a second weighted value based on the scheduling feature identifier includes: when the scheduling feature identifier is a normal scheduling feature identifier, determining that the second weighted value is 3; or when the scheduling feature identifier is a pre-scheduling feature identifier, determining that the second weighted value is 1. In this way, a specific method for calculating the second weighted value is provided, to obtain a base station packet delay in a normal scheduling scenario or a base station packet delay in a pre-scheduling scenario.

In another possible implementation, the adjusting the translation parameter includes: adding 1 to the MCS number; and/or subtracting 1 from the quantity of retransmissions; and/or when the scheduling feature identifier is a normal scheduling feature identifier, adjusting the normal scheduling feature identifier to a pre-scheduling feature identifier. In this way, a plurality of methods for adjusting the translation parameter are provided. Specifically, one or more of the foregoing methods may be selected to reduce the base station packet delay value, so that the base station packet delay can meet stipulation in the service level agreement.

In another possible implementation, before the translation parameter is adjusted, a target reliability value corresponding to the industry identifier and the service identifier is determined based on a fourth preset mapping table; a base station reliability value is determined based on the target reliability value, a preset core network reliability value, and a preset terminal reliability value; and a quantity of retransmissions threshold is determined based on the base station reliability value and a preset single-transmission reliability value.

The adjusting the translation parameter includes: when the quantity of retransmissions in the translation parameter is greater than the quantity of retransmissions threshold, adding 1 to the MCS number, and/or subtracting 1 from the quantity of retransmissions, and/or when the scheduling feature identifier is a normal scheduling feature identifier, adjusting the normal scheduling feature identifier to a pre-scheduling feature identifier; or when the quantity of retransmissions in the translation parameter is less than or equal to the quantity of retransmissions threshold, adjusting the quantity of retransmissions to be greater than the quantity of retransmissions threshold, and adding 1 to the MCS number, and/or when the scheduling feature identifier is a normal scheduling feature identifier, adjusting the normal scheduling feature identifier to a pre-scheduling feature identifier.

The target reliability value $k_0$, the preset core network reliability value $k_1$, the base station reliability value $k_2$, and the preset terminal reliability value $k_3$ meet a first formula:

$$k_0 \leq k_1 * k_2 * k_3.$$

The base station reliability value $k_2$, the preset single-transmission reliability value k', and the quantity of retransmissions threshold $N_r'$ meet a second formula:

$$k_2 \leq 1 - \prod_{i=1}^{N_r'}(1 - k').$$

When the quantity of retransmissions is greater than the quantity of retransmissions threshold, it can be ensured that the base station reliability value complies with stipulation in the service level agreement, and then the MCS number or the scheduling feature identifier is adjusted, so that both the base station packet value and the base station reliability value can meet the stipulation in the service level agreement.

In another possible implementation, the interface information further includes the quantity of concurrent service links. After the translation parameter is obtained, a target rate corresponding to the industry identifier and the service identifier is obtained based on a fifth mapping table; base station configuration information is obtained, where the base station configuration information includes the first cell channel bandwidth, the cell subcarrier spacing, and the quantity of space division layers; a base station rate is determined based on the first cell channel bandwidth, the cell subcarrier spacing, the quantity of concurrent service links, the MCS number, and the quantity of space division layers; and when the base station rate is greater than or equal to the target rate, execution of the step of calculating a base station packet delay value based on a preset terminal processing delay, a preset base station processing delay, a first time division duplex air interface waiting delay, a preset time division duplex air interface transmission delay, and the translation parameter is triggered; or when the base station rate is less than the target rate, 1 is added to the MCS number, a sum of the MCS number and 1 is used as the MCS number, and execution of the step of determining a base station rate based on the first cell channel bandwidth, the cell subcarrier spacing, the quantity of concurrent service links, the MCS number, and the quantity of space division layers is triggered. In this implementation, the MCS number is adjusted, so that the base station rate is greater than or equal to the target rate. After the adjustment, the translation parameter is adjusted in the manner in the foregoing embodiment (for example, the MCS number is increased, the quantity of retransmissions is reduced, or the normal scheduling feature identifier is adjusted to the pre-scheduling feature identifier), so that the base station packet delay value is less than or equal to the target packet delay value. In this way, both the base station packet delay value and the base station rate can meet stipulation in the service level agreement.

In another possible implementation, the determining a base station rate based on the first cell channel bandwidth, the cell subcarrier spacing, the quantity of concurrent service links, the MCS number, and the quantity of space division layers includes: determining a scheduling period based on the cell subcarrier spacing; determining spectrum efficiency corresponding to the MCS number; determining a quantity of available resource blocks corresponding to the first cell channel bandwidth and the cell subcarrier spacing; determining the first transport block set value based on the spectrum efficiency, the quantity of available resource blocks, the quantity of concurrent service links, and the quantity of space division layers; and dividing a product of the first transport block set value and a preset reliability value by the scheduling period to obtain the base station rate. In this way, a specific method for calculating the base station rate is provided.

In another possible implementation, after the target translation parameter is sent to the base station, an average packet delay value sent by the base station is received; the first cell channel bandwidth is adjusted to second cell channel bandwidth when the average packet delay value is greater than the target packet delay, where the second cell channel bandwidth is higher than the first cell channel bandwidth; a second transport block set value is determined based on the second cell channel bandwidth, the cell subcarrier spacing, the quantity of concurrent service links, the MCS number, and the quantity of space division layers; a third weighted value is determined based on a result of comparison between the amount of to-be-scheduled data and the second transport block set value; the base station packet delay is determined based on the preset terminal processing delay, the preset base station processing delay, the first time division duplex air interface waiting delay, the preset time division duplex air interface transmission delay, the third weighted value, the second weighted value, and the quantity of retransmissions; and when the base station packet delay value is less than or equal to the target packet delay value, the second cell channel bandwidth is sent to the base station.

The base station packet delay T determined based on the preset terminal processing delay $t_{ue}$, the preset base station processing delay $t_{bs}$, the first time division duplex air interface waiting delay $t_{tddwait}$, the preset time division duplex air interface transmission delay $t_{tddtran}$, the third weighted value $q_3$, the second weighted value $q_2$, and the quantity $N_r$ of retransmissions meets the following formula:

$$T=(t_{ue}+t_{bs}+t_{tddwait}+t_{tddtran}*q_3)*N_r*q_2.$$

The third weighted value is greater than the first weighted value. In this implementation, the MCS number can be increased based on an actual packet delay value, so that the base station packet delay value is further reduced, so that the actual packet delay value can comply with stipulation in the service level agreement.

In another possible implementation, the base station configuration parameter further includes a first subframe ratio. After the target translation parameter is sent to the base station, an average packet delay value sent by the base station is received; the first subframe ratio is adjusted to a second subframe ratio when the average packet delay value is greater than the target packet delay, where the second subframe ratio includes more uplink subframes than the first subframe ratio; a second time division duplex air interface waiting delay is determined based on the second subframe ratio; the base station packet delay is determined based on the preset terminal processing delay, the preset base station processing delay, the second time division duplex air interface waiting delay, the preset time division duplex air interface transmission delay, the first weighted value, the second weighted value, and the quantity of retransmissions; and when the base station packet delay value is less than or equal to the target packet delay value, the second subframe ratio is sent to the base station.

The base station packet delay value T determined based on the preset terminal processing delay $t_{ue}$, the preset base station processing delay $t_{bs}$, the second time division duplex air interface waiting delay $t_{tddwait}'$, the preset time division duplex air interface transmission delay $t_{tddtran}$, the first weighted value $q_1$, and the second weighted value $q_2$, the quantity $N_r$ of retransmissions meets the following formula:

$$T=(t_{ue}+t_{bs}+t_{tddwait}'+t_{tddtran}*q_1)*N_r*q_2.$$

The second time division duplex air interface waiting delay is less than the first time division duplex air interface waiting delay. A subframe ratio is adjusted, so that a base station packet delay value in an uplink scheduling process or a downlink scheduling process can be reduced, to further reduce the base station packet delay. In this way, an actual packet delay value complies with stipulation in the service level agreement.

According to a second aspect, a data processing method is provided. In the method, interface information is obtained, where the interface information includes an industry identifier and a service identifier; a target packet delay value corresponding to the industry identifier and the service identifier is determined based on a first preset mapping table; a translation parameter is obtained, where the translation parameter includes at least one of a scheduling feature identifier, a quantity of retransmissions, and a modulation and coding scheme MCS number; a base station packet delay value is calculated based on a preset terminal processing delay, a preset base station processing delay, a frequency division duplex air interface waiting delay, a preset frequency division duplex air interface transmission delay, and the translation parameter; and when the base station packet delay value is greater than the target packet delay value, the translation parameter is adjusted, the adjusted translation parameter is used as the translation parameter, and execution of the step of calculating a base station packet delay value based on a preset terminal processing delay, a preset base station processing delay, a preset frequency division duplex air interface waiting delay, a preset frequency division duplex air interface transmission delay, and the translation parameter is triggered; or when the base station packet delay value is less than or equal to the target packet delay value, a translation parameter corresponding to the base station packet delay value is used as a target translation parameter, and the target translation parameter is sent to a base station, so that the base station schedules service data based on the target translation parameter, where the service data corresponds to the industry identifier and the service identifier.

In this implementation, a base station packet delay value in a frequency division duplex scenario can be calculated based on the translation parameter, and the translation parameter can be adjusted based on a result of comparison between the base station packet delay value and the target packet delay value, to obtain a base station packet delay less than the target packet delay through calculation based on the adjusted translation parameter. In this way, when scheduling service data based on the adjusted translation parameter, the base station can meet a packet delay requirement specified in a service level agreement, to provide better quality of service.

The interface information further includes a quantity of concurrent service links and a service data packet size; and the calculating a base station packet delay value based on a preset terminal processing delay, a preset base station processing delay, a frequency division duplex air interface waiting delay, a preset frequency division duplex air interface transmission delay, and the translation parameter includes:

when the translation parameter includes the MCS number, the scheduling feature identifier, and the quantity of retransmissions, determining a first transport block set value based on first cell channel bandwidth, a cell subcarrier spacing, the quantity of concurrent service links, the MCS number, and a quantity of space division layers;

determining a first weighted value based on a result of comparison between the service data packet size and the first transport block set value;

determining a second weighted value based on the scheduling feature identifier; and determining the base station packet delay value based on the preset terminal processing delay, the preset base station processing delay, the frequency division duplex air interface waiting delay, the preset frequency division duplex air interface transmission delay, the first weighted value, the second weighted value, and the quantity of retransmissions, where the preset terminal processing delay $t_{ue}$, the preset base station processing delay $t_{bs}$, the frequency division duplex air interface waiting delay $t_{tddwait}$, the preset frequency division duplex air interface transmission delay tddtran, the first weighted value $q_1$, the second weighted value $q_2$, the quantity $N_r$ of retransmissions, and the base station packet delay value T meet the following formula:

$$T=(t_{ue}+t_{bs}+t_{tddwait}+t_{tddtran}*q_1)*N_r*q_2.$$

Optionally, the determining a first transport block set value based on first cell channel bandwidth, a cell subcarrier spacing, the quantity of concurrent service links, the MCS number, and a quantity of space division layers includes: determining, based on a second preset mapping table, spectrum efficiency corresponding to the MCS number; determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers.

Optionally, the determining a first weighted value based on a result of comparison between the service data packet size and the first transport block set value includes: when the service data packet size is greater than the first transport block set value and the service data packet size can be exactly divided by the first transport block set value, determining that the first weighted value is equal to a quotient obtained after the service data packet size is divided by the first transport block set value; when the service data packet size is greater than the first transport block set value and the service data packet size cannot be exactly divided by the first transport block set value, determining that the first weighted value is equal to 1 plus a quotient obtained after the service data packet size is divided by the first transport block set value; or when the service data packet size is less than or equal to the first transport block set value, determining that the first weighted value is 1.

Optionally, the determining a second weighted value based on the scheduling feature identifier includes: when the scheduling feature identifier is a normal scheduling feature identifier, determining that the second weighted value is 3; or when the scheduling feature identifier is a pre-scheduling feature identifier, determining that the second weighted value is 1.

In another possible implementation, the adjusting the translation parameter includes: adding 1 to the MCS number; and/or subtracting 1 from the quantity of retransmissions; and/or when the scheduling feature identifier is a normal scheduling feature identifier, adjusting the normal scheduling feature identifier to a pre-scheduling feature identifier.

According to a third aspect, a data processing method is provided. In the method, interface information is obtained, where the interface information includes an industry identifier and a service identifier; a target packet reliability value corresponding to the industry identifier and the service identifier is determined based on a preset mapping table; a base station reliability value is determined based on the target packet reliability value, a preset packet reliability value, a preset core network reliability value, and a preset terminal reliability value; a quantity of retransmissions is determined based on the base station reliability value and a preset single-transmission reliability value; and the quantity of retransmissions is sent to a base station, so that a quantity of times that the base station retransmits service data is greater than or equal to the quantity of retransmissions. The service data corresponds to the industry identifier and the service identifier. The target packet reliability value is a reliability value specified in a service level agreement.

In this implementation, the quantity of retransmissions can be determined based on the packet reliability value specified in the service level agreement, the core network reliability value, the preset terminal reliability value, and the preset single-transmission reliability value. After the base station performs configuration based on the quantity of retransmissions, when the quantity of times that the base station retransmits the service data is greater than or equal to the quantity of retransmissions, a packet reliability requirement of this service can be met, so that better quality of service can be provided.

In a possible implementation, the target reliability value $k_0$, the preset core network reliability value $k_1$, the base station reliability value $k_2$, and the preset terminal reliability value $k_3$ meet a first formula: $k_0 \leq k_1*k_2*k_3$; and the base station reliability value $k_2$, the preset single-transmission reliability value $k'$, and the quantity $N_r$ of retransmissions meet a second formula:

$$k_2 \leq 1 - \prod_{i=1}^{N_r}(1-k').$$

In this way, a specific method for determining the quantity of retransmissions is provided.

According to a fourth aspect, a data processing method is provided in this application. In the data processing method, interface information is obtained, where the interface information includes an industry identifier, a service identifier, and a quantity of concurrent service links; a target rate corresponding to the industry identifier and the service identifier is determined based on a preset mapping table; a base station configuration parameter is obtained, where the base station configuration parameter includes cell channel bandwidth, a cell subcarrier spacing, and a quantity of space division layers; a modulation and coding scheme MCS number is obtained; a base station rate is determined based on the cell channel bandwidth, the cell subcarrier spacing, the quantity of concurrent service links, the MCS number, and the quantity of space division layers; and when the base station rate is less than the target rate, 1 is added to the MCS number, the MCS number plus 1 is used as the MCS number, and execution of the step of determining a base station rate based on the cell channel bandwidth, the cell subcarrier spacing, the quantity of concurrent service links, the MCS number, and the quantity of space division layers is triggered; or when the base station rate is greater than or equal to the target rate, an MCS number corresponding to the base station rate is used as a target MCS number, and the target MCS number is sent to a base station, so that the base station performs configuration by using the target MCS number. The target rate is a base station transmission rate specified in a service level agreement.

In this implementation, the MCS number can be determined based on a rate specified in the service level agreement. After performing configuration based on the MCS number, when the base station schedules service data based on the MCS number, a rate requirement of this service can be met, so that better quality of service can be provided.

In a possible implementation, the determining a base station rate based on the cell channel bandwidth, the cell subcarrier spacing, the quantity of concurrent service links, the MCS number, and the quantity of space division layers includes: determining a scheduling period based on the cell subcarrier spacing; determining spectrum efficiency corresponding to the MCS number; determining a quantity of available resource blocks corresponding to the cell channel bandwidth and the cell subcarrier spacing; determining a transport block set value based on the spectrum efficiency, the quantity of available resource blocks, the quantity of concurrent service links, and the quantity of space division layers; and dividing a product of the transport block set value and a preset single-transmission reliability value by the scheduling period to obtain the base station rate. In this way, a feasible method for calculating the base station rate is provided.

According to a fifth aspect, a data processing method is provided. In the data processing method, interface information is obtained, where the interface information includes an industry identifier and a service identifier; a target availability value corresponding to the industry identifier and the service identifier is determined based on a preset mapping table; a base station availability value is determined based on the target availability value and a preset quantity of base stations; base station device configuration information is determined based on the base station availability value, preset availability of a main control panel, preset availability of a baseband unit, and preset availability of a radio frequency unit, where the base station device configuration information includes a quantity of main control panels, a quantity of baseband units, and a quantity of radio frequency units; and the base station device configuration information is output. In this way, a method for obtaining the base station device configuration information is provided, and when a base station is deployed based on the base station device configuration information, an availability requirement specified in a service level agreement can be met.

In a possible implementation, the target availability value $A_0$, the preset quantity $N_{bs}$ of base stations, and the base station availability value $A$ meet a first formula:

$$A_0 = 1 - \prod_{j=1}^{N_{bs}}(1-A);$$

and the base station availability value $A$, the preset availability value $A_c$ of the main control panel, the preset availability value $A_b$ of the baseband unit, and the preset availability value $A_r$ of the radio frequency unit meet a second formula:

$$A = \left[1 - \prod_{i_1=1}^{n_c}(1-A_c)\right] * \left[1 - \prod_{i_2=1}^{n_b}(1-A_b)\right] * \left[1 - \prod_{i_3=1}^{n_r}(1-A_r)\right],$$

where $n_c$ is the quantity of main control panels, $n_b$ is the quantity of baseband units, and $n_r$ is the quantity of radio frequency units.

According to a sixth aspect, a data processing method is provided. In the data processing method, a target packet delay value sent by a data processing apparatus is received; a translation parameter is obtained, where the translation parameter includes at least one of a scheduling feature identifier, a quantity of retransmissions, and an MCS number; a base station packet delay is calculated based on a preset terminal processing delay, a preset base station processing delay, a first time division duplex air interface waiting delay, a preset time division duplex air interface transmission delay, and the translation parameter; and when the base station packet delay value is greater than the target packet delay value, the translation parameter is adjusted, the adjusted translation parameter is used as the translation parameter, and execution of the step of calculating a base station packet delay based on a preset terminal processing delay, a preset base station processing delay, a first time division duplex air interface waiting delay, a preset time division duplex air interface transmission delay, and the translation parameter is triggered; or when the base station packet delay value is less than or equal to the target packet delay value, service data is scheduled based on a translation parameter corresponding to the base station packet delay value, where the service data corresponds to an industry identifier and a service identifier.

In this implementation, a base station packet delay value in a time division duplex scenario can be calculated based on the translation parameter, and the translation parameter can be adjusted based on a result of comparison between the base station packet delay value and the target packet delay value, to obtain a base station packet delay less than the target packet delay through calculation based on the adjusted translation parameter. In this way, when scheduling service data based on the adjusted translation parameter, the base station can meet a packet delay requirement specified in a service level agreement, to provide better quality of service.

In a possible implementation, before the base station packet delay value is calculated based on the preset terminal processing delay, the preset base station processing delay, the first time division duplex air interface waiting delay, the preset time division duplex air interface transmission delay, and the translation parameter, a quantity of concurrent service links, a service data packet size, and a service data packet interval that are sent by the data processing apparatus are received; and a base station configuration parameter is obtained, where the base station configuration parameter includes first cell channel bandwidth, a cell subcarrier spacing, and a quantity of space division layers; and the calculating a base station packet delay value based on a preset terminal processing delay, a preset base station processing delay, a first time division duplex air interface waiting delay, a preset time division duplex air interface transmission delay, and the translation parameter includes: dividing a product of the service data packet size and a time division duplex frame period by the service data packet interval, to obtain an amount of to-be-scheduled data in each time division duplex frame period; when the translation parameter includes the MCS number, the scheduling feature identifier, and the quantity of retransmissions, determining a first transport block set value based on the first cell channel bandwidth, the cell subcarrier spacing, the quantity of concurrent service links, the MCS number, and the quantity of space division layers; determining a first weighted value based on a result of comparison between the amount of to-be-scheduled data and the first transport block set value; determining a second weighted value based on the scheduling feature identifier; and determining the base station packet delay based on the preset terminal processing delay, the preset base station processing delay, the first time division duplex air interface waiting delay, the preset time division duplex air interface transmission delay, the first weighted value, the second weighted value, and the quantity of retransmissions. In this way, a specific method for calculating a base station packet delay in a time division duplex scenario is provided. In actual application, one or more of the MCS number, the quantity of retransmissions, and the scheduling feature identifier may be selected and adjusted based on an actual situation.

The base station packet delay value T determined based on the preset terminal processing delay $t_{ue}$, the preset base station processing delay $t_{bs}$, the first time division duplex air interface waiting delay $t_{tddwait}$, the preset time division duplex air interface transmission delay $t_{tddtran}$, the first weighted value $q_1$, the second weighted value $q_2$, and the quantity $N_r$ of retransmissions meets the following formula:

$$T=(t_{ue}+t_{bs}+t_{tddwait}+t_{tddtran}*q_1)*N_r*q_2.$$

In another possible implementation, the determining a first transport block set value based on the first cell channel bandwidth, the cell subcarrier spacing, the quantity of concurrent service links, the MCS number, and the quantity of space division layers includes: determining, based on a second preset mapping table, spectrum efficiency corresponding to the MCS number; determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers. In this way, a specific method for calculating the first transport block set value is provided.

In another possible implementation, the determining a first weighted value based on a result of comparison between the amount of to-be-scheduled data and the first transport block set value includes: when the amount of to-be-scheduled data is greater than the first transport block set value and the amount of to-be-scheduled data can be exactly divided by the first transport block set value, determining that the first weighted value is a quotient obtained after the amount of to-be-scheduled data is divided by the first transport block set value; when the amount of to-be-scheduled data is greater than the first transport block set value and the amount of to-be-scheduled data cannot be exactly divided by the first transport block set value, determining that the first weighted value is 1 plus a quotient obtained after the amount of to-be-scheduled data is divided by the first transport block set value; or when the amount of to-be-scheduled data is less than or equal to the first transport block set value, determining that the first weighted value is 1. In this way, a specific method for calculating the first weighted value is provided, to obtain a base station packet delay in a non-fragment scenario or a base station packet delay in a fragment scenario.

In another possible implementation, the determining a second weighted value based on the scheduling feature identifier includes: when the scheduling feature identifier is a normal scheduling feature identifier, determining that the second weighted value is 3; or when the scheduling feature identifier is a pre-scheduling feature identifier, determining that the second weighted value is 1. In this way, a specific method for calculating the second weighted value is provided, to obtain a base station packet delay in a normal scheduling scenario or a base station packet delay in a pre-scheduling scenario.

In another possible implementation, the adjusting the translation parameter includes: adding 1 to the MCS number; and/or subtracting 1 from the quantity of retransmissions; and/or when the scheduling feature identifier is a normal scheduling feature identifier, adjusting the normal scheduling feature identifier to a pre-scheduling feature identifier. In this way, a plurality of methods for adjusting the translation parameter are provided. Specifically, one or more of the foregoing methods may be selected to reduce the base station packet delay value, so that the base station packet delay can meet stipulation in the service level agreement.

In another possible implementation, before the translation parameter is adjusted, a target reliability value sent by the data processing apparatus is received; a base station reliability value is determined based on the target reliability value, a preset core network reliability value, and a preset terminal reliability value; and a quantity of retransmissions threshold is determined based on the base station reliability value and a preset single-transmission reliability value. The adjusting the translation parameter includes: when the quantity of retransmissions in the translation parameter is greater than the quantity of retransmissions threshold, adding 1 to the MCS number, and/or subtracting 1 from the quantity of retransmissions, and/or when the scheduling feature identifier is a normal scheduling feature identifier, adjusting the normal scheduling feature identifier to a pre-scheduling feature identifier; or when the quantity of retransmissions in the translation parameter is less than or equal to the quantity of retransmissions threshold, adjusting the quantity of retransmissions to be greater than the quantity of retransmissions threshold, and adding 1 to the MCS number, and/or when the scheduling feature identifier is a normal scheduling feature identifier, adjusting the normal scheduling feature identifier to a pre-scheduling feature identifier.

The target reliability value $k_0$, the preset core network reliability value $k_1$, the base station reliability value $k_2$, and the preset terminal reliability value $k_3$ meet a first formula: $k_0 \le k_1 * k_2 * k_3$. The base station reliability value $k_2$, the preset single-transmission reliability value k', and the quantity of retransmissions threshold $N_r'$ meet a second formula:

$$k_2 \le 1 - \prod_{i=1}^{N_r'} (1-k').$$

When the quantity of retransmissions is greater than or equal to the quantity of retransmissions threshold, it can be ensured that the base station reliability value complies with stipulation in the service level agreement, and then the MCS number or the scheduling feature identifier is adjusted, so that both the base station packet value and the base station reliability value can meet the stipulation in the service level agreement.

In another possible implementation, the quantity of concurrent service links and a target rate that are sent by the data processing apparatus are received; base station configuration information is obtained, where the base station configuration information includes the first cell channel bandwidth, the cell subcarrier spacing, and the quantity of space division layers; a base station rate is determined based on the first cell channel bandwidth, the cell subcarrier spacing, the quantity of concurrent service links, the MCS number, and the quantity of space division layers; and when the base station rate is greater than or equal to the target rate, execution of the step of calculating a base station packet delay value based on a preset terminal processing delay, a preset base station processing delay, a first time division duplex air interface waiting delay, a preset time division duplex air interface transmission delay, and the translation parameter is triggered; or when the base station rate is less than the target rate, 1 is added to the MCS number, a sum of the MCS number and 1 is used as the MCS number, and execution of the step of determining a base station rate based on the first cell channel bandwidth, the cell subcarrier spacing, the quantity of concurrent service links, the MCS number, and the quantity of space division layers is triggered. In this implementation, the MCS number is adjusted, so that the base station rate is greater than or equal to the target rate. After the adjustment, the translation parameter is adjusted in the manner in the foregoing embodiment (for example, the MCS number is increased, the quantity of retransmissions is reduced, or the normal scheduling feature identifier is adjusted to the pre-scheduling feature identifier), so that the base station packet delay value is less than or equal to the target packet delay value. In this way, both the base station packet delay value and the base station rate can meet stipulation in the service level agreement.

In another possible implementation, the determining a base station rate based on the first cell channel bandwidth, the cell subcarrier spacing, the quantity of concurrent service links, the MCS number, and the quantity of space division layers includes: determining a scheduling period based on the cell subcarrier spacing; determining spectrum efficiency corresponding to the MCS number; determining a quantity of available resource blocks corresponding to the first cell channel bandwidth and the cell subcarrier spacing; determining the first transport block set value based on the spectrum efficiency, the quantity of available resource blocks, the quantity of concurrent service links, and the quantity of space division layers; and dividing a product of the first transport block set value and a preset reliability value by the scheduling period to obtain the base station rate. In this way, a specific method for calculating the base station rate is provided.

According to a seventh aspect, a data processing method is provided. In the data processing method, after a data processing apparatus determines a target packet delay value is determined based on an industry identifier and a service identifier, the target packet delay value sent by the data processing apparatus is received; a translation parameter is obtained, where the translation parameter includes at least one of a scheduling feature identifier, a quantity of retransmissions, and a modulation and coding scheme MCS number; a base station packet delay value is calculated based on a preset terminal processing delay, a preset base station processing delay, a frequency division duplex air interface waiting delay, a preset frequency division duplex air interface transmission delay, and the translation parameter; and when the base station packet delay value is greater than the target packet delay value, the translation parameter is adjusted, the adjusted translation parameter is used as the translation parameter, and execution of the step of calculating a base station packet delay value based on a preset terminal processing delay, a preset base station processing delay, a preset frequency division duplex air interface waiting delay, a preset frequency division duplex air interface transmission delay, and the translation parameter is triggered; or when the base station packet delay value is less than or equal to the target packet delay value, service data is scheduled based on a translation parameter corresponding to the base station packet delay value, where the service data corresponds to the industry identifier and the service identifier.

In a possible implementation, when the interface information further includes a quantity of concurrent service links and a service data packet size, the calculating a base station packet delay value based on a preset terminal processing delay, a preset base station processing delay, a frequency division duplex air interface waiting delay, a preset frequency division duplex air interface transmission delay, and the translation parameter includes: when the translation parameter includes the MCS number, the scheduling feature identifier, and the quantity of retransmissions, determining a first transport block set value based on first cell channel bandwidth, a cell subcarrier spacing, the quantity of concurrent service links, the MCS number, and a quantity of space division layers; determining a first weighted value based on a result of comparison between the service data packet size and the first transport block set value; determining a second weighted value based on the scheduling feature identifier; and determining the base station packet delay value based on the preset terminal processing delay, the preset base station processing delay, the frequency division duplex air interface waiting delay, the preset frequency division duplex air interface transmission delay, the first weighted value, the second weighted value, and the quantity of retransmissions, where the preset terminal processing delay $t_{ue}$, the preset base station processing delay $t_{bs}$, the frequency division duplex air interface waiting delay $t_{tddwait}$, the preset frequency division duplex air interface transmission delay $t_{tddtran}$, the first weighted value $q_1$, the second weighted value $q_2$, the quantity $N_r$ of retransmissions, and the base station packet delay value T meet the following formula: $T=(t_{ue}+t_{bs}+t_{tddwait}+t_{tddtran}*q_1)*N_r*q_2$.

Optionally, the determining a first transport block set value based on first cell channel bandwidth, a cell subcarrier spacing, the quantity of concurrent service links, the MCS number, and a quantity of space division layers includes: determining, based on a second preset mapping table, spectrum efficiency corresponding to the MCS number; determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers.

Optionally, the determining a first weighted value based on a result of comparison between the service data packet size and the first transport block set value includes: when the service data packet size is greater than the first transport block set value and the service data packet size can be exactly divided by the first transport block set value, determining that the first weighted value is a quotient obtained after the service data packet size is divided by the first transport block set value; when the service data packet size is greater than the first transport block set value and the service data packet size cannot be exactly divided by the first transport block set value, determining that the first weighted value is 1 plus a quotient obtained after the service data packet size is divided by the first transport block set value; or when the service data packet size is less than or equal to the first transport block set value, determining that the first weighted value is 1.

Optionally, the determining a second weighted value based on the scheduling feature identifier includes: when the scheduling feature identifier is a normal scheduling feature identifier, determining that the second weighted value is 3; or when the scheduling feature identifier is a pre-scheduling feature identifier, determining that the second weighted value is 1.

In another possible implementation, the adjusting the translation parameter includes: adding 1 to the MCS number; and/or subtracting 1 from the quantity of retransmissions; and/or when the scheduling feature identifier is a normal scheduling feature identifier, adjusting the normal scheduling feature identifier to a pre-scheduling feature identifier.

According to an eighth aspect, a data processing method is provided. In the data processing method, interface information is obtained, where the interface information includes an industry identifier and a service identifier; a target packet reliability value corresponding to the industry identifier and the service identifier is determined based on a preset mapping table; a base station reliability value is determined based on the target packet reliability value, a preset core network packet reliability value, and a preset terminal reliability value; a quantity of retransmissions is determined based on the base station reliability value and a preset single-transmission reliability value; and service data is scheduled based on the quantity of retransmissions, so that a quantity of times that the service data is retransmitted is greater than or equal to the quantity of retransmissions, where the service data corresponds to the industry identifier and the service identifier. In this implementation, the base station reliability value is determined based on a packet reliability value specified in a service level agreement, the preset core network reliability value, and the preset terminal reliability value, and the quantity of retransmissions is determined based on the base station reliability value and the preset single-transmission reliability value. After the base station performs configuration based on the quantity of retransmissions, when a quantity of times that the base station retransmits the service data is greater than or equal to the quantity of retransmissions, a packet reliability requirement of this service can be met, so that better quality of service can be provided.

In another possible implementation, the target reliability value $k_0$, the preset core network reliability value $k_1$, the base station reliability value $k_2$, and the preset terminal reliability value $k_3$ meet a first formula: $k_0 \le k_1 * k_2 * k_3$; and the base station reliability value $k_2$, the preset single-transmission reliability value $k'$, and the quantity $N_r$ of retransmissions meet a second formula:

$$k_2 \le 1 - \prod_{i=1}^{N_r}(1-k').$$

According to a ninth aspect, a data processing method is provided. In the data processing method, a target rate sent by a data processing apparatus is received, where the target rate is determined by the data processing apparatus based on an industry identifier and a service identifier; a base station configuration parameter is obtained, where the base station configuration parameter includes cell channel bandwidth, a cell subcarrier spacing, and a quantity of space division layers; an MCS number is obtained; a base station rate is determined based on the cell channel bandwidth, the cell subcarrier spacing, a quantity of concurrent service links, the MCS number, and the quantity of space division layers; and when the base station rate is less than the target rate, 1 is added to the MCS number, the MCS number plus 1 is used as the MCS number, and execution of the step of determining a base station rate based on the cell channel bandwidth, the cell subcarrier spacing, the quantity of concurrent service links, the MCS number, and the quantity of space division layers is triggered; or when the base station rate is greater than or equal to the target rate, an MCS number corresponding to the base station rate is used as a target MCS number, and configuration is performed based on the target MCS number. In this implementation, the MCS number can be determined based on a rate specified in the service level agreement. After performing configuration based on the MCS number, when the base station schedules service data based on the MCS number, a rate requirement of this service can be met, so that better quality of service can be provided.

In another possible implementation, the determining a base station rate based on the cell channel bandwidth, the cell subcarrier spacing, a quantity of concurrent service links, the MCS number, and the quantity of space division layers includes: determining a scheduling period based on the cell subcarrier spacing; determining spectrum efficiency corresponding to the MCS number; determining a quantity of available resource blocks corresponding to the cell channel bandwidth and the cell subcarrier spacing; determining a transport block set value based on the spectrum efficiency, the quantity of available resource blocks, the quantity of concurrent service links, and the quantity of space division layers; and dividing a product of the transport block set value and a preset reliability value by the scheduling period to obtain the base station rate.

According to a tenth aspect, a data processing apparatus is provided, and the data processing apparatus has a function of implementing the data processing method according to any implementation of the first aspect. The function may be implemented by hardware, or may be implemented by hardware executing corresponding software. The hardware or software includes one or more modules corresponding to the foregoing functions.

According to an eleventh aspect, a data processing apparatus is provided, and the data processing apparatus has a function of implementing the data processing method according to any implementation of the second aspect. The function may be implemented by hardware, or may be implemented by hardware executing corresponding software. The hardware or software includes one or more modules corresponding to the foregoing functions.

According to a twelfth aspect, a data processing apparatus is provided, and the data processing apparatus has a function of implementing the data processing method according to any implementation of the third aspect. The function may be implemented by hardware, or may be implemented by hardware executing corresponding software. The hardware or software includes one or more modules corresponding to the foregoing functions.

According to a thirteenth aspect, a data processing apparatus is provided, and the data processing apparatus has a function of implementing the data processing method according to any implementation of the fourth aspect. The function may be implemented by hardware, or may be implemented by hardware executing corresponding software. The hardware or software includes one or more modules corresponding to the foregoing functions.

According to a fourteenth aspect, a data processing apparatus is provided, and the data processing apparatus has a function of implementing the data processing method according to any implementation of the fifth aspect. The function may be implemented by hardware, or may be implemented by hardware executing corresponding software. The hardware or software includes one or more modules corresponding to the foregoing functions.

According to a fifteenth aspect, a base station is provided, and the base station has a function of implementing the data processing method in any implementation of the sixth aspect. The function may be implemented by hardware, or may be implemented by hardware executing corresponding software. The hardware or software includes one or more modules corresponding to the foregoing functions.

According to a sixteenth aspect, a base station is provided, and the base station has a function of implementing the data processing method in any implementation of the seventh aspect. The function may be implemented by hardware, or may be implemented by hardware executing corresponding software. The hardware or software includes one or more modules corresponding to the foregoing functions.

According to a seventeenth aspect, a base station is provided, and the base station has a function of implementing the data processing method in any implementation of the eighth aspect. The function may be implemented by hardware, or may be implemented by hardware executing corresponding software. The hardware or software includes one or more modules corresponding to the foregoing functions.

According to an eighteenth aspect, a base station is provided, and the base station has a function of implementing the data processing method in any implementation of the ninth aspect. The function may be implemented by hardware, or may be implemented by hardware executing corresponding software. The hardware or software includes one or more modules corresponding to the foregoing functions.

According to a nineteenth aspect, a computer storage medium is provided. A computer readable storage medium stores instructions. When the instructions are run on a computer, the computer performs the data processing methods in the foregoing aspects.

According to a twentieth aspect, a computer program product including instructions is provided. When the instructions are run on a computer, the computer is enabled to perform the data processing methods in the foregoing aspects.

DESCRIPTION OF EMBODIMENTS

A data processing method in this application may be applied to the following communication system. The communication system may be an industry communication system or an enhanced mobile broadband (enhanced mobile broadband, eMBB) service system. The industry communication system may be but is not limited to an electric power communication system or an industrial communication system.

Figure 1:
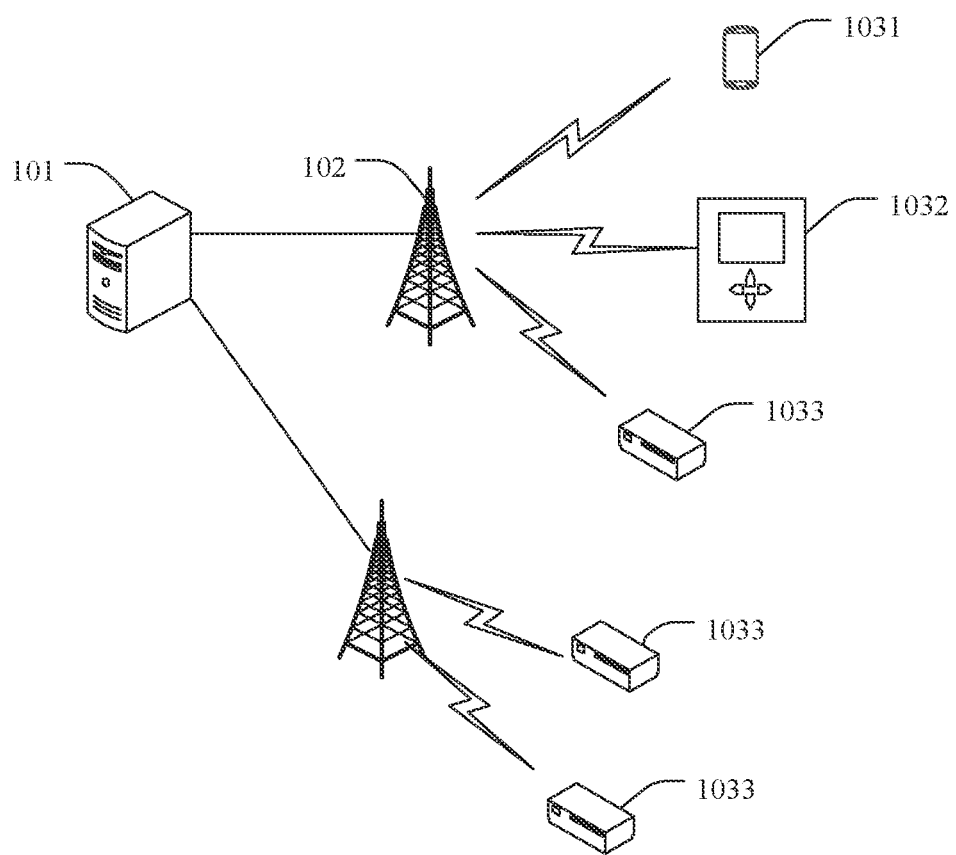
FIG. 1 is a schematic diagram of an application scenario according to this application.

Referring to FIG. 1, a communication system provided in this application includes a data processing apparatus 101, a base station 102, and a terminal.

The data processing apparatus 101 is a component part of an operation support system (operation support systems. OSS). The data processing apparatus may be a distributed server, or may be an independent server.

The base station 102 is a network side device configured to enable a terminal to access a wireless network. The network device may be a base station, a micro base station, a mobile base station, a transmission reception point (transmission reception point, TRP), or the like.

The terminal may be an electronic device with a wireless communication function. The terminal may be but is not limited to a cellular phone 1031, an electric power industry terminal 1032, an industrial terminal 1033, a vehicle-mounted phone, a wearable device, or the like. The terminal is also referred to as a terminal device, a mobile device, a user terminal, a wireless communication device, or user equipment.

The base station 102 may simultaneously access one terminal or a plurality of terminals. In other words, the base station 102 may simultaneously execute one type of service or a plurality of types of services. For each type of service, the base station 102 may simultaneously execute one or more services.

In an existing QoS mechanism, resources are allocated based on priorities, to ensure communication quality of service of a service. A service provided based on a priority is a coarse-grained communication service. The QoS mechanism cannot adequately guarantee a requirement of the service for a quality of service parameter (such as a packet delay, packet reliability, a rate, or RAN availability).

In actual application, communication quality of service of different services has different levels of requirements. A relationship between a service and communication quality of service may be shown in the following table:

| Industry identifier | Service identifier | Packet delay | Packet reliability | Rate | RAN availability |
|---|---|---|---|---|---|
| Power | Differential protection | 15 ms | 99.999% | 2.4 Mbps | 99.999% |
| Power | Millisecond-level precise load control | 50 ms | 99.99% | 1 Mbps | 99.999% |
| Industrial | Motion control | 0.5 ms | 99.999% | 0.1 Mbps | 99.999% |

To meet a requirement of a service for communication quality of service, an operator and a client may reach an agreement based on a service level agreement (service level agreement, SLA). The protocol specifies content an industry type, a service type, and a communication quality of service indicator that are provided by the operator for a communication user. The communication quality of service indicator includes but is not limited to a packet delay, packet reliability, a rate, and radio access network (radio access network, RAN) availability.

The packet reliability is accuracy of data packet transmission. A block error rate (block error rate, BLER) is a ratio of a quantity of blocks with errors to a total quantity of received blocks. Packet reliability value=1−BLER.

The RAN availability is used to indicate a degree at which a base station is in an operational state or an available state when a task is started at any moment. The RAN availability may also be referred to as cell availability or base station availability.

Currently, there is no method to implement the SLA. To resolve this problem, this application provides a data processing method. In the method, configuration information may be automatically determined based on a communication quality of service indicator specified in the SLA, and after performing configuration based on the configuration information, a base station can meet stipulation in the SLA in a service scheduling process.

Figure 2:
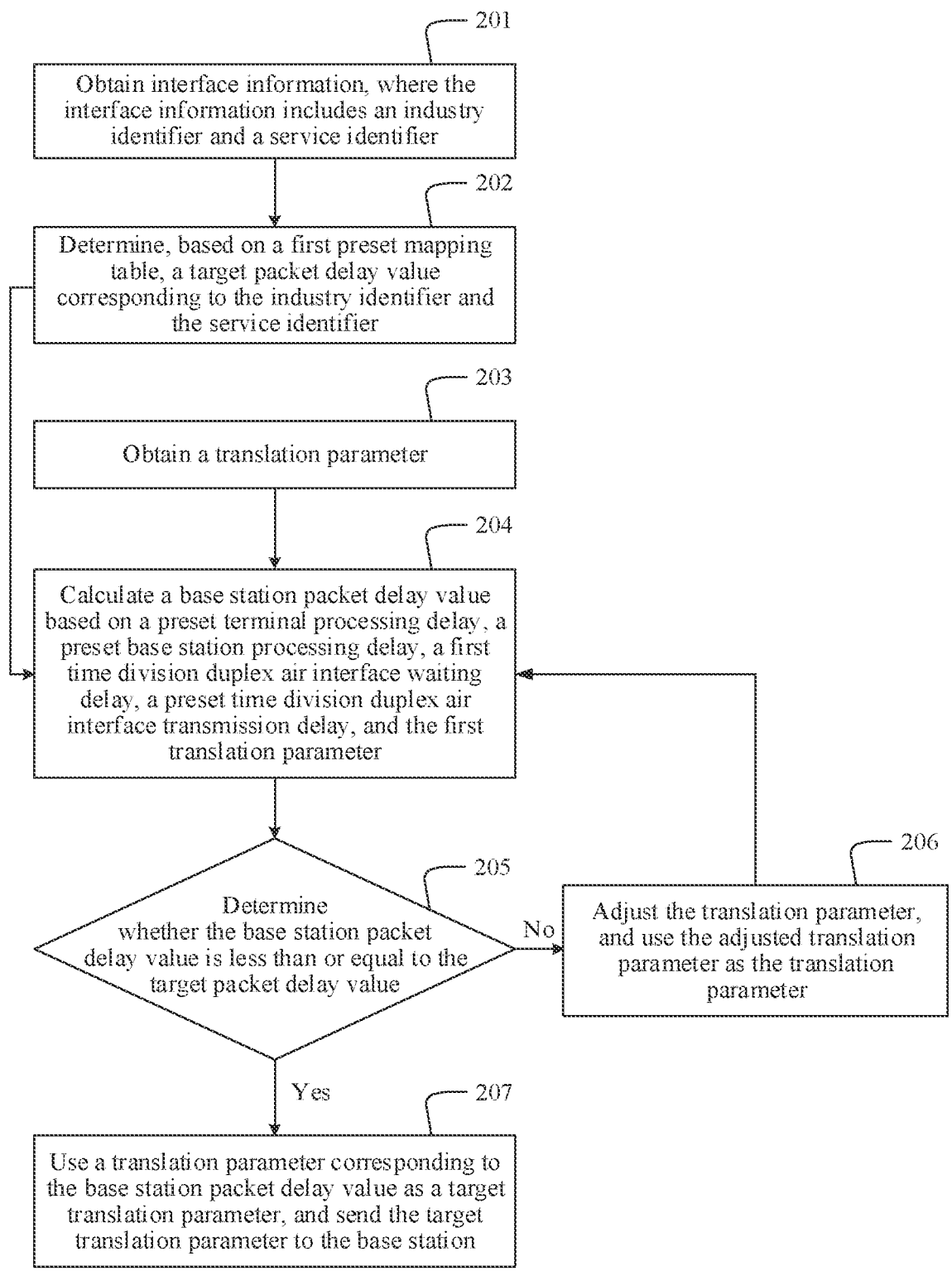
FIG. 2 is a schematic flowchart of a data processing method according to this application.

Referring to FIG. 2, an embodiment of a data processing method in this application includes the following steps.

Step 201: Obtain interface information, where the interface information includes an industry identifier and a service identifier.

In this embodiment, the obtaining interface information may be specifically: receiving interface information sent by an industry management platform server; receiving interface information sent by a network management software server; or receiving interface information input in an OSS interface information interface.

Step 202: Determine, based on a first preset mapping table, a target packet delay value corresponding to the industry identifier and the service identifier.

The mapping table includes a correspondence between the industry identifier, the service identifier, and the target packet delay value. For example, for services with a same industry identifier and different service identifiers, target packet delay values may be different.

Optionally, the interface information further includes the target packet delay value. In this way, a data processing apparatus may directly obtain the target packet delay value, and does not need to perform step 202.

Step 203: Obtain a translation parameter.

The translation parameter includes at least one of a scheduling feature identifier, a quantity of retransmissions, and a modulation and coding scheme MCS number. In the translation parameter, initial values may be configured for the scheduling feature identifier, the quantity of retransmissions, and the MCS number. For example, an initial value of the scheduling feature identifier may be set to a normal scheduling feature identifier or a pre-scheduling feature identifier. A normal scheduling feature is also referred to as grant-based scheduling. An initial value of the quantity of retransmissions may be set based on an empirical value; for example, the initial value of the quantity of retransmissions is equal to 5. The quantity of retransmissions is a positive integer. An initial value of the MCS number may be set based on an empirical value, or may be determined based on a historical BLER and a historical signal to interference plus noise ratio (signal to interference plus noise ratio, SINR) of a base station. For example, the BLER and the SINR of the base station are obtained, and an MCS number corresponding to the BLER and the SINR is determined based on a preset mapping table.

Step 204: Calculate a base station packet delay value based on a preset terminal processing delay, a preset base station processing delay, a first time division duplex air interface waiting delay, a preset time division duplex air interface transmission delay, and the translation parameter.

The preset terminal processing delay, the preset base station processing delay, the first time division duplex air interface waiting delay, and the preset time division duplex air interface transmission delay may all be set based on experience. Both the preset terminal processing delay and the preset base station processing delay are related to a subcarrier spacing of the base station. The preset terminal processing delay and the preset base station processing delay may be but are not limited to eight slots. The preset time division duplex air interface transmission delay may be but is not limited to one slot.

Step 205: Determine whether the base station packet delay value is less than or equal to the target packet delay value, and if yes, perform step 207, or if no, perform step 206.

Step 206: When the base station packet delay value is greater than the target packet delay value, adjust the translation parameter, use the adjusted translation parameter as the translation parameter, and trigger execution of step 204.

Specifically, at least one of the scheduling feature identifier, the quantity of retransmissions, and the MCS number is adjusted, the translation parameter is used as the translation parameter, and execution of step 204 is triggered until the base station packet delay value is less than or equal to the target packet delay value.

Step 207: When the base station packet delay value is less than or equal to the target packet delay value, use a translation parameter corresponding to the base station packet delay value as a target translation parameter, and send the target translation parameter to the base station.

After receiving the target translation parameter, the base station schedules service data based on the target translation parameter. The service data corresponds to the industry identifier and the service identifier.

In this embodiment, the data processing apparatus can calculate the base station packet delay value based on the translation parameter, and adjust the translation parameter based on a result of comparison between the base station packet delay value and the target packet delay value, to obtain a base station packet delay less than the target packet delay through calculation based on the adjusted translation parameter. Then, the adjusted translation parameter is sent to the base station as the target translation parameter. After obtaining the target translation parameter, the base station performs configuration based on the target translation parameter. For each type of service, a packet delay of the base station when scheduling service data can meet stipulation in an SLA Compared with a QoS mechanism, the data processing method in this embodiment can provide better quality of service for a service.

A method for calculating the base station packet delay value is described below.

In an optional implementation, the interface information further includes a quantity of concurrent service links, a service data packet size, and a service data packet interval.

The data processing method further includes: obtaining a base station configuration parameter, where the base station configuration parameter includes first cell channel bandwidth, a cell subcarrier spacing, and a quantity of space division layers.

The calculating a base station packet delay value based on a preset terminal processing delay, a preset base station processing delay, a first time division duplex air interface waiting delay, a preset time division duplex air interface transmission delay, and the translation parameter includes: dividing a product of the service data packet size and a time division duplex frame period by the service data packet interval, to obtain an amount of to-be-scheduled data in each time division duplex frame period; when the translation parameter includes the MCS number, the scheduling feature identifier, and the quantity of retransmissions, determining a first transport block set value based on the first cell channel bandwidth, the cell subcarrier spacing, the quantity of concurrent service links, the MCS number, and the quantity of space division layers; determining a first weighted value based on a result of comparison between the amount of to-be-scheduled data and the first transport block set value; determining a second weighted value based on the scheduling feature identifier; and determining the base station packet delay value based on the preset terminal processing delay, the preset base station processing delay, the first time division duplex air interface waiting delay, the preset time division duplex air interface transmission delay, the first weighted value, the second weighted value, and the quantity of retransmissions, where the preset terminal processing delay, the preset base station processing delay, the first time division duplex air interface waiting delay, the preset time division duplex air interface transmission delay, the first weighted value, the second weighted value, the quantity of retransmissions, and the base station packet delay value meet the following formula:

$$T=(t_{ue}+t_{bs}+t_{tddwait}+t_{tddtran}*q_1)*N_r*q_2,\text{ where}$$

$t_{ue}$ is the preset terminal processing delay, $t_{bs}$ is the preset base station processing delay, $t_{tddwait}$ is the first time division duplex air interface waiting delay, $t_{tddtran}$ is the preset time division duplex air interface transmission delay, $q_1$ is the first weighted value, $N_r$ is the quantity of retransmissions, and $q_2$ is the second weighted value.

The determining a first transport block set value based on the first cell channel bandwidth, the cell subcarrier spacing, the quantity of concurrent service links, the MCS number, and the quantity of space division layers includes: determining spectrum efficiency corresponding to the MCS number; determining a quantity of available resource blocks corresponding to the first cell channel bandwidth and the cell subcarrier spacing; determining the first transport block set value based on the spectrum efficiency, the quantity of available resource blocks, the quantity of concurrent service links, and the quantity of space division layers.

The data processing apparatus may preset a second mapping table and a third mapping table based on an existing 3GPP protocol. The second mapping table includes a correspondence between an MCS number and spectrum efficiency. The third mapping table includes a correspondence between cell channel bandwidth, a cell subcarrier spacing, and a quantity of available resource blocks. In the third mapping table, a combination of one cell channel bandwidth and one cell subcarrier spacing corresponds to one quantity of available resource blocks. For example, if the cell channel bandwidth is 100 MHz and the cell subcarrier spacing is 30 kHz, a quantity of available resource blocks of the base station is 273. One type of service may occupy all or a part of available resource blocks of the base station.

The spectrum efficiency, the quantity of available resource blocks, the quantity of concurrent service links, the quantity of space division layers, and the first transport block set value meet the following formula:

$$\text{TBS}=N_{RE}*(N_{RB}/N_{link})*SE*N_{layer},\text{ where}$$

$N_{RE}$ is a quantity of resource elements REs included in one resource block RB, $N_{RB}$ is a quantity of available resource blocks of each type of service, and $N_{layer}$ is a preset quantity of space division layers.

Optionally, the determining a first weighted value based on a result of comparison between the amount of to-be-scheduled data and the first transport block set value includes:

when the amount of to-be-scheduled data is greater than the first transport block set value and the amount of to-be-scheduled data can be exactly divided by the first transport block set value, determining that the first weighted value is a quotient obtained after the amount of to-be-scheduled data is divided by the first transport block set value:

when the amount of to-be-scheduled data is greater than the first transport block set value and the amount of to-be-scheduled data cannot be exactly divided by the first transport block set value, determining that the first weighted value is 1 plus a quotient obtained after the amount of to-be-scheduled data is divided by the first transport block set value; or when the amount of to-be-scheduled data is less than or equal to the first transport block set value, determining that the first weighted value is 1.

Specifically, when the amount of to-be-scheduled data is less than or equal to the first transport block set value, it indicates that a transport block set size allocated by the base station to the service can meet a scheduling requirement, and no segmentation is required. When the amount of to-be-scheduled data is greater than the first transport block set value, the amount of to-be-scheduled data needs to be segmented, and the first weighted value is equal to a quantity of fragments. When $N_d$/TBS is an integer, the quantity of fragments is $N_d$/TBS, where $N_d$ is the amount of to-be-scheduled data, and TBS is the first transport block set value. When $N_d$/TBS is not an integer, a rounding operation needs to be performed on $N_d$/TBS, and then 1 plus a result of the rounding operation is used as the quantity of fragments.

Optionally, the determining a second weighted value based on the scheduling feature identifier includes: when the scheduling feature identifier is a normal scheduling feature identifier, determining that the second weighted value is 3; or when the scheduling feature identifier is a pre-scheduling feature identifier, determining that the second weighted value is 1.

It may be learned from the foregoing descriptions that the MCS number affects the first weighted value, and the scheduling feature identifier affects the second weighted value. In this way, the base station packet delay value may be changed by adjusting the MCS number, the quantity of retransmissions, and the scheduling feature identifier. A method for adjusting the translation parameter is described below.

Method 1: Add 1 to the MCS number.

After 1 is added to the MCS number, frequency efficiency is increased, and the first transport block set value is increased, so that a quantity of fragments may be reduced. When the quantity of fragments is reduced, the first weighted value is reduced, and the base station packet delay is reduced. When the quantity of fragments is not reduced, 1 is still added to the MCS number until the quantity of fragments is reduced.

A value range of the MCS number is [0, 28]. A case in which an increment of the MCS number is 1 is used as an example above. In actual application, the increment of the MCS number may be alternatively set to another integer in an interval [2, 14], for example, 2, 3, 4, or 5.

Method 2: Subtract 1 from the number of retransmissions.

After 1 is subtracted from the quantity of retransmissions, the base station packet delay is reduced. The initial value of the quantity of retransmissions is usually 5. A case in which a decrement of the quantity of retransmissions is 1 is used as an example above. In actual application, the decrement of the quantity of retransmissions may be alternatively set to another integer in an interval [2, 14], for example, 2, 3, or 4.

Method 3: When the scheduling feature identifier is a normal scheduling feature identifier, adjust the normal scheduling feature identifier to a pre-scheduling feature identifier.

When the scheduling feature identifier is a normal scheduling feature identifier, the second weighted value is 3. When the scheduling feature identifier is a pre-scheduling feature identifier, the second weighted value is 1. The normal scheduling feature identifier is adjusted to the pre-scheduling feature identifier. In this way, the second weighted value may be reduced from 3 to 1, and the adjusted base station packet delay is equal to ⅓ of the unadjusted base station packet delay.

Different services have different packet delay requirements. When a method cannot meet a packet delay requirement of a service, two or three of the foregoing methods may be successively performed, to further reduce the base station packet delay value. In a process of performing the foregoing methods, the method 1, the method 2, and the method 3 are not in a fixed sequence. This is not limited in this application.

In another optional embodiment, before the adjusting the translation parameter, the foregoing method further includes:

determining, based on a fourth preset mapping table, a target reliability value corresponding to the industry identifier and the service identifier;

determining a base station reliability value based on the target reliability value, a preset core network reliability value, and a preset terminal reliability value; and determining a quantity of retransmissions threshold based on the base station reliability value and a preset single-transmission reliability value.

The adjusting the translation parameter includes:

when the quantity of retransmissions in the translation parameter is greater than the quantity of retransmissions threshold, adding 1 to the MCS number; and/or subtracting 1 from the quantity of retransmissions; and/or when the scheduling feature identifier is a normal scheduling feature identifier, adjusting the normal scheduling feature identifier to a pre-scheduling feature identifier; or when the quantity of retransmissions in the translation parameter is less than or equal to the quantity of retransmissions threshold, adjusting the quantity of retransmissions to be greater than the quantity of retransmissions threshold, and then adding 1 to the MCS number; and/or when the scheduling feature identifier is a normal scheduling feature identifier, adjusting the normal scheduling feature identifier to a pre-scheduling feature identifier.

The target reliability value $k_0$, the preset core network reliability value $k_1$, the base station reliability value $k_2$, and the preset terminal reliability value $k_3$ meet a first formula:

$k_0 \leq k_1 * k_2 * k_3$; and the base station reliability value $k_2$, the preset single-transmission reliability value k', and the quantity of retransmissions threshold $N_r'$ meet a second formula:

$$k_2 \leq 1 - \prod_{i=1}^{N_r'}(1-k').$$

The preset single-transmission reliability value k' is a reliability value of single data packet transmission of the base station, and different services correspond to different k'. For example, k' corresponding to control signaling is 99%, and k' corresponding to a data service is 90%. A value of k' is not limited to the foregoing examples, and may be alternatively set to another value based on experience. This is not limited in this application.

For example, when $k_0$ is 99.999%, and k' is 99%, it may be determined that the quantity of retransmissions threshold is greater than or equal to 4. A larger quantity of retransmissions indicates a larger base station reliability value. A smaller quantity of retransmissions indicates a smaller base station reliability value. In other words, a packet delay requirement and a packet reliability requirement of the SLA can be simultaneously met only when the quantity of retransmissions is greater than or equal to the quantity of retransmissions threshold.

When the quantity of retransmissions in the target translation parameter is less than the quantity of retransmissions threshold, only the packet delay requirement of the SLA can be met, and the packet reliability requirement of the SLA cannot be met. In this case, the data processing apparatus may adjust the quantity of retransmissions to be greater than or equal to the quantity of retransmissions threshold, and may increase the MCS number or adjust the scheduling feature identifier from the normal scheduling feature identifier to the pre-scheduling feature identifier, and then trigger execution of step 204 to reduce the base station packet delay. In this way, when the base station packet delay value is lower than the target packet delay value, the quantity of retransmissions in the target translation parameter is greater than or equal to the quantity of retransmissions threshold. Therefore, the base station reliability value is greater than or equal to the target reliability value, so that a packet reliability requirement specified in the SLA can be met.

In another optional embodiment, the interface information further includes the quantity of concurrent service links.

After step 203 and before step 204, a target rate corresponding to the industry identifier and the service identifier is obtained based on a fifth mapping table:

base station configuration information is obtained, where the base station configuration information includes the first cell channel bandwidth, the cell subcarrier spacing, and the quantity of space division layers;

a base station rate is determined based on the first cell channel bandwidth, the cell subcarrier spacing, the quantity of concurrent service links, the MCS number, and the quantity of space division layers; and when the base station rate is greater than or equal to the target rate, execution of step 204 is triggered; or when the base station rate is less than the target rate, 1 is added to the MCS number, a sum of the MCS number and 1 is used as the MCS number, and execution of the step of determining a base station rate based on the first cell channel bandwidth, the cell subcarrier spacing, the quantity of concurrent service links, the MCS number, and the quantity of space division layers is triggered.

The determining a base station rate based on the first cell channel bandwidth, the cell subcarrier spacing, the quantity of concurrent service links, the MCS number, and the quantity of space division layers may include: determining a scheduling period based on the cell subcarrier spacing; determining spectrum efficiency corresponding to the MCS number; determining a quantity of available resource blocks corresponding to the first cell channel bandwidth and the cell subcarrier spacing; determining the first transport block set value based on the spectrum efficiency, the quantity of available resource blocks, the quantity of concurrent service links, and the quantity of space division layers; and dividing a product of the first transport block set value and a preset reliability value by the scheduling period to obtain the base station rate.

The spectrum efficiency SE, the quantity $N_{RB}$ of available resource blocks, the quantity $N_{link}$ of concurrent service links, the quantity $N_{layer}$ of space division layers, and the first transport block set value TBS meet the following formula:

$$TBS = N_{RB} * (N_{RB}/N_{link}) * SE * N_{layer},$$

$N_{RE}$ is a quantity of resource elements REs included in one resource block RB, $N_{RB}$ is a quantity of available resource blocks of each type of service, and $N_{layer}$ is a preset quantity of space division layers. When one RB includes 12 subcarriers and 14 time domain symbols, $N_{RE}=168$.

The first transport block set value TBS, the preset single-transmission reliability value k', the scheduling period TTI, and the base station rate v meet the following formula:

$$v = TBS * k'/TTI.$$

A value of k' may be but is not limited to 90%. It should be noted that k'=1−BLER. BLER is a preset block error rate of the base station, and a value may be but is not limited to 10%.

In this embodiment, when the base station rate is less than the target rate, 1 is added the MCS number, and then the base station rate is calculated based on a sum of the MCS number and 1, so that spectrum efficiency and the base station rate are also increased. An increment of the MCS number is not limited to 1, and may be alternatively another integer in [2, 14].

When the base station rate is greater than or equal to the target rate, an MCS number corresponding to the base station rate is used as the MCS number in the translation parameter. When the translation parameter is adjusted, the MCS number is not reduced. Therefore, a base station rate corresponding to an MCS number in a target translation parameter obtained after such adjustment is greater than or equal to the target rate. After the base station performs configuration based on the target translation parameter, requirements of the base station packet delay and the base station rate can be met.

It should be noted that a method for setting the MCS number is provided in this embodiment, so that the base station rate is greater than the target rate and the base station packet delay value is less than the target packet delay value. A method for controlling the quantity of retransmissions to be greater than or equal to the quantity of retransmissions threshold is provided in the previous embodiment, so that base station reliability is greater than target reliability and the base station packet delay value is less than the target packet delay value. The foregoing two methods may alternatively be successively performed in this application, so that both the base station rate, the base station reliability, and the base station packet delay value meet stipulation in the SLA.

Optionally, the foregoing method further includes: receiving a key performance indicator parameter sent by the base station, where the key performance indicator parameter includes a downlink packet delay (downlink packet delay), a downlink packet loss rate (downlink packet loss rate), an uplink packet loss rate (uplink packet loss rate), a radio access network unavailability rate (radio access network unavailability rate), a downlink throughput (user downlink average throughput), and an uplink throughput (user uplink average throughput); and displaying the key performance indicator parameter.

The downlink packet delay is used to indicate time from a time point at which a packet is received from a PDCP layer of the base station to a time point at which the packet arrives at a terminal.

The downlink packet loss rate is used to indicate a downlink packet loss status of a cell.

The uplink packet loss rate is used to indicate an uplink packet loss status of a cell.

The radio access network unavailability rate is used to indicate duration in which a cell is unavailable due to human factors, system reasons, or the like.

In actual application, after the base station performs configuration based on the target translation parameter, in a service scheduling process, the base station packet delay value may fluctuate, and consequently, a packet delay requirement specified in the SLA cannot be met. To resolve this problem, some other methods for reducing the base station packet delay are further provided in this application. For details, refer to the following embodiments.

In another optional embodiment, after step 207, the foregoing method further includes:

receiving an average packet delay value sent by the base station;

adjusting the first cell channel bandwidth to second cell channel bandwidth when the average packet delay value is greater than the target packet delay, where the second cell channel bandwidth is higher than the first cell channel bandwidth;

determining a second transport block set value based on the second cell channel bandwidth, the cell subcarrier spacing, the quantity of concurrent service links, the MCS number, and the quantity of space division layers;

determining a third weighted value based on a result of comparison between the amount of to-be-scheduled data and the second transport block set value;

determining the base station packet delay value based on the preset terminal processing delay, the preset base station processing delay, the first time division duplex air interface waiting delay, the preset time division duplex air interface transmission delay, the third weighted value, the second weighted value, and the quantity of retransmissions; and when the base station packet delay value is less than or equal to the target packet delay value, sending the second cell channel bandwidth to the base station.

The base station packet delay value determined based on the preset terminal processing delay $t_{ue}$, the preset base station processing delay $t_{bs}$, the first time division duplex air interface waiting delay $t_{tddwait}$, the preset time division duplex air interface transmission delay $t_{tddtran}$, the third weighted value $q_3$, the second weighted value $q_2$, and the quantity $N_r$ of retransmissions meets the following formula:

$$T=(t_{ue}+t_{bs}+t_{tddwait}+t_{tddtran}*q_3)*N_r*q_2.$$

In this embodiment, the base station obtains a packet delay value of a sampling period, and calculates the average packet delay value based on the packet delay value of the sampling period, and the average packet delay value is a base station packet delay value obtained through actual measurement. When the average packet delay value is greater than the target packet delay, it indicates that the base station packet delay value obtained through actual measurement does not meet a packet delay requirement specified in the SLA.

To enable the base station packet delay to meet stipulation in the SLA, the data processing apparatus adjusts the first cell channel bandwidth to the second cell channel bandwidth, determines the second transport block set value based on the second cell channel bandwidth, the cell subcarrier spacing, the quantity of concurrent service links, the MCS number, and the quantity of space division layers, and determines the third weighted value based on the result of comparison between the amount of to-be-scheduled data and the second transport block set value. Because the second cell channel bandwidth is higher than the first cell channel bandwidth, the second transport block set value is greater than the first transport block set value. In this way, a quantity of fragments may be reduced. When the quantity of fragments is reduced, the third weighted value is less than the first weighted value, and therefore, the base station packet delay value can be reduced. When the quantity of fragments is not reduced, cell channel bandwidth may be further increased until the quantity of fragments is reduced. It can be learned that, after the base station performs configuration based on the second cell channel bandwidth, the base station packet delay can be reduced during service scheduling.

In this embodiment, the data processing apparatus may adjust the cell channel bandwidth, to reduce the base station packet delay. In this way, another method for reducing the base station packet delay may be provided.

In another optional embodiment, after step 207, the foregoing method further includes:

receiving an average packet delay value sent by the base station;

adjusting a first subframe ratio to a second subframe ratio when the average packet delay value is greater than the target packet delay, where the second subframe ratio includes more uplink subframes than the first subframe ratio;

determining a second time division duplex air interface waiting delay based on the second subframe ratio;

determining the base station packet delay value based on the preset terminal processing delay, the preset base station processing delay, the second time division duplex air interface waiting delay, the preset time division duplex air interface transmission delay, the first weighted value, the second weighted value, and the quantity of retransmissions; and when the base station packet delay value is less than or equal to the target packet delay value, sending the second subframe ratio to the base station.

The base station packet delay determined based on the preset terminal processing delay, the preset base station processing delay, the second time division duplex air interface waiting delay, the preset time division duplex air interface transmission delay, the first weighted value, the second weighted value, and the quantity of retransmissions meets the following formula:

$$T=(t_{ue}+t_{bs}+t_{tddwait'}+t_{tddtran}*q_1)*N_r*q_2, \text{ where}$$

$t_{ue}$ is the preset terminal processing delay, $t_{bs}$ is the preset base station processing delay, $t_{tddwait'}$ is the second time division duplex air interface waiting delay, $t_{tddtran}$ is the preset time division duplex air interface transmission delay, $q_1$ is the first weighted value. $N_r$ is the quantity of retransmissions, and $q_2$ is the second weighted value.

In this embodiment, the base station configuration parameter further includes the first subframe ratio. A communication standard of the base station is time division duplex (time-division duplex, TDD). For example, that the first subframe ratio is 2:8 means that a ratio of uplink subframes to downlink subframes is 2:8. In this case, uploading can be performed after eight slots (slot) after one data packet is uploaded. In other words, $t_{wait}$ is eight slots.

To improve an uplink scheduling speed, the data processing apparatus adjusts the first subframe ratio to the second subframe ratio. For example, the second subframe ratio is 3:7. In this way, $N_{RB}$ is seven slots. It can be learned that, after the first subframe ratio is adjusted to the second subframe ratio, an air interface waiting delay in uplink scheduling can be reduced. After the base station performs configuration based on the second subframe ratio, the base station packet delay can be reduced during uplink scheduling. The subframe ratio is not limited to the foregoing example. When the foregoing method is performed for a plurality of times, a base station packet delay in an uplink scheduling process can be further reduced.

In this embodiment, when the subframe ratio is adjusted, the base station packet delay in the uplink scheduling process can be reduced. In this way, another method for reducing the base station packet delay is provided.

It should be noted that, to improve a downlink scheduling speed, the data processing apparatus may further adjust the first subframe ratio to a third subframe ratio, and the third subframe ratio includes more downlink subframes than the first subframe ratio. In this way, an air interface waiting delay in downlink scheduling can be reduced, so that a base station packet delay in a downlink scheduling process can be reduced.

Figure 3:
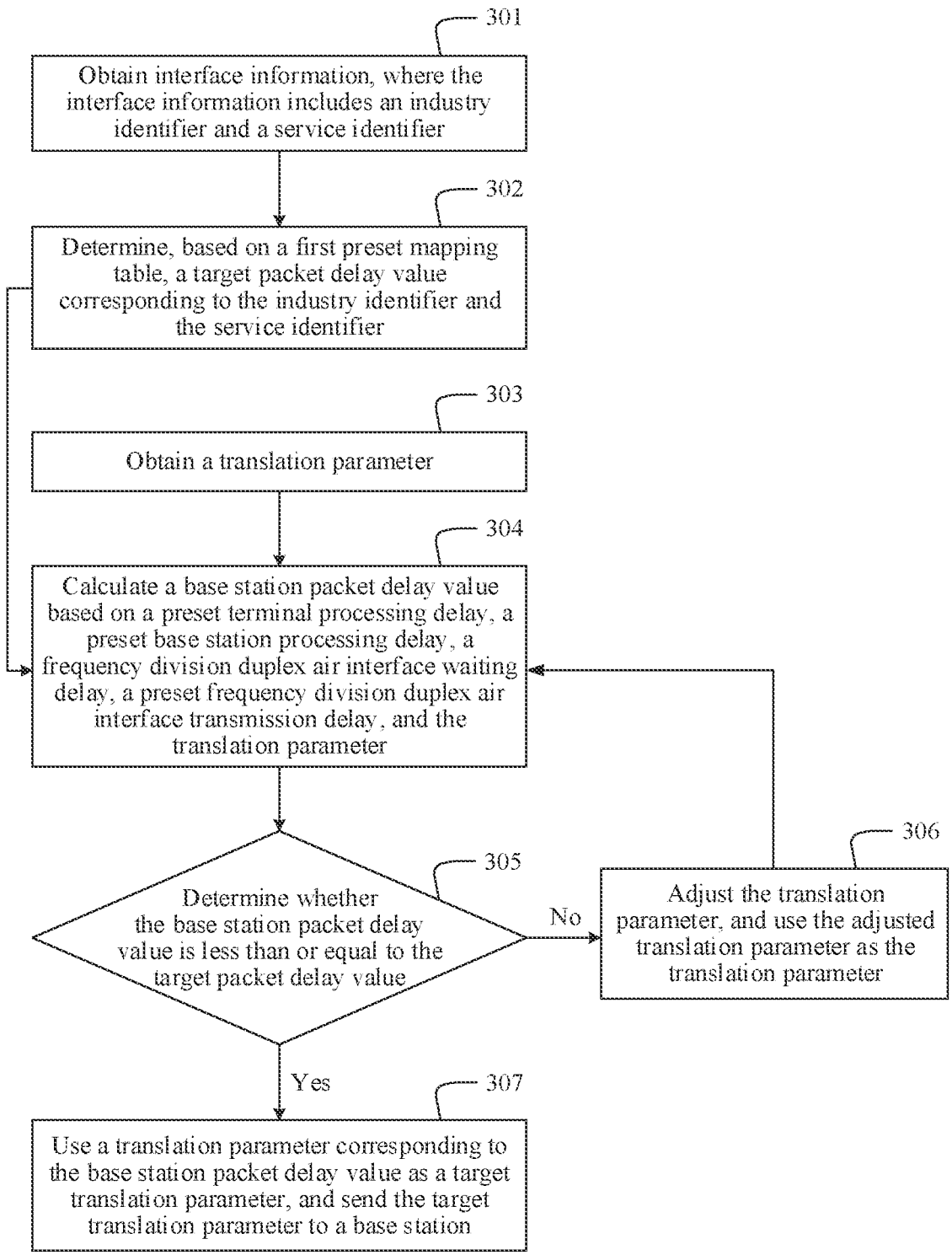
FIG. 3 is another schematic flowchart of a data processing method according to this application.

Referring to FIG. 3, another embodiment of a data processing method in this application includes the following steps.

Step 301: Obtain interface information, where the interface information includes an industry identifier and a service identifier.

Step 302: Determine, based on a first preset mapping table, a target packet delay value corresponding to the industry identifier and the service identifier.

Step 303: Obtain a translation parameter.

The translation parameter includes at least one of a scheduling feature identifier, a quantity of retransmissions, and a modulation and coding scheme MCS number.

Step 304: Calculate a base station packet delay value based on a preset terminal processing delay, a preset base station processing delay, a frequency division duplex air interface waiting delay, a preset frequency division duplex air interface transmission delay, and the translation parameter.

Step 305: Determine whether the base station packet delay is less than or equal to the target packet delay value, and if yes, perform step 307, or if no, perform step 306.

Step 306: When the base station packet delay value is greater than the target packet delay value, adjust the translation parameter, use the adjusted translation parameter as the translation parameter, and trigger execution of step 304.

Step 307: When the base station packet delay value is less than or equal to the target packet delay value, use a translation parameter corresponding to the base station packet delay value as a target translation parameter, and send the target translation parameter to a base station, so that the base station schedules service data based on the target translation parameter, where the service data corresponds to the industry identifier and the service identifier.

In this embodiment, steps 301 to 303 and steps 305 to 307 are respectively similar to steps 201 to 203 and steps 305 to 307. In step 304, the preset frequency division duplex air interface waiting delay may be but is not limited to one slot, the preset frequency division duplex air interface transmission delay may be but is not limited to one slot, and the preset terminal processing delay and the preset base station processing delay may be but are not limited to eight slots. Based on the method in this embodiment, a base station packet delay value in a frequency division duplex scenario may be adjusted, so that the base station packet delay value packet can meet stipulation in an SLA.

A method for calculating the base station packet delay value in the frequency division duplex scenario is described below.

In an optional embodiment,
the interface information further includes a quantity of concurrent service links and a service data packet size.

The calculating a base station packet delay value based on a preset terminal processing delay, a preset base station processing delay, a frequency division duplex air interface waiting delay, a preset frequency division duplex air interface transmission delay, and the translation parameter includes:

when the translation parameter includes the MCS number, the scheduling feature identifier, and the quantity of retransmissions, determining a first transport block set value based on first cell channel bandwidth, a cell subcarrier spacing, the quantity of concurrent service links, the MCS number, and a quantity of space division layers;

determining a first weighted value based on a result of comparison between the service data packet size and the first transport block set value;

determining a second weighted value based on the scheduling feature identifier; and determining the base station packet delay value based on the preset terminal processing delay, the preset base station processing delay, the frequency division duplex air interface waiting delay, the preset frequency division duplex air interface transmission delay, the first weighted value, the second weighted value, and the quantity of retransmissions, where the preset terminal processing delay $t_{ue}$, the preset base station processing delay $t_{bs}$, the frequency division duplex air interface waiting delay $t_{tddwait}$, the preset frequency division duplex air interface transmission delay $t_{tddtran}$, the first weighted value $q_1$, the second weighted value $q_2$, the quantity $N_r$ of retransmissions, and the base station packet delay value T meet the following formula:

$$T=(t_{ue}+t_{bs}+t_{tddwait}+t_{tddtran}*q_1)*N_r*q_2.$$

In frequency division duplex communication, when the service data packet size is greater than or equal to the first transport block set value, a service data packet does not need to be segmented, and in this case, one service data packet is transmitted in one FDD period. When the service data packet size is less than the first transport block set value, a service data packet needs to be segmented. In this case, one data packet slice is transmitted in one FDD period, and the data packet slice is obtained by segmenting the service data packet.

Optionally, the determining a first transport block set value based on first cell channel bandwidth, a cell subcarrier spacing, the quantity of concurrent service links, the MCS number, and a quantity of space division layers includes:
determining, based on a second preset mapping table, spectrum efficiency corresponding to the MCS number; determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers.

Optionally, the determining a first weighted value based on a result of comparison between the service data packet size and the first transport block set value includes: when the service data packet size is greater than the first transport block set value and the service data packet size can be exactly divided by the first transport block set value, determining that the first weighted value is equal to a quotient obtained after the service data packet size is divided by the first transport block set value; when the service data packet size is greater than the first transport block set value and the service data packet size cannot be exactly divided by the first transport block set value, determining that the first weighted value is equal to 1 plus a quotient obtained after the service data packet size is divided by the first transport block set value; or when the service data packet size is less than or equal to the first transport block set value, determining that the first weighted value is 1.

Optionally, the determining a second weighted value based on the scheduling feature identifier includes: when the scheduling feature identifier is a normal scheduling feature identifier, determining that the second weighted value is 3; or when the scheduling feature identifier is a pre-scheduling feature identifier, determining that the second weighted value is 1. The foregoing methods for calculating the first transport block set value, the first weighted value, and the second weighted value are respectively similar to the methods for calculating the first transport block set value, the first weighted value, and the second weighted value in the embodiment shown in FIG. 2, and details are not described herein again.

Optionally, the adjusting the translation parameter includes: adding 1 to the MCS number; and/or subtracting 1 from the quantity of retransmissions; and/or when the scheduling feature identifier is a normal scheduling feature identifier, adjusting the normal scheduling feature identifier to a pre-scheduling feature identifier. A specific method for adjusting the translation parameter is similar to the method for adjusting the translation parameter in the embodiment shown in FIG. 2, and details are not described herein again.

In addition, in the frequency division duplex scenario, a method for adjusting cell channel bandwidth based on an average packet delay value sent by the base station is similar to a method for adjusting cell channel bandwidth based on the average packet delay value sent by the base station in a time division duplex scenario.

A data processing method that meets a packet delay requirement of the SLA is described above, and a data processing method that meets a packet reliability requirement of the SLA is described below.

Figure 4:
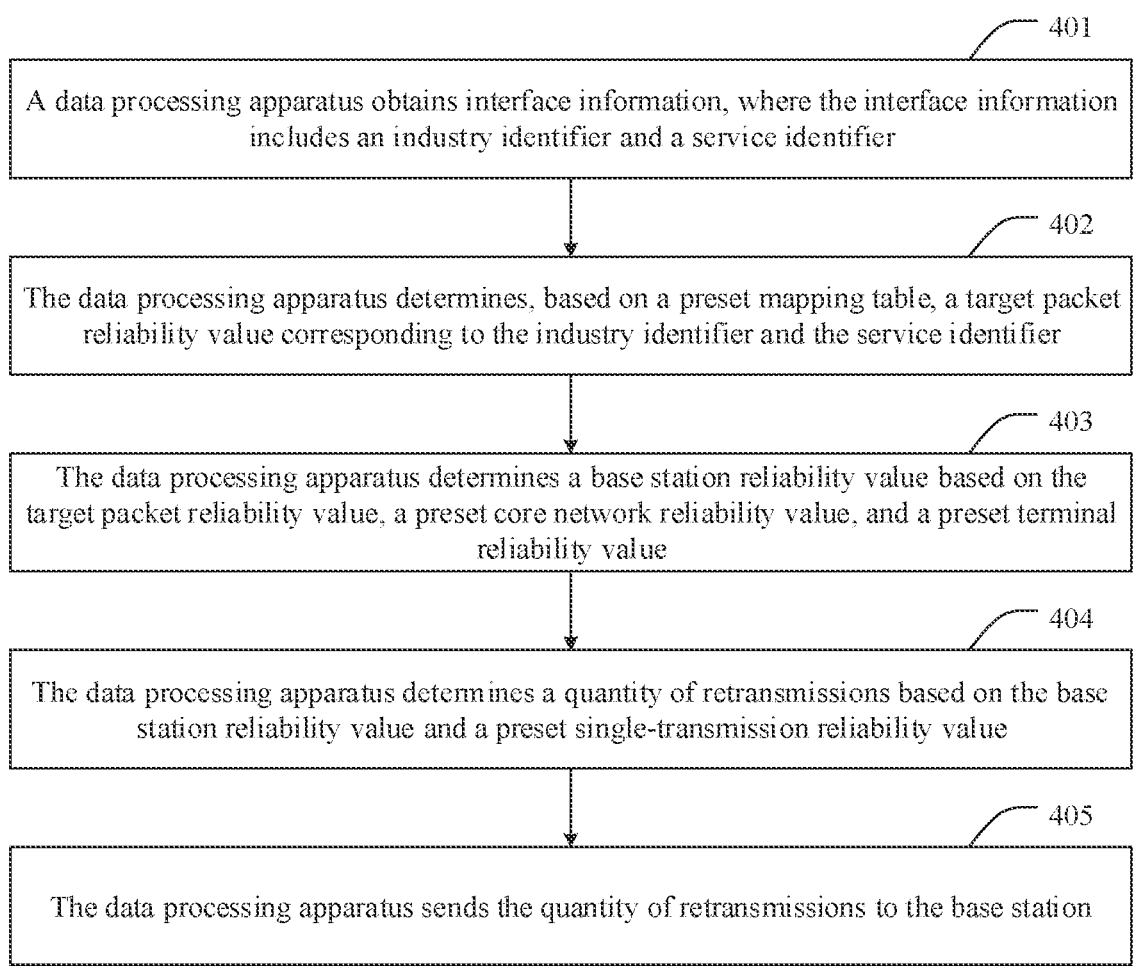
FIG. 4 is another schematic flowchart of a data processing method according to this application.

Referring to FIG. 4, another embodiment of a data processing method provided in this application includes the following steps.

Step 401: A data processing apparatus obtains interface information, where the interface information includes an industry identifier and a service identifier.

Step 402: The data processing apparatus determines, based on a preset mapping table, a target packet reliability value corresponding to the industry identifier and the service identifier.

Step 403: The data processing apparatus determines a base station reliability value based on the target packet reliability value, a preset core network reliability value, and a preset terminal reliability value.

The core network reliability value and the terminal reliability value may be set based on experience. For example, the core network reliability value may be but is not limited to 99.9999% or 99.999%, and the terminal reliability value may be but is not limited to 99.999%.

Step 404: The data processing apparatus determines a quantity of retransmissions based on the base station reliability value and a preset single-transmission reliability value.

The preset single-transmission reliability value k' is a reliability value of single data packet transmission of the base station, and different services correspond to different k'. For example, k' corresponding to control signaling is 99%, and k' corresponding to a data service is 90%. A value of k' is not limited to the foregoing examples, and may be alternatively set to another value based on experience. This is not limited in this application.

In an optional implementation, the target reliability value $k_0$, the preset core network reliability value $k_1$, the base station reliability value $k_2$, and the preset terminal reliability value $k_3$ meet a first formula: $k_0 \leq k_1 * k_2 * k_3$.

The quantity of retransmissions is determined based on the base station reliability value and the preset single-transmission reliability value, and the base station reliability value $k_2$, the preset single-transmission reliability value k', and the quantity $N_r$ of retransmissions meet the following formula:

$$k_2 \leq 1 - \prod_{i=1}^{N_r}(1 - k').$$

When a quantity of retransmissions that meets the foregoing formula has a plurality of values, a minimum value may be selected and sent to the base station, and the base station performs configuration based on the minimum quantity of retransmissions. Alternatively, any one of the foregoing plurality of values is selected and sent to the base station, and the base station performs configuration based on the received quantity of retransmissions.

Step 405: The data processing apparatus sends the quantity of retransmissions to the base station.

In this embodiment, after receiving the quantity of retransmissions, the base station performs configuration based on the quantity of retransmissions. In a service scheduling process, a quantity of times that the base station retransmits service data is greater than or equal to the quantity of retransmissions, so that a reliability requirement of the SLA can be met.

A data processing method that meets a packet reliability requirement of the SLA is described above, and a data processing method that meets a rate requirement of the SLA is described below.

Figure 5:
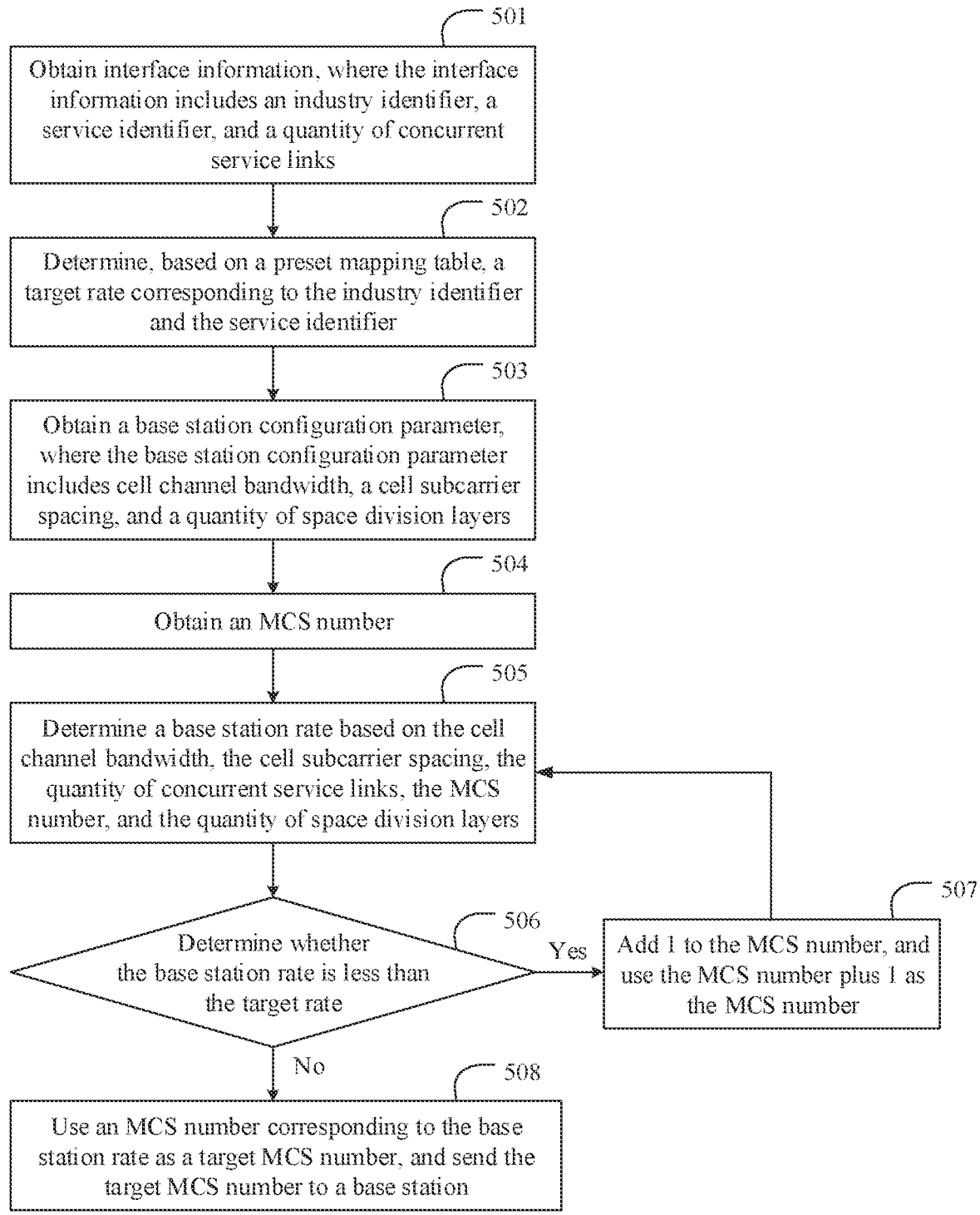
FIG. 5 is another schematic flowchart of a data processing method according to this application.

Referring to FIG. 5, another embodiment of a data processing method provided in this application includes the following steps.

Step 501: Obtain interface information, where the interface information includes an industry identifier, a service identifier, and a quantity of concurrent service links.

Step 502: Determine, based on a preset mapping table, a target rate corresponding to the industry identifier and the service identifier.

Step 503: Obtain a base station configuration parameter, where the base station configuration parameter includes cell channel bandwidth, a cell subcarrier spacing, and a quantity of space division layers.

Step 504: Obtain an MCS number.

Step 505: Determine a base station rate based on the cell channel bandwidth, the cell subcarrier spacing, the quantity of concurrent service links, the MCS number, and the quantity of space division layers.

Optionally, step 505 includes: determining a scheduling period based on the cell subcarrier spacing; determining spectrum efficiency corresponding to the MCS number; determining a quantity of available resource blocks corresponding to the cell channel bandwidth and the cell subcarrier spacing; determining a transport block set value based on the spectrum efficiency, the quantity of available resource blocks, the quantity of concurrent service links, and the quantity of space division layers; and dividing a product of the transport block set value and a preset reliability value by the scheduling period to obtain the base station rate.

The spectrum efficiency, the quantity of available resource blocks, the quantity $N_{link}$ of concurrent service links, the quantity $N_{layer}$ of space division layers, and the transport block set value TBS meet the following formula:

$$TBS = N_{RE} * (N_{RB}/N_{link}) * SE * N_{layer}, \text{ where}$$

$N_{RE}$ is a quantity of resource elements REs included in one resource block RB, $N_{RB}$ is a quantity of available resource blocks of each type of service, and $N_{layer}$ is a preset quantity of space division layers.

The transport block set value TBS, the preset single-transmission reliability value k', the scheduling period TTI, and the base station rate v meet the following formula:

$$v TBS * k'/TTI.$$

A value of k' may be but is not limited to 90%. It should be noted that k'=1−BLER. BLER is a preset block error rate of a base station, and a value may be but is not limited to 10%.

Step 506: Determine whether the base station rate is less than the target rate, and if yes, perform step 507, or if no, perform step 508.

Step 507: When the base station rate is less than the target rate, add 1 to the MCS number, use the MCS number plus 1 as the MCS number, and trigger execution of step 505.

Step 508: When the base station rate is greater than or equal to the target rate, use an MCS number corresponding to the base station rate as a target MCS number, and send the target MCS number to a base station, so that the base station performs configuration by using the target MCS number.

In this embodiment, a larger MCS number indicates a larger SE, a larger TBS, and a larger base station rate. The base station rate can be improved by gradually increasing the MCS number in this way. When the base station rate is greater than or equal to the target rate, the MCS number corresponding to the base station rate is used as the target MCS number, and the target MCS number is sent to the base station. After the base station performs configuration by using the target MCS number, a base station rate at which service data is transmitted in a service scheduling process can meet a rate requirement of an SLA.

A data processing method that meets the rate requirement of the SLA is described above, and a data processing method that meets a RAN availability requirement of the SLA is described below.

Figure 6:
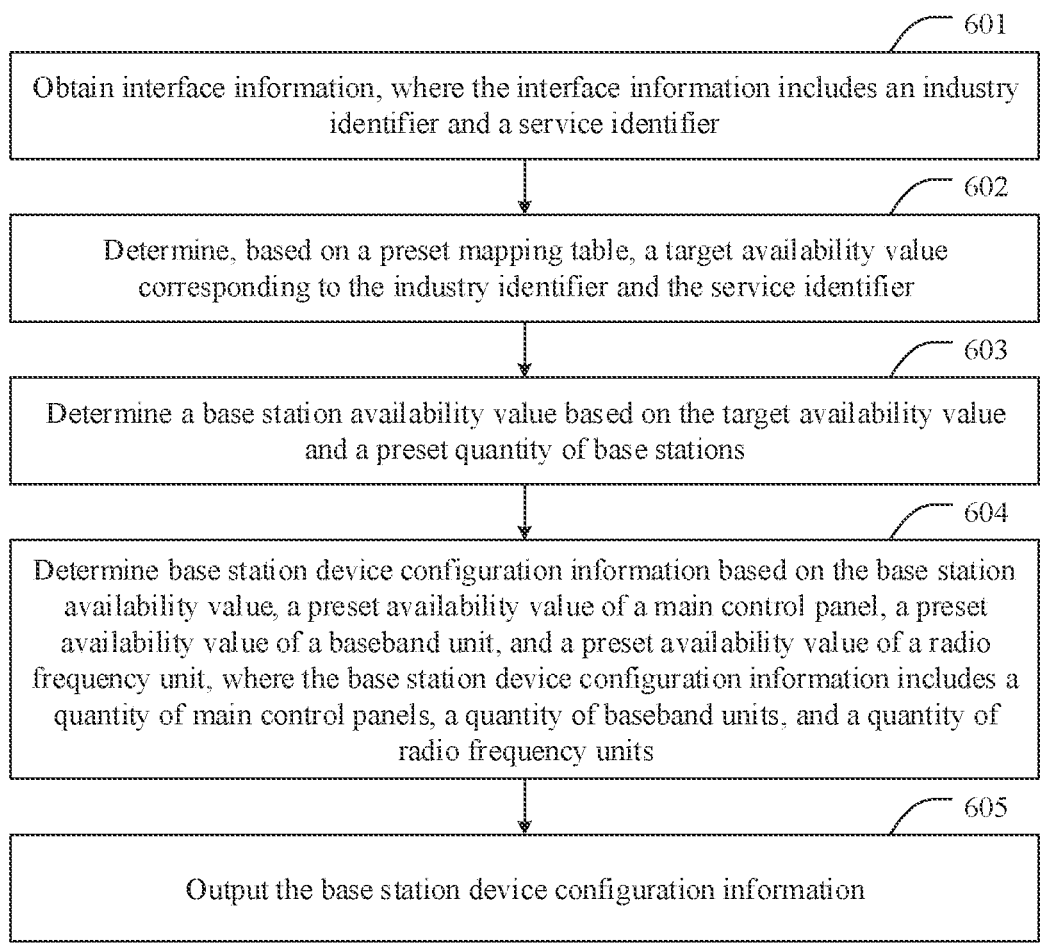
FIG. 6 is another schematic flowchart of a data processing method according to this application.

Referring to FIG. 6, another embodiment of a data processing method provided in this application includes the following steps.

Step 601: Obtain interface information, where the interface information includes an industry identifier and a service identifier.

Step 602: Determine, based on a preset mapping table, a target availability value corresponding to the industry identifier and the service identifier.

Step 603: Determine a base station availability value based on the target availability value and a preset quantity of base stations.

The quantity of base stations is a quantity of base stations configured for service transmission. For example, when a single base station transmits a service, the quantity of base stations is 1. When two base stations transmit services, for example, one base station is a primary base station, and the other base station is a secondary base station, the quantity of base stations is 2. In another case with redundant base stations, the quantity of base stations may be deduced by analogy.

Step 604: Determine base station device configuration information based on the base station availability value, a preset availability value of a main control panel, a preset availability value of a baseband unit, and a preset availability value of a radio frequency unit, where the base station device configuration information includes a quantity of main control panels, a quantity of baseband units, and a quantity of radio frequency units.

Step 605: Output the base station device configuration information.

In this embodiment, the data processing method may be performed by a data processing apparatus or a base station. After determining the base station device configuration information, the data processing apparatus may display the base station device configuration information by using a display. Alternatively, the base station device configuration information is sent to an industry terminal or an industry management device.

In this embodiment, the base station device configuration information may be determined based on the target availability value, and the base station may be deployed based on the base station device configuration information.

Optionally, the target availability value $A_0$, the preset quantity $N_{bs}$ of base stations, and the base station availability value A meet a first formula:

$$A_0 = 1 - \prod_{j=1}^{N_{bs}} (1 - A).$$

The base station availability value A, the preset availability value $A_c$ of the main control panel, the preset availability value $A_b$ of the baseband unit, and the preset availability value $A_r$ of the radio frequency unit meet a second formula:

$$A = \left[1 - \prod_{i_1=1}^{n_c}(1 - A_c)\right] * \left[1 - \prod_{i_2=1}^{n_b}(1 - A_b)\right] * \left[1 - \prod_{i_3=1}^{n_r}(1 - A_r)\right],$$

$n_c$ is the quantity of main control panels, $n_b$ is the quantity of baseband units, and $n_r$ is the quantity of radio frequency units.

A value of $A_c$ may be but is not limited to 99.9%, 99.99%, or 99.999%. A value of $A_b$ may be but is not limited to 99.9%, 99.99%, or 99.999%. A value of $A_r$ may be but is not limited to 99.9%, 99.99%, or 99.999%.

It may be learned from the first formula that A is greater than $A_0$. It may be learned from the second formula that a larger value of any one of $n_c$, $n_b$, or $n_r$ leads to larger A, and a smaller value of any one of $n_c$, $n_b$, or $n_r$ leads to smaller A. The base station availability value can be improved by increasing the main control panel, the baseband unit, the radio frequency unit, or the foregoing combination in this way, until the base station availability value is greater than or equal to the target availability value.

For example, $A_c$, $A_b$, and $A_r$ each are 99.99%. When $A_0$ is 99.9%, it can be learned based on the first formula that A needs to be set to a value greater than 99.9%. Then, it may be inferred from the second formula that when $n_c=1$, $n_b=1$, and $n_r=1$, A is greater than 99.9%. Therefore, it is determined that values of $n_c$, $n_b$, and $n_r$ in the base station device configuration information are all 1. The values of $n_c$, $n_b$, and $n_r$ are not limited to the foregoing examples, and may alternatively be integers greater than 1. For example, $n_c=1$, $n_b=2$, and $n_r=3$.

In another optional embodiment, after the target availability value is determined, the base station device configuration information may be determined based on a second preset mapping table, and then basic device configuration information is output. The second preset mapping table may be shown in the following table:

| RAN availability | 99% | 99.9% | 99.99% | 99.999% | 99.9999% |
|---|---|---|---|---|---|
| Base station device configuration information | One main control panel, one baseband unit, and one radio frequency unit | One main control panel, one baseband unit, and one radio frequency unit | One main control panel, one baseband unit, and three radio frequency units | One main control panel, three baseband units, and three radio frequency units | Dual base station networking, where each base station includes one main control panel, one baseband unit, and three radio frequency units |

A RAN availability value of the base station is obtained. When the RAN availability value of the base station is less than a target RAN availability value, the data processing apparatus may send reminder information to a client, to indicate that the base station cannot meet a RAN availability value specified in an SLA. After determining the base station device configuration information, the data processing apparatus may display the base station device configuration information. Alternatively, the data processing apparatus sends the base station device configuration information to the client. The base station device configuration information may be used to deploy the base station.

Figure 7:
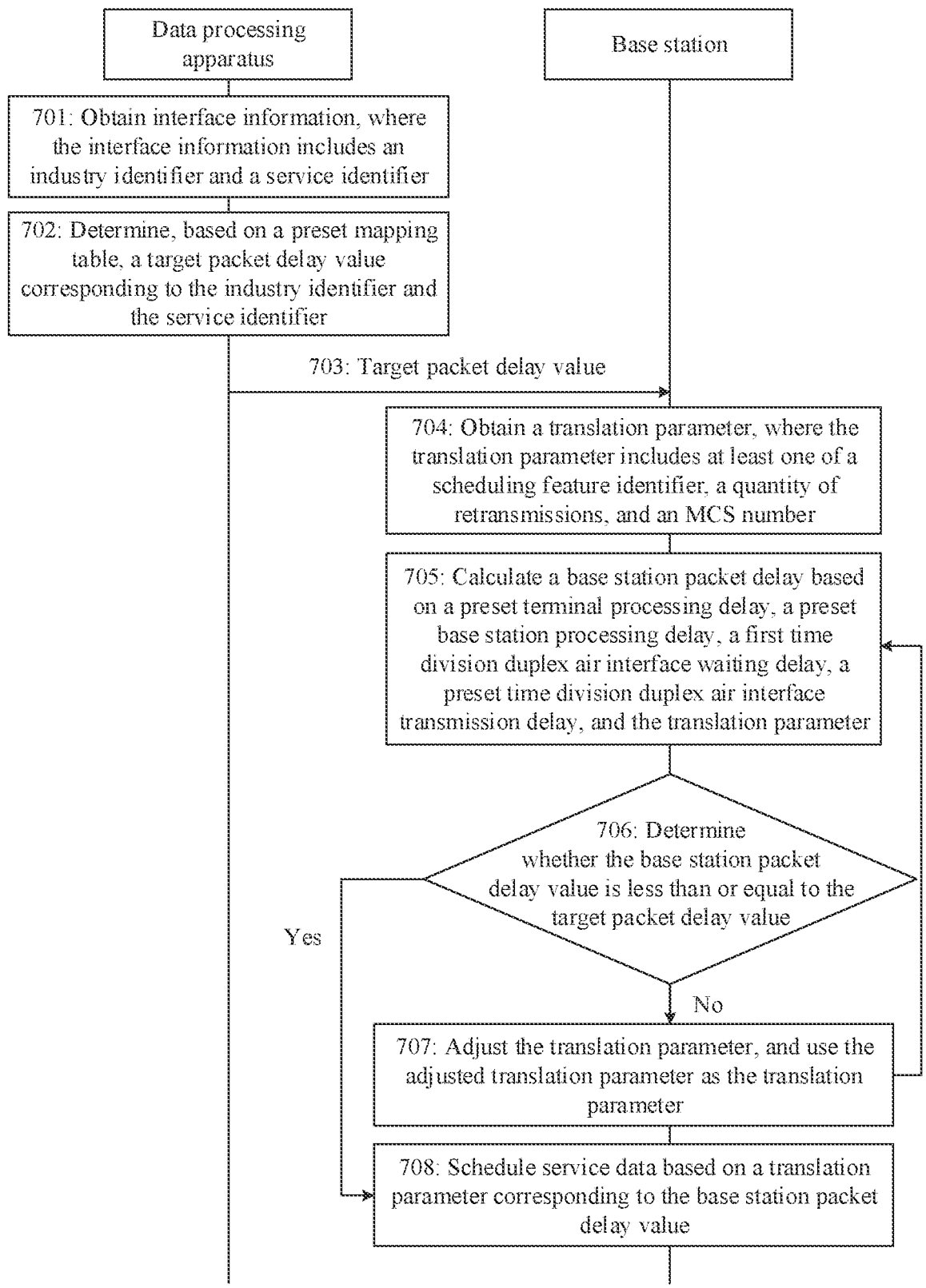
FIG. 7 is another schematic flowchart of a data processing method according to this application.

Referring to FIG. 7, another embodiment of a data processing method provided in this application includes the following steps.

Step 701: A data processing apparatus receives interface information, where the interface information includes an industry identifier and a service identifier.

Step 702: The data processing apparatus determines, based on a preset mapping table, a target packet delay value corresponding to the industry identifier and the service identifier.

Steps 701 and 702 are respectively the same as steps 201 and 202 in the embodiment shown in FIG. 2.

Step 703: A base station receives the target packet delay value sent by the data processing apparatus.

Step 704: The base station obtains a translation parameter, where the translation parameter includes at least one of a scheduling feature identifier, a quantity of retransmissions, and a modulation and coding scheme MCS number.

Step 705: The base station calculates a base station packet delay based on a preset terminal processing delay, a preset base station processing delay, a first time division duplex air interface waiting delay, a preset time division duplex air interface transmission delay, and the translation parameter.

Step 706: The base station determines whether the base station packet delay is less than or equal to the target packet delay value, and if yes, performs step 708, or if no, performs step 707.

Step 707: When the base station packet delay value is greater than the target packet delay value, adjust the translation parameter, use the adjusted translation parameter as the translation parameter, and trigger execution of step 705.

Step 708: When the base station packet delay value is less than or equal to the target packet delay value, schedule service data based on a translation parameter corresponding to the base station packet delay value, where the service data corresponds to the industry identifier and the service identifier.

In this embodiment, the base station packet delay value can be calculated based on the translation parameter, and the translation parameter is adjusted based on a result of comparison between the base station packet delay value and the target packet delay value, to obtain a base station packet delay less than the target packet delay through calculation based on the adjusted translation parameter. After the base station performs configuration based on the adjusted translation parameter, a packet delay in scheduling service data can meet stipulation in an SLA. Compared with a QoS mechanism, the data processing method in this embodiment can provide better quality of service for a service.

In an optional embodiment, in the data processing method, before step 705, a quantity of concurrent service links, a service data packet size, and a service data packet interval that are sent by the data processing apparatus are received, and a base station configuration parameter is obtained, where the base station configuration parameter includes first cell channel bandwidth, a cell subcarrier spacing, and a quantity of space division layers.

Step 705 includes:

dividing a product of the service data packet size and a time division duplex frame period by the service data packet interval, to obtain an amount of to-be-scheduled data in each time division duplex frame period;

when the translation parameter includes the MCS number, the scheduling feature identifier, and the quantity of retransmissions, determining a first transport block set value based on first cell channel bandwidth, a cell subcarrier spacing, the quantity of concurrent service links, the MCS number, and the quantity of space division layers;

determining a first weighted value based on a result of comparison between the amount of to-be-scheduled data and the first transport block set value;

determining a second weighted value based on the scheduling feature identifier; and determining the base station packet delay based on the preset terminal processing delay, the preset base station processing delay, the first time division duplex air interface waiting delay, the preset time division duplex air interface transmission delay, the first weighted value, the second weighted value, and the quantity of retransmissions, where the base station packet delay determined based on the preset terminal processing delay, the preset base station processing delay, the first time division duplex air interface waiting delay, the preset time division duplex air interface transmission delay, the first weighted value, the second weighted value, and the quantity of retransmissions meets the following formula:

$$T=(t_{ue}+t_{bs}+t_{tddwait}+t_{tddtran}*q_1)*N_r*q_2, \text{ where}$$

$t_{ue}$ is the preset terminal processing delay, $t_{bs}$ is the preset base station processing delay, $t_{tddwait}$ is the first time division duplex air interface waiting delay, $t_{tddtran}$ is the preset time division duplex air interface transmission delay, $q_1$ is the first weighted value, $N_r$ is the quantity of retransmissions, and $q_2$ is the second weighted value.

Optionally, the determining a first transport block set value based on the first cell channel bandwidth, the cell subcarrier spacing, the quantity of concurrent service links, the MCS number, and the quantity of space division layers includes: determining, based on a second preset mapping table, spectrum efficiency corresponding to the MCS number; determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers.

Optionally, the determining a first weighted value based on a result of comparison between the amount of to-be-scheduled data and the first transport block set value includes: when the amount of to-be-scheduled data is greater than the first transport block set value and the amount of to-be-scheduled data can be exactly divided by the first transport block set value, determining that the first weighted value is a quotient obtained after the amount of to-be-scheduled data is divided by the first transport block set value; when the amount of to-be-scheduled data is greater than the first transport block set value and the amount of to-be-scheduled data cannot be exactly divided by the first transport block set value, determining that the first weighted value is 1 plus a quotient obtained after the amount of to-be-scheduled data is divided by the first transport block set value; or when the amount of to-be-scheduled data is less than or equal to the first transport block set value, determining that the first weighted value is 1.

Optionally, the determining a second weighted value based on the scheduling feature identifier includes: when the scheduling feature identifier is a normal scheduling feature identifier, determining that the second weighted value is 3; or when the scheduling feature identifier is a pre-scheduling feature identifier, determining that the second weighted value is 1.

In the foregoing embodiment, a method in which the base station calculates the first transport block set value and the base station packet delay is similar to the method in which the data processing apparatus calculates the first transport block set value and the base station packet delay in the embodiment shown in FIG. 2. A method in which the base station determines the first weighted value and the second weighted value is similar to the method in which the data processing apparatus determines the first weighted value and the second weighted value, and details are not described herein again.

Based on the embodiment or the optional embodiment shown in FIG. 7, the adjusting the translation parameter may include: adding 1 to the MCS number; and/or subtracting 1 from the quantity of retransmissions; and/or when the scheduling feature identifier is a normal scheduling feature identifier, adjusting the normal scheduling feature identifier to a pre-scheduling feature identifier.

In this embodiment, a process in which the base station adjusts the translation parameter is similar to the process in which the data processing apparatus adjusts the translation parameter, and details are not described herein again.

Based on the embodiment or the optional embodiment shown in FIG. 7, before the adjusting the translation parameter, the foregoing method further includes:

determining, based on a fourth preset mapping table, a target reliability value corresponding to the industry identifier and the service identifier;

determining a base station reliability value based on the target reliability value, a preset core network reliability value, and a preset terminal reliability value; and determining a quantity of retransmissions threshold based on the base station reliability value and a preset single-transmission reliability value.

The adjusting the translation parameter may include: when the quantity of retransmissions in the translation parameter is greater than the quantity of retransmissions threshold, adding 1 to the MCS number, and/or subtracting 1 from the quantity of retransmissions, and/or when the scheduling feature identifier is a normal scheduling feature identifier, adjusting the normal scheduling feature identifier to a pre-scheduling feature identifier; or when the quantity of retransmissions in the translation parameter is less than or equal to the quantity of retransmissions threshold, adjusting the quantity of retransmissions to be greater than the quantity of retransmissions threshold, and adding 1 to the MCS number, and/or when the scheduling feature identifier is a normal scheduling feature identifier, adjusting the normal scheduling feature identifier to a pre-scheduling feature identifier.

The target packet reliability value $k_0$, the preset core network reliability value $k_1$, the base station reliability value $k_2$, and the preset terminal reliability value $k_3$ meet a first formula:

$$k_0 \leq k_1 * k_2 * k_3.$$

The base station reliability value $k_2$, the preset single-transmission reliability value $k'$, and the quantity of retransmissions threshold $N_r'$ meet a second formula:

$$k_2 \leq 1 - \prod_{i=1}^{N_r'}(1-k').$$

In this embodiment, a method in which the base station controls the quantity of retransmissions to be greater than or equal to the quantity of retransmissions threshold when adjusting the translation parameter is similar to the foregoing method in which the data processing apparatus controls the quantity of retransmissions to be greater than or equal to the quantity of retransmissions threshold when adjusting the translation parameter, and details are not described herein again.

Based on the embodiment or the optional embodiment shown in FIG. 7, in an optional embodiment, after step 703 and before step 704, the foregoing method further includes:
  determining, based on a preset mapping table, a target rate corresponding to the industry identifier and the service identifier;
  receiving the quantity of concurrent service links sent by the data processing apparatus;
  obtaining base station configuration information, where the base station configuration information includes the first cell channel bandwidth, the cell subcarrier spacing, and the quantity of space division layers;
  determining a base station rate based on the first cell channel bandwidth, the cell subcarrier spacing, the quantity of concurrent service links, the MCS number, and the quantity of space division layers; and
  when the base station rate is greater than or equal to the target rate, triggering execution of the step of calculating a base station packet delay value based on a preset terminal processing delay, a preset base station processing delay, a first time division duplex air interface waiting delay, a preset time division duplex air interface transmission delay, and the translation parameter; or
  when the base station rate is less than the target rate, adding 1 to the MCS number, using a sum of the MCS number and 1 as the MCS number, and triggering execution of the step of determining a base station rate based on the first cell channel bandwidth, the cell subcarrier spacing, the quantity of concurrent service links, the MCS number, and the quantity of space division layers.

The determining a base station rate based on the first cell channel bandwidth, the cell subcarrier spacing, the quantity of concurrent service links, the MCS number, and the quantity of space division layers may include: determining a scheduling period based on the cell subcarrier spacing; determining spectrum efficiency corresponding to the MCS number; determining a quantity of available resource blocks corresponding to the first cell channel bandwidth and the cell subcarrier spacing; determining the first transport block set value based on the spectrum efficiency, the quantity of available resource blocks, the quantity of concurrent service links, and the quantity of space division layers; and dividing a product of the first transport block set value and a preset reliability value by the scheduling period to obtain the base station rate.

In this embodiment, when the base station rate is less than the target rate, 1 is added the MCS number, and then the base station rate is calculated based on a sum of the MCS number and 1, so that spectrum efficiency and the base station rate are also increased. An increment of the MCS number is not limited to 1, and may be alternatively another integer in [2, 14].

When the base station rate is greater than or equal to the target rate, an MCS number corresponding to the base station rate is used as the MCS number in the translation parameter. When the translation parameter is adjusted, the MCS number is not reduced. Therefore, a base station rate corresponding to an MCS number in a target translation parameter obtained after such adjustment is greater than or equal to the target rate. In this way, after the base station performs configuration based on the target translation parameter, requirements of the base station packet delay and the base station rate specified in the SLA can be met.

In another optional embodiment, after step 708, the foregoing data processing method further includes:
  calculating an average packet delay value based on a packet delay value of a sampling period;
  sending the average packet delay value to the data processing apparatus;
  receiving second cell channel bandwidth sent by the data processing apparatus, where the second cell channel bandwidth is obtained by the data processing apparatus when the average packet delay value is greater than the target packet delay, and the second cell channel bandwidth is higher than the first cell channel bandwidth;
  determining a second transport block set value based on the second cell channel bandwidth, the cell subcarrier spacing, the quantity of concurrent service links, the MCS number, and the quantity of space division layers;
  determining a third weighted value based on a result of comparison between the amount of to-be-scheduled data and the second transport block set value;
  determining the base station packet delay value based on the preset terminal processing delay, the preset base station processing delay, the first time division duplex air interface waiting delay, the preset time division duplex air interface transmission delay, the third weighted value, the second weighted value, and the quantity of retransmissions; and when the base station packet delay value is less than or equal to the target packet delay value, performing configuration based on the second cell channel bandwidth.

The base station packet delay value T determined based on the preset terminal processing delay $t_{ue}$, the preset base station processing delay $t_{bs}$, the first time division duplex air interface waiting delay $t_{tddwait}$, the preset time division duplex air interface transmission delay $t_{tddtran}$, the third weighted value $q_3$, the second weighted value $q_2$, and the quantity $N_r$ of retransmissions meets the following formula:

$$T=(t_{ue}+t_{bs}+t_{tddwait}+t_{tddtran}*q_1)*N_r*q_2.$$

In another optional embodiment,
  the base station configuration parameter further includes a first subframe ratio.
  After the scheduling service data based on a translation parameter corresponding to the base station packet delay value, the method further includes:
  calculating an average packet delay value based on a packet delay value of a sampling period;
  sending the average packet delay value to the data processing apparatus;
  receiving a second subframe ratio sent by the data processing apparatus, where the first subframe ratio is adjusted to the second subframe ratio by the data processing apparatus when the average packet delay value is greater than the target packet delay, the obtained first subframe ratio is a subframe ratio used by the base station in the sampling period, and the second subframe ratio includes more uplink subframes than the first subframe ratio;
  determining a second time division duplex air interface waiting delay based on the second subframe ratio;
  determining the base station packet delay based on the preset terminal processing delay, the preset base station processing delay, the second time division duplex air interface waiting delay, the preset time division duplex air interface transmission delay, the first weighted value, the second weighted value, and the quantity of retransmissions; and when the base station packet delay value is less than or equal to the target packet delay value, performing configuration based on the second subframe ratio.

The preset terminal processing delay $t_{ue}$, the preset base station processing delay $t_{bs}$, the second time division duplex air interface waiting delay $t_{tddwait}'$, the preset time division duplex air interface transmission delay $t_{tddtran}$, the first weighted value $q_1$, the second weighted value $q_2$, the quantity $N_r$ of retransmissions, and the base station packet delay T meet the following formula: $T=(t_{ue}+t_{bs}+t_{tddwait}'+t_{tddtran}*q_1)*N_r*q_2$.

In this embodiment, a process in which the base station adjusts the subframe ratio is similar to the foregoing process in which the data processing apparatus adjusts the subframe ratio. A base station packet delay in an uplink scheduling process can be reduced by increasing a quantity of uplink subframes in the subframe ratio. Similarly, a base station packet delay in a downlink scheduling process can be reduced by increasing a quantity of downlink subframes in the subframe ratio.

Figure 8:
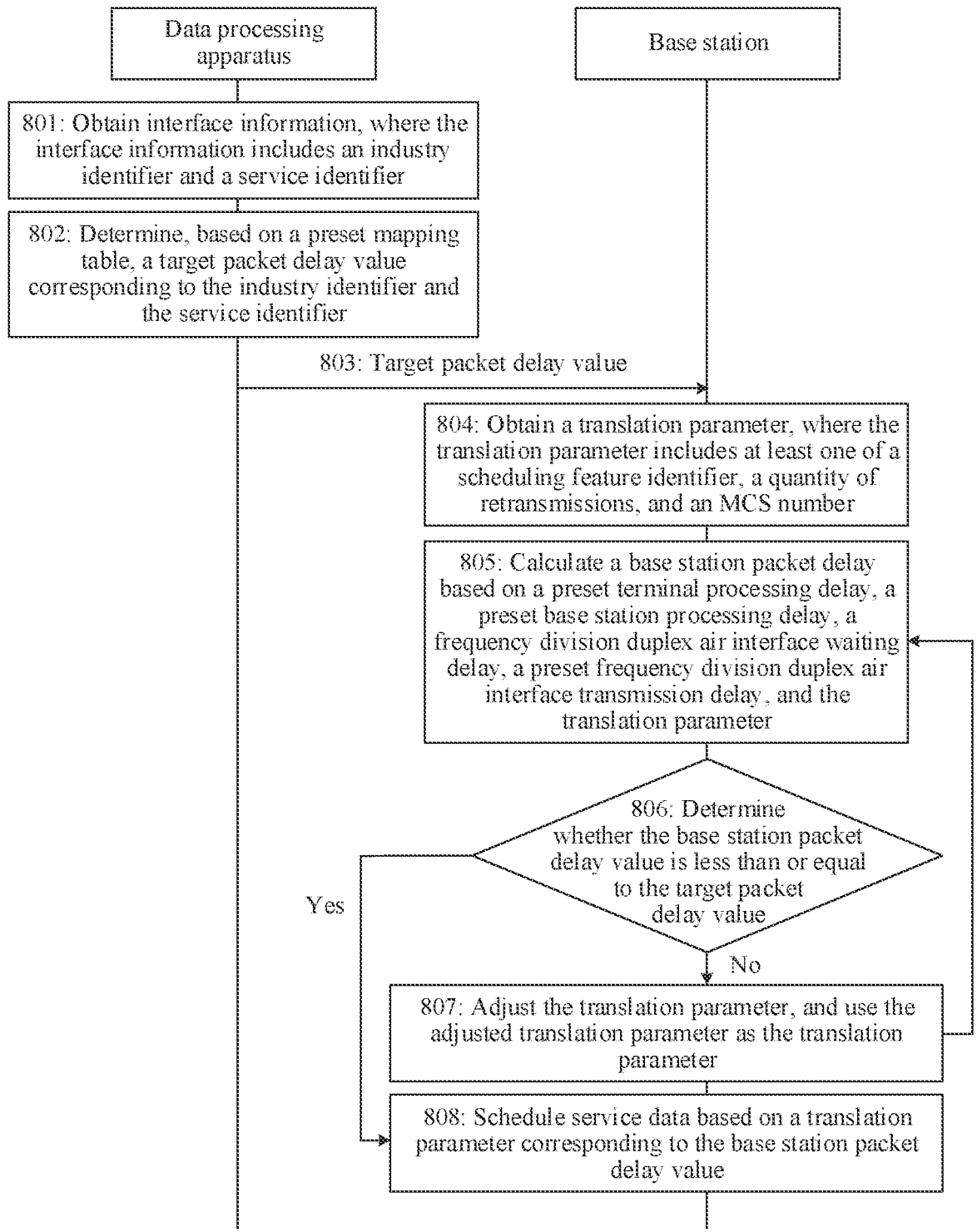
FIG. 8 is another schematic flowchart of a data processing method according to this application.

Referring to FIG. 8, another embodiment of a data processing method provided in this application includes the following steps.

Step 801: A data processing apparatus receives interface information, where the interface information includes an industry identifier and a service identifier.

Step 802: The data processing apparatus determines, based on a preset mapping table, a target packet delay value corresponding to the industry identifier and the service identifier.

Step 803: A base station receives the target packet delay value sent by the data processing apparatus.

Step 804: The base station obtains a translation parameter, where the translation parameter includes at least one of a scheduling feature identifier, a quantity of retransmissions, and an MCS number.

Step 805: The base station calculates a base station packet delay value based on a preset terminal processing delay, a preset base station processing delay, a frequency division duplex air interface waiting delay, a preset frequency division duplex air interface transmission delay, and the translation parameter.

Step 806: The base station determines whether the base station packet delay is less than or equal to the target packet delay value, and if yes, performs step 808, or if no, performs step 807.

Step 807: When the base station packet delay value is greater than the target packet delay value, adjust the translation parameter, use the adjusted translation parameter as the translation parameter, and trigger execution of step 805.

Step 808: When the base station packet delay value is less than or equal to the target packet delay value, schedule service data based on a translation parameter corresponding to the base station packet delay value, where the service data corresponds to the industry identifier and the service identifier.

In this embodiment, steps 801 to 804 are similar to steps 701 to 704 in the embodiment shown in FIG. 7, and steps 806 to 808 are similar to steps 706 to 708 in the embodiment shown in FIG. 7. In step 805, the preset frequency division duplex air interface waiting delay may be but is not limited to one slot, the preset frequency division duplex air interface transmission delay may be but is not limited to one slot, and the preset terminal processing delay and the preset base station processing delay may be but are not limited to eight slots. Based on the method in this embodiment, a base station packet delay value in a frequency division duplex scenario may be adjusted, so that the base station packet delay value packet can meet stipulation in an SLA.

In an embodiment:
the interface information further includes a quantity of concurrent service links and a service data packet size.

The calculating a base station packet delay value based on a preset terminal processing delay, a preset base station processing delay, a frequency division duplex air interface waiting delay, a preset frequency division duplex air interface transmission delay, and the translation parameter includes:

when the translation parameter includes the MCS number, the scheduling feature identifier, and the quantity of retransmissions, determining a first transport block set value based on first cell channel bandwidth, a cell subcarrier spacing, the quantity of concurrent service links, the MCS number, and a quantity of space division layers;

determining a first weighted value based on a result of comparison between the service data packet size and the first transport block set value;

determining a second weighted value based on the scheduling feature identifier; and determining the base station packet delay value based on the preset terminal processing delay, the preset base station processing delay, the frequency division duplex air interface waiting delay, the preset frequency division duplex air interface transmission delay, the first weighted value, the second weighted value, and the quantity of retransmissions, where the preset terminal processing delay $t_{ue}$, the preset base station processing delay $t_{bs}$, the frequency division duplex air interface waiting delay $t_{tddwait}$, the preset frequency division duplex air interface transmission delay $t_{tddtran}$, the first weighted value $q_1$, the second weighted value $q_2$, the quantity $N_r$ of retransmissions, and the base station packet delay value T meet the following formula:

$$T=(t_{ue}+t_{bs}+t_{tddwait}+t_{tddtran}*q_1)*N_r*q_2.$$

The base station packet delay value in the frequency division duplex scenario may be obtained through calculation based on the foregoing method.

Optionally, the determining a first transport block set value based on first cell channel bandwidth, a cell subcarrier spacing, the quantity of concurrent service links, the MCS number, and a quantity of space division layers includes: determining, based on a second preset mapping table, spectrum efficiency corresponding to the MCS number; determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers.

Optionally, the determining a first weighted value based on a result of comparison between the service data packet size and the first transport block set value includes: when the service data packet size is greater than the first transport block set value and the service data packet size can be exactly divided by the first transport block set value, determining that the first weighted value is equal to a quotient obtained after the service data packet size is divided by the first transport block set value; when the service data packet size is greater than the first transport block set value and the service data packet size cannot be exactly divided by the first transport block set value, determining that the first weighted value is equal to 1 plus a quotient obtained after the service data packet size is divided by the first transport block set value; or when the service data packet size is less than or equal to the first transport block set value, determining that the first weighted value is 1.

Optionally, the determining a second weighted value based on the scheduling feature identifier includes: when the scheduling feature identifier is a normal scheduling feature identifier, determining that the second weighted value is 3; or when the scheduling feature identifier is a pre-scheduling feature identifier, determining that the second weighted value is 1.

In the foregoing embodiment, the adjusting the translation parameter includes: adding 1 to the MCS number; and/or subtracting 1 from the quantity of retransmissions; and/or when the scheduling feature identifier is a normal scheduling feature identifier, adjusting the normal scheduling feature identifier to a pre-scheduling feature identifier.

Figure 9:
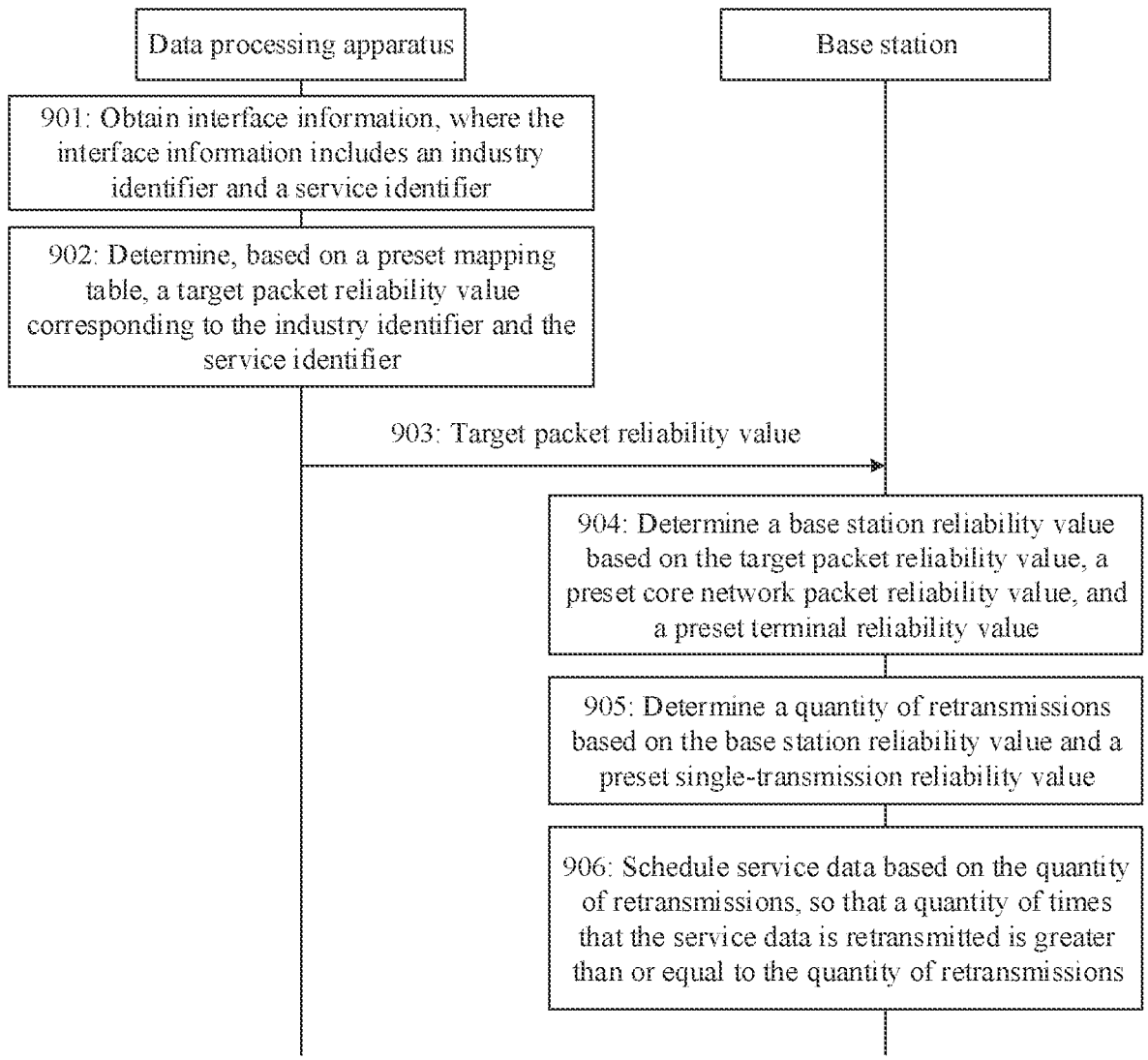
FIG. 9 is another schematic flowchart of a data processing method according to this application.

Referring to FIG. 9, another embodiment of a data processing method provided in this application includes the following steps.

Step 901: A data processing apparatus receives interface information, where the interface information includes an industry identifier and a service identifier.

Step 902: The data processing apparatus determines, based on a preset mapping table, a target packet delay value corresponding to the industry identifier and the service identifier.

Step 903: A base station receives a target packet reliability value sent by the data processing apparatus.

Step 904: The base station determines a base station reliability value based on the target packet reliability value, a preset core network packet reliability value, and a preset terminal reliability value.

Step 905: The base station determines a quantity of retransmissions based on the base station reliability value and a preset single-transmission reliability value.

Step 906: The base station schedules service data based on the quantity of retransmissions, so that a quantity of times that the service data is retransmitted is greater than or equal to the quantity of retransmissions. The service data corresponds to the industry identifier and the service identifier.

In this embodiment, steps 901 and 902 are similar to steps 801 and 802.

A process in which the base station determines the quantity of retransmissions is similar to the process in which the data processing apparatus determines the quantity of retransmissions in the embodiment shown in FIG. 4. For specific content, refer to the embodiment shown in FIG. 4. After the base station performs configuration based on the quantity of retransmissions, in a service scheduling process, a quantity of times that the base station retransmits the service data is greater than or equal to the quantity of retransmissions, so that a reliability requirement of an SLA can be met.

In an optional implementation, the target reliability value $k_0$, the preset core network reliability value $k_1$, the base station reliability value $k_2$, and the preset terminal reliability value $k_3$ meet a first formula:

$$k_0 \le k_1 * k_2 * k_3.$$

The base station reliability value $k_2$, the preset single-transmission reliability value $k'$, and the quantity $N_r$ of retransmissions meet a second formula:

$$k_2 \le 1 - \prod_{i=1}^{N_r}(1 - k').$$

Figure 10:
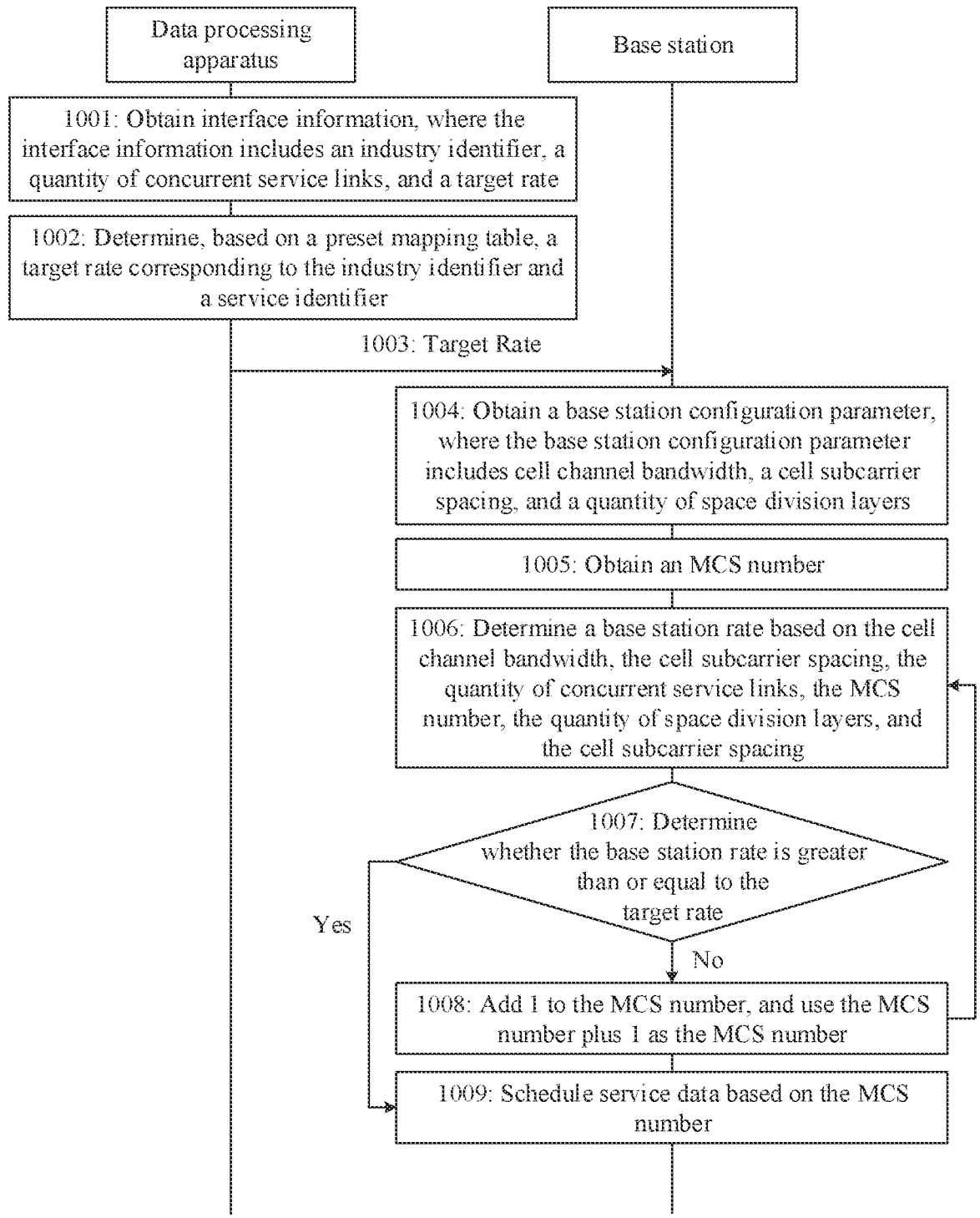
FIG. 10 is another schematic flowchart of a data processing method according to this application.

Referring to FIG. 10, another embodiment of a data processing method provided in this application includes the following steps.

Step 1001: A data processing apparatus obtains interface information, where the interface information includes an industry identifier, a service identifier, and a quantity of concurrent service links.

Step 1002: The data processing apparatus determines, based on a preset mapping table, a target rate corresponding to the industry identifier and the service identifier.

Step 1003: The data processing apparatus sends the target rate to the base station.

Step 1004: The base station obtains a base station configuration parameter, where the base station configuration parameter includes cell channel bandwidth, a cell subcarrier spacing, and a quantity of space division layers.

Step 1005: The base station obtains an MCS number.

Step 1006: The base station determines a base station rate based on the cell channel bandwidth, the cell subcarrier spacing, the quantity of concurrent service links, the MCS number, and the quantity of space division layers.

Step 1007: The base station determines whether the base station rate is greater than or equal to the target rate, and if yes, performs step 1009, or if no, performs step 1008.

Step 1008: When the base station rate is less than the target rate, add 1 to the MCS number, use the MCS number plus 1 as the MCS number, and trigger execution of step 1006.

Step 1009: When the base station rate is greater than or equal to the target rate, use an MCS number corresponding to the base station rate as a target MCS number, and perform configuration based on the target MCS number.

In this embodiment, steps 1001 to 1003 are similar to steps 501 to 503. A process in which the base station determines the MCS number is similar to the process in which the data processing apparatus determines the MCS number in the embodiment shown in FIG. 4. For specific content, refer to the embodiment shown in FIG. 4. The base station rate can be improved by gradually increasing the MCS number based on the foregoing method. When the base station rate is greater than or equal to the target rate, the MCS number corresponding to the base station rate is used as the target MCS number, and the target MCS number is sent to the base station. After the base station performs configuration by using the target MCS number, a base station rate at which service data is transmitted in a service scheduling process can meet a rate requirement of an SLA.

In an optional embodiment, step 1006 includes: determining a scheduling period based on the cell subcarrier spacing; determining spectrum efficiency corresponding to the MCS number; determining a quantity of available resource blocks corresponding to the cell channel bandwidth and the cell subcarrier spacing; determining a transport block set value based on the spectrum efficiency, the quantity of available resource blocks, the quantity of concurrent service links, and the quantity of space division layers; and dividing a product of the transport block set value and a preset reliability value by the scheduling period to obtain the base station rate.

Figure 11:
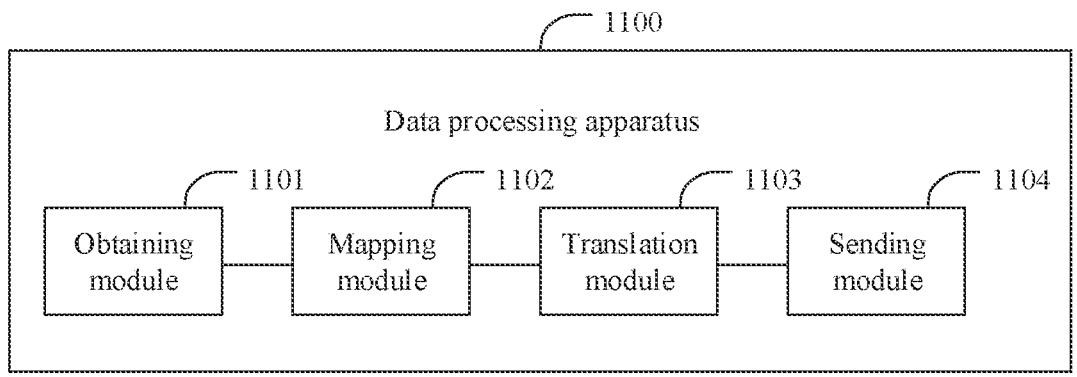
FIG. 11 is a schematic diagram of a structure of a data processing apparatus according to this application.

Referring to FIG. 11, this application provides a data processing apparatus 1100 that can implement the data processing method in the embodiment shown in FIG. 2. An embodiment of the data processing apparatus 1100 includes:

- an obtaining module 1101, configured to obtain interface information, where the interface information includes an industry identifier and a service identifier;
- a mapping module 1102, configured to determine, based on a first preset mapping table, a target packet delay value corresponding to the industry identifier and the service identifier;
- a translation module 1103, configured to obtain a translation parameter, where the translation parameter includes at least one of a scheduling feature identifier, a quantity of retransmissions, and a modulation and coding scheme MCS number, where
- the translation module 1103 is further configured to calculate a base station packet delay based on a preset terminal processing delay, a preset base station processing delay, a first time division duplex air interface waiting delay, a preset time division duplex air interface transmission delay, and the translation parameter;
- the translation module 1103 is further configured to: when the base station packet delay value is greater than the target packet delay value, adjust the translation parameter, use the adjusted translation parameter as the translation parameter, and trigger the translation module to perform the step of calculating a base station packet delay based on a preset terminal processing delay, a preset base station processing delay, a first time division duplex air interface waiting delay, a preset time division duplex air interface transmission delay, and the translation parameter; and
- the translation module 1103 is further configured to: when the base station packet delay value is less than or equal to the target packet delay value, use a translation parameter corresponding to the base station packet delay value as a target translation parameter; and
- a sending module 1104, configured to send the target translation parameter to a base station, so that the base station schedules service data based on the target translation parameter, where the service data corresponds to the industry identifier and the service identifier.

In an optional embodiment, the interface information further includes a quantity of concurrent service links, a service data packet size, and a service data packet interval;

the translation module 1103 is further configured to obtain a base station configuration parameter, where the base station configuration parameter includes first cell channel bandwidth, a cell subcarrier spacing, and a quantity of space division layers; and the translation module 1103 is specifically configured to perform the following steps:

dividing a product of the service data packet size and a time division duplex frame period by the service data packet interval, to obtain an amount of to-be-scheduled data in each time division duplex frame period;

when the translation parameter includes the MCS number, the scheduling feature identifier, and the quantity of retransmissions, determining a first transport block set value based on the first cell channel bandwidth, the cell subcarrier spacing, the quantity of concurrent service links, the MCS number, and the quantity of space division layers;

determining a first weighted value based on a result of comparison between the amount of to-be-scheduled data and the first transport block set value;

determining a second weighted value based on the scheduling feature identifier; and determining the base station packet delay based on the preset terminal processing delay, the preset base station processing delay, the first time division duplex air interface waiting delay, the preset time division duplex air interface transmission delay, the first weighted value, the second weighted value, and the quantity of retransmissions, where the preset terminal processing delay, the preset base station processing delay, the first time division duplex air interface waiting delay, the preset time division duplex air interface transmission delay, the first weighted value, the second weighted value, the quantity of retransmissions, and the base station packet delay meet the following formula:

$$T=(t_{ue}+t_{bs}+t_{tddwait}+t_{tddtran}*q_1)*N_r*q_2;$$

$t_{ue}$ is the preset terminal processing delay, $t_{bs}$ is the preset base station processing delay, $t_{tddwait}$ is the first time division duplex air interface waiting delay, $t_{tddtran}$ is the preset time division duplex air interface transmission delay, $q_1$ is the first weighted value, $N_r$ is the quantity of retransmissions, and $q_2$ is the second weighted value.

In another optional embodiment, the translation module 1103 is specifically configured to perform the following steps:

determining, based on a second preset mapping table, spectrum efficiency corresponding to the MCS number; determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers;

when the amount of to-be-scheduled data is greater than the first transport block set value and the amount of to-be-scheduled data can be exactly divided by the first transport block set value, determining that the first weighted value is equal to a quotient obtained after the amount of to-be-scheduled data is divided by the first transport block set value; when the amount of to-be-scheduled data is greater than the first transport block set value and the amount of to-be-scheduled data cannot be exactly divided by the first transport block set value, determining that the first weighted value is equal to 1 plus a quotient obtained after the amount of to-be-scheduled data is divided by the first transport block set value; or when the amount of to-be-scheduled data is less than or equal to the first transport block set value, determining that the first weighted value is equal to 1; and when the scheduling feature identifier is a normal scheduling feature identifier, determining that the second weighted value is 3; or when the scheduling feature identifier is a pre-scheduling feature identifier, determining that the second weighted value is 1.

In another optional embodiment, the translation module 1103 is specifically configured to perform the following steps:

adding 1 to the MCS number; and/or subtracting 1 from the quantity of retransmissions; and/or when the scheduling feature identifier is a normal scheduling feature identifier, adjusting the normal scheduling feature identifier to a pre-scheduling feature identifier.

In another optional embodiment,
the mapping module 1102 is further configured to: before the translation module adjusts the translation parameter, determine, based on a fourth preset mapping table, a target reliability value corresponding to the industry identifier and the service identifier;
the translation module 1103 is further configured to: determine a base station reliability value based on the target reliability value, a preset core network reliability value, and a preset terminal reliability value, where the target reliability value $k_0$, the preset core network reliability value $k_1$, the base station reliability value $k_2$, and the preset terminal reliability value $k_3$ meet a first formula:

$$k_0 \le k_1 * k_2 * k_3; \text{ and}$$

the translation module 1103 is further configured to determine a quantity of retransmissions threshold based on the base station reliability value and a preset single-transmission reliability value, where the base station reliability value $k_2$, the preset single-transmission reliability value $k'$, and the quantity of retransmissions threshold $N_r'$ meet a second formula:

$$k_2 \le 1 - \prod_{i=1}^{N_r'}(1-k');$$

and
the translation module 1103 is specifically configured to: when the quantity of retransmissions in the translation parameter is greater than the quantity of retransmissions threshold, add 1 to the MCS number, and/or subtract 1 from the quantity of retransmissions, and/or when the scheduling feature identifier is a normal scheduling feature identifier, adjust the normal scheduling feature identifier to a pre-scheduling feature identifier; or when the quantity of retransmissions in the translation parameter is less than or equal to the quantity of retransmissions threshold, adjust the quantity of retransmissions to be greater than the quantity of retransmissions threshold, and add 1 to the MCS number, and/or when the scheduling feature identifier is a normal scheduling feature identifier, adjust the normal scheduling feature identifier to a pre-scheduling feature identifier.

In another optional embodiment, the interface information further includes the quantity of concurrent service links; and
the mapping module 1102 is further configured to: after the translation module obtains the translation parameter, and before the translation module calculates the base station packet delay value based on the preset terminal processing delay, the preset base station processing delay, the first time division duplex air interface waiting delay, the preset time division duplex air interface transmission delay, and the translation parameter, determine, based on a fifth mapping table, a target rate corresponding to the industry identifier and the service identifier;
the translation module 1103 is further configured to obtain base station configuration information, where the base station configuration information includes the first cell channel bandwidth, the cell subcarrier spacing, and the quantity of space division layers;
the translation module 1103 is further configured to determine a base station rate based on the first cell channel bandwidth, the cell subcarrier spacing, the quantity of concurrent service links, the MCS number, and the quantity of space division layers;
the translation module 1103 is further configured to: when the base station rate is greater than or equal to the target rate, trigger execution of the step of calculating a base station packet delay value based on a preset terminal processing delay, a preset base station processing delay, a first time division duplex air interface waiting delay, a preset time division duplex air interface transmission delay, and the translation parameter; and
the translation module 1103 is further configured to: when the base station rate is less than the target rate, add 1 to the MCS number, use a sum of the MCS number and 1 as the MCS number, and trigger execution of the step of determining a base station rate based on the first cell channel bandwidth, the cell subcarrier spacing, the quantity of concurrent service links, the MCS number, and the quantity of space division layers.

In another optional embodiment,
the translation module 1103 is specifically configured to: determine a scheduling period based on the cell subcarrier spacing; determine spectrum efficiency corresponding to the MCS number; determine a quantity of available resource blocks corresponding to the first cell channel bandwidth and the cell subcarrier spacing; determine the first transport block set value based on the spectrum efficiency, the quantity of available resource blocks, the quantity of concurrent service links, and the quantity of space division layers; and divide a product of the first transport block set value and a preset reliability value by the scheduling period to obtain the base station rate.

In another optional embodiment, the data processing apparatus 1100 further includes:
a first key performance indicator monitoring module, configured to: after the sending module sends the target translation parameter to the base station, receive an average packet delay value sent by the base station; and
a first regulation module, configured to adjust the first cell channel bandwidth to second cell channel bandwidth when the average packet delay value is greater than the target packet delay, where the second cell channel bandwidth is higher than the first cell channel bandwidth;
the translation module 1103 is further configured to: determine a second transport block set value based on the second cell channel bandwidth, the cell subcarrier spacing, the quantity of concurrent service links, the MCS number, and the quantity of space division layers; determine a third weighted value based on a result of comparison between the amount of to-be-scheduled data and the second transport block set value; and determine the base station packet delay value based on the preset terminal processing delay, the preset base station processing delay, the first time division duplex air interface waiting delay, the preset time division duplex air interface transmission delay, the third weighted value, the second weighted value, and the quantity of retransmissions, where the base station packet delay determined based on the preset terminal processing delay, the preset base station processing delay, the first time division duplex air interface waiting delay, the preset time division duplex air interface transmission delay, the third weighted value, the second weighted value, and the quantity of retransmissions meets the following formula: $T=(t_{ue}+t_{bs}+t_{tddwait}+$ $t_{tddtran}*q_1)*N_r*q_2$, and $t_{ue}$ is the preset terminal processing delay, $t_{bs}$ is the preset base station processing delay, $t_{tddwait}$ is the first time division duplex air interface waiting delay, $t_{tddtran}$ is the preset time division duplex air interface transmission delay, $q_3$ is the third weighted value, $N_r$ is the quantity of retransmissions, and $q_2$ is the second weighted value; and the sending module 1104 is further configured to: when the base station packet delay value is less than or equal to the target packet delay value, send the second cell channel bandwidth to the base station.

In another optional embodiment, the base station configuration parameter further includes a first subframe ratio;

the data processing apparatus 1100 further includes:

a second key performance indicator monitoring module, configured to: after the sending module sends the target translation parameter to the base station, receive an average packet delay value sent by the base station; and a second regulation module, configured to adjust the first subframe ratio to a second subframe ratio when the average packet delay value is greater than the target packet delay, where the second subframe ratio includes more uplink subframes than the first subframe ratio;

the translation module 1103 is further configured to: determine a second time division duplex air interface waiting delay based on the second subframe ratio; and determine the base station packet delay based on the preset terminal processing delay, the preset base station processing delay, the second time division duplex air interface waiting delay, the preset time division duplex air interface transmission delay, the first weighted value, the second weighted value, and the quantity of retransmissions, where the base station packet delay determined based on the preset terminal processing delay, the preset base station processing delay $t_{bs}$, the second time division duplex air interface waiting delay $t_{tddwait}'$, the preset time division duplex air interface transmission delay $t_{tddtran}$, the first weighted value $q_1$, the second weighted value $q_2$, and the quantity $N_r$ of retransmissions meets the following formula: $T=(t_{ue}+t_{bs}+t_{tddwait}'+t_{tddtran}*q_1)*N_r*q_2$; and the sending module 1104 is further configured to: when the base station packet delay value is less than or equal to the target packet delay value, send the second subframe ratio to the base station.

Figure 12:
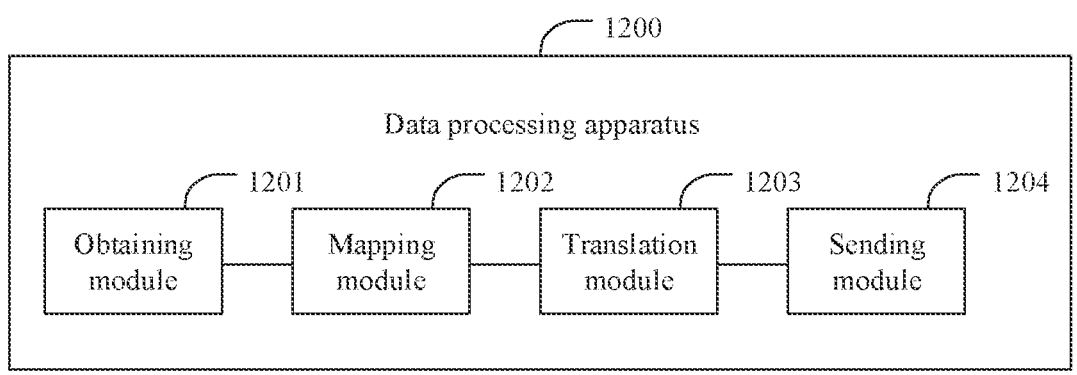
FIG. 12 is another schematic diagram of a structure of a data processing apparatus according to this application.

Referring to FIG. 12, this application provides a data processing apparatus 1200 that can implement the data processing method in the embodiment or the optional embodiment shown in FIG. 3. In an embodiment, the data processing apparatus 1200 includes:

an obtaining module 1201, configured to obtain interface information, where the interface information includes an industry identifier and a service identifier;

a mapping module 1202, configured to determine, based on a first preset mapping table, a target packet delay value corresponding to the industry identifier and the service identifier;

a translation module 1203, configured to obtain a translation parameter, where the translation parameter includes at least one of a scheduling feature identifier, a quantity of retransmissions, and a modulation and coding scheme MCS number, where the translation module 1203 is further configured to calculate a base station packet delay value based on a preset terminal processing delay, a preset base station processing delay, a frequency division duplex air interface waiting delay, a preset frequency division duplex air interface transmission delay, and the translation parameter;

the translation module 1203 is further configured to: when the base station packet delay value is greater than the target packet delay value, adjust the translation parameter, use the adjusted translation parameter as the translation parameter, and trigger execution of the step of calculating a base station packet delay value based on a preset terminal processing delay, a preset base station processing delay, a preset frequency division duplex air interface waiting delay, a preset frequency division duplex air interface transmission delay, and the translation parameter; and the translation module 1203 is further configured to: when the base station packet delay value is less than or equal to the target packet delay value, use a translation parameter corresponding to the base station packet delay value as a target translation parameter; and a sending module 1204, configured to send the target translation parameter to a base station, so that the base station schedules service data based on the target translation parameter, where the service data corresponds to the industry identifier and the service identifier.

In an optional embodiment, the interface information further includes a quantity of concurrent service links and a service data packet size; and the translation module 1203 is specifically configured to perform the following steps:

when the translation parameter includes the MCS number, the scheduling feature identifier, and the quantity of retransmissions, determining a first transport block set value based on first cell channel bandwidth, a cell subcarrier spacing, the quantity of concurrent service links, the MCS number, and a quantity of space division layers;

determining a first weighted value based on a result of comparison between the service data packet size and the first transport block set value;

determining a second weighted value based on the scheduling feature identifier; and determining the base station packet delay value based on the preset terminal processing delay, the preset base station processing delay, the frequency division duplex air interface waiting delay, the preset frequency division duplex air interface transmission delay, the first weighted value, the second weighted value, and the quantity of retransmissions, where the preset terminal processing delay $t_{ue}$, the preset base station processing delay $t_{bs}$, the frequency division duplex air interface waiting delay $t_{tddwait}$, the preset frequency division duplex air interface transmission delay $t_{tddtran}$, the first weighted value $q_1$, the second weighted value $q_2$, the quantity $N_r$ of retransmissions, and the base station packet delay value T meet the following formula:

$$T=(t_{ue}+t_{bs}+t_{tddwait}+t_{tddtran}*q_1)*N_r*q_2.$$

Optionally, the translation module 1203 is specifically configured to perform the following steps:

determining, based on a second preset mapping table, spectrum efficiency corresponding to the MCS number; determining, based on a third preset mapping table, a quantity of available resource blocks corresponding to the first cell channel bandwidth and the cell subcarrier spacing; and determining the first transport block set value based on the spectrum efficiency the quantity of available resource blocks, the quantity of concurrent service links, and the quantity of space division layers;

when the service data packet size is greater than the first transport block set value and the service data packet size can be exactly divided by the first transport block set value, determining that the first weighted value is equal to a quotient obtained after the service data packet size is divided by the first transport block set value; when the service data packet size is greater than the first transport block set value and the service data packet size cannot be exactly divided by the first transport block set value, determining that the first weighted value is equal to 1 plus a quotient obtained after the service data packet size is divided by the first transport block set value; or when the service data packet size is less than or equal to the first transport block set value, determining that the first weighted value is 1; and when the scheduling feature identifier is a normal scheduling feature identifier, determining that the second weighted value is 3; or when the scheduling feature identifier is a pre-scheduling feature identifier, determining that the second weighted value is 1.

In another optional embodiment, the translation module 1203 is specifically configured to: add 1 to the MCS number: and/or subtract 1 from the quantity of retransmissions; and/or when the scheduling feature identifier is a normal scheduling feature identifier, adjust the normal scheduling feature identifier to a pre-scheduling feature identifier.

Figure 13:
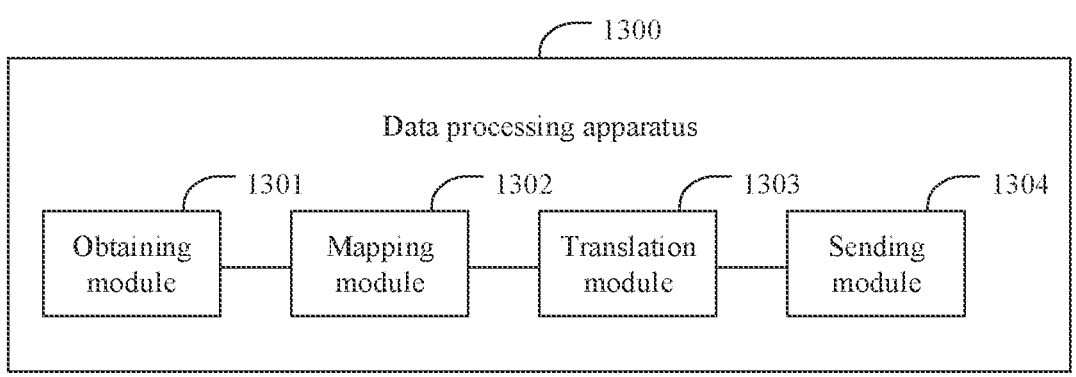
FIG. 13 is another schematic diagram of a structure of a data processing apparatus according to this application.

Referring to FIG. 13, this application provides a data processing apparatus 1300 that can implement the data processing method in the embodiment or the optional embodiment shown in FIG. 4. In an embodiment, the data processing apparatus 1300 includes:

an obtaining module 1301, configured to obtain interface information, where the interface information includes an industry identifier and a service identifier;

a mapping module 1302, configured to determine, based on a preset mapping table, a target packet reliability value corresponding to the industry identifier and the service identifier, where a translation module 1303 is further configured to: determine a base station reliability value based on the target packet reliability value, a preset core network packet reliability value, and a preset terminal reliability value; and determine a quantity of retransmissions based on the base station reliability value and a preset single-transmission reliability value; and a sending module 1304, configured to send the quantity of retransmissions to a base station, so that a quantity of times that the base station retransmits service data is greater than or equal to the quantity of retransmissions, where the service data corresponds to the industry identifier and the service identifier.

In an optional embodiment, the target reliability value $k_0$, the preset core network reliability value $k_1$, the base station reliability value $k_2$, and the preset terminal reliability value $k_3$ meet a first formula:

$$k_0 \le k_1 * k_2 * k_3;\text{ and}$$

the base station reliability value $k_2$, the preset single-transmission reliability value k', and the quantity $N_r$ of retransmissions meet a second formula:

$$k_2 \le 1 - \prod_{i=1}^{N_r}(1 - k').$$

Figure 14:
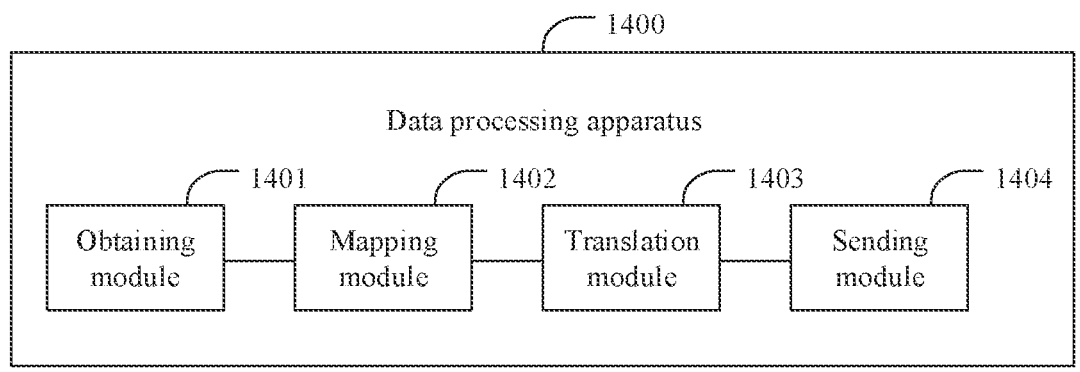
FIG. 14 is another schematic diagram of a structure of a data processing apparatus according to this application.

Referring to FIG. 14, this application provides a data processing apparatus 1400 that can implement the data processing method in the embodiment or the optional embodiment shown in FIG. 5. In an embodiment, the data processing apparatus 1400 includes:

an obtaining module 1401, configured to obtain interface information, where the interface information includes an industry identifier, a service identifier, and a quantity of concurrent service links;

a mapping module 1402, configured to determine, based on a preset mapping table, a target rate corresponding to the industry identifier and the service identifier;

a translation module 1403, configured to obtain a base station configuration parameter, where the base station configuration parameter includes cell channel bandwidth, a cell subcarrier spacing, and a quantity of space division layers, where the translation module 1403 is further configured to obtain an MCS number;

the translation module 1403 is further configured to determine a base station rate based on the cell channel bandwidth, the cell subcarrier spacing, the quantity of concurrent service links, the MCS number, and the quantity of space division layers;

the translation module 1403 is further configured to: when the base station rate is less than the target rate, add 1 to the MCS number, use a sum of the MCS number and 1 as the MCS number, and trigger the translation module to perform the step of determining a base station rate based on the cell channel bandwidth, the cell subcarrier spacing, the quantity of concurrent service links, the MCS number, and the quantity of space division layers; and the translation module 1403 is further configured to: when the base station rate is greater than or equal to the target rate, use an MCS number corresponding to the base station rate as a target MCS number; and a sending module 1404, configured to send the target MCS number to a base station, so that the base station performs configuration by using the target MCS number.

In an optional embodiment, the translation module 1403 is specifically configured to perform the following steps:

determining a scheduling period based on the cell subcarrier spacing;

determining spectrum efficiency corresponding to the MCS number;

determining a quantity of available resource blocks corresponding to the cell channel bandwidth and the cell subcarrier spacing;

determining a transport block set value based on the spectrum efficiency, the quantity of available resource blocks, the quantity of concurrent service links, and the quantity of space division layers; and dividing a product of the transport block set value and a preset single-transmission reliability value by the scheduling period to obtain the base station rate.

Figure 15:
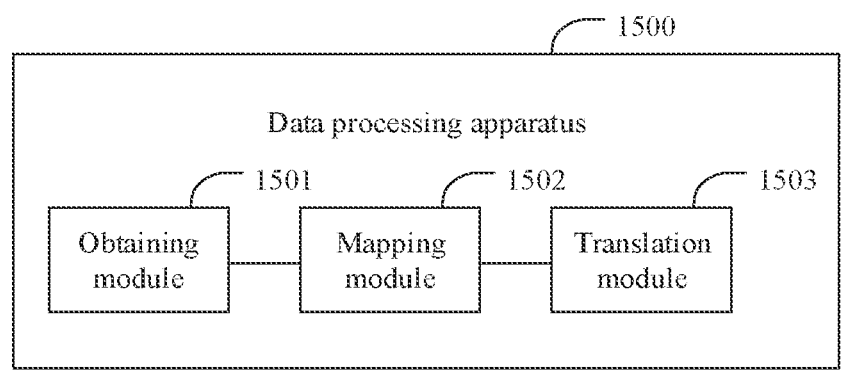
FIG. 15 is another schematic diagram of a structure of a data processing apparatus according to this application.

Referring to FIG. 15, this application provides a data processing apparatus that can implement functions of the data processing apparatus in the embodiment or the optional embodiment shown in FIG. 6. In an embodiment, the data processing apparatus 1500 includes:

an obtaining module 1501, configured to obtain interface information, where the interface information includes an industry identifier and a service identifier;

a mapping module 1502, configured to determine, based on a preset mapping table, a target availability value corresponding to the industry identifier and the service identifier; and a translation module 1503, configured to determine a base station availability value based on the target availability value and a preset quantity of base stations, where the translation module 1503 is further configured to: determine base station device configuration information based on the base station availability value, a preset availability value of a main control panel, a preset availability value of a baseband unit, and a preset availability value of a radio frequency unit, where the base station device configuration information includes a quantity of main control panels, a quantity of baseband units, and a quantity of radio frequency units; and the translation module 1503 is further configured to output the base station device configuration information.

In an optional embodiment, the target availability value $A_0$, the preset quantity $N_{bs}$ of base stations, and the base station availability value A meet a first formula:

$$A_0 = 1 - \prod_{j=1}^{N_{bs}}(1-A);$$

and the base station availability value A, the preset availability value $A_c$ of the main control panel, the preset availability value $A_b$ of the baseband unit, and the preset availability value $A_r$ of the radio frequency unit meet a second formula:

$$A = \left[1 - \prod_{i_1=1}^{n_c}(1-A_c)\right] * \left[1 - \prod_{i_2=1}^{n_b}(1-A_b)\right] * \left[1 - \prod_{i_3=1}^{n_r}(1-A_r)\right],$$

where $n_c$ is the quantity of main control panels, $n_b$ is the quantity of baseband units, and $n_r$ is the quantity of radio frequency units.

Figure 16:
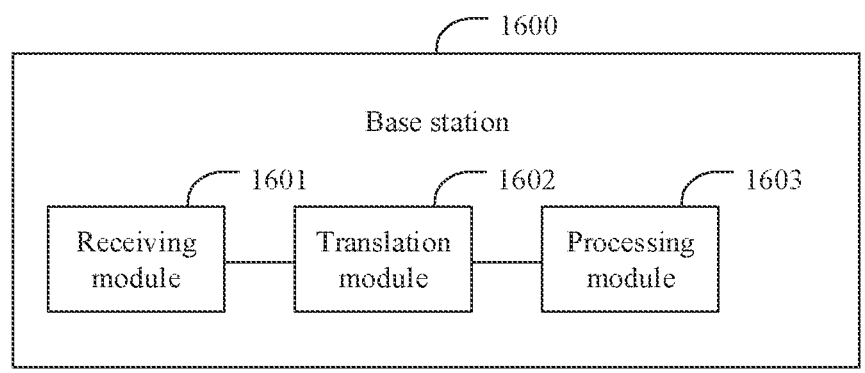
FIG. 16 is a schematic diagram of a structure of a base station according to this application.

Referring to FIG. 16, this application provides a base station 1600 that can implement functions of the base station in the embodiment or the optional embodiment shown in FIG. 7. In an embodiment, the base station 1600 includes:

a receiving module 1601, configured to receive a target packet delay value sent by a data processing apparatus, where the target packet delay value is determined by the data processing apparatus based on an industry identifier and a service identifier;

a translation module 1602, configured to obtain a translation parameter, where the translation parameter includes at least one of a scheduling feature identifier, a quantity of retransmissions, and an MCS number, where the translation module 1602 is further configured to calculate a base station packet delay based on a preset terminal processing delay, a preset base station processing delay, a first time division duplex air interface waiting delay, a preset time division duplex air interface transmission delay, and the translation parameter;

the translation module 1602 is further configured to: when the base station packet delay value is greater than the target packet delay value, adjust the translation parameter, use the adjusted translation parameter as the translation parameter, and trigger the translation module to perform the step of calculating a base station packet delay based on a preset terminal processing delay, a preset base station processing delay, a first time division duplex air interface waiting delay, a preset time division duplex air interface transmission delay, and the translation parameter; and the translation module 1602 is further configured to: when the base station packet delay value is less than or equal to the target packet delay value, use a translation parameter corresponding to the base station packet delay value as a target translation parameter; and a processing module 1603, configured to schedule service data based on a translation parameter corresponding to the base station packet delay value, where the service data corresponds to an industry identifier and a service identifier.

In an optional embodiment, the receiving module 1601 is further configured to receive a quantity of concurrent service links, a service data packet size, and a service data packet interval that are sent by the data processing apparatus;

the translation module 1602 is further configured to obtain a base station configuration parameter, where the base station configuration parameter includes first cell channel bandwidth, a cell subcarrier spacing, and a quantity of space division layers; and the translation module 1602 is specifically configured to perform the following steps:

dividing a product of the service data packet size and a time division duplex frame period by the service data packet interval, to obtain an amount of to-be-scheduled data in each time division duplex frame period;

when the translation parameter includes the MCS number, the scheduling feature identifier, and the quantity of retransmissions, determining a first transport block set value based on the first cell channel bandwidth, the cell subcarrier spacing, the quantity of concurrent service links, the MCS number, and the quantity of space division layers;

determining a first weighted value based on a result of comparison between the amount of to-be-scheduled data and the first transport block set value;

determining a second weighted value based on the scheduling feature identifier; and determining the base station packet delay based on the preset terminal processing delay, the preset base station processing delay, the first time division duplex air interface waiting delay, the preset time division duplex air interface transmission delay, the first weighted value, the second weighted value, and the quantity of retransmissions, where the base station packet delay value T determined based on the preset terminal processing delay $t_{ue}$, the preset base station processing delay $t_{bs}$, the first time division duplex air interface waiting delay $t_{tddwait}$, the preset time division duplex air interface transmission delay $t_{tddtran}$, the first weighted value $q_1$, the second weighted value $q_2$, and the quantity $N_r$ of retransmissions meets the following formula:

$$T=(t_{ue}+t_{bs}+t_{tddwait}+t_{tddtran}*q_1)*N_r*q_2.$$

In another optional embodiment,
the translation module 1602 is specifically configured to perform the following steps:
determining, based on a second preset mapping table, spectrum efficiency corresponding to the MCS number; determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers;
when the amount of to-be-scheduled data is greater than the first transport block set value and the amount of to-be-scheduled data can be exactly divided by the first transport block set value, determining that the first weighted value is a quotient obtained after the amount of to-be-scheduled data is divided by the first transport block set value; when the amount of to-be-scheduled data is greater than the first transport block set value and the amount of to-be-scheduled data cannot be exactly divided by the first transport block set value, determining that the first weighted value is 1 plus a quotient obtained after the amount of to-be-scheduled data is divided by the first transport block set value; or when the amount of to-be-scheduled data is less than or equal to the first transport block set value, determining that the first weighted value is 1; and
when the scheduling feature identifier is a normal scheduling feature identifier, determining that the second weighted value is 3; or when the scheduling feature identifier is a pre-scheduling feature identifier, determining that the second weighted value is 1.

In another optional embodiment, the translation module 1602 is specifically configured to perform the following steps:
adding 1 to the MCS number;
and/or
subtracting 1 from the quantity of retransmissions;
and/or
when the scheduling feature identifier is a normal scheduling feature identifier, adjusting the normal scheduling feature identifier to a pre-scheduling feature identifier.

In another optional embodiment,
the receiving module 1601 is further configured to receive a target reliability value sent by a data processing apparatus, where the target reliability value is determined by the data processing apparatus based on an industry identifier and a service identifier;
the translation module 1602 is further configured to determine a base station reliability value based on the target reliability value, a preset core network reliability value, and a preset terminal reliability value, where the target reliability value $k_0$, the preset core network reliability value $k_1$, the base station reliability value $k_2$, and the preset terminal reliability value $k_3$ meet a first formula: $k_0 \leq k_1 * k_2 * k_3$;
the translation module 1602 is further configured to determine a quantity of retransmissions threshold based on the base station reliability value and a preset single-transmission reliability value, where the base station reliability value $k_2$, the preset single-transmission reliability value $k'$, and the quantity of retransmissions threshold $N_r'$ meet a second formula:

$$k_2 \leq 1 - \prod_{i=1}^{N_r'}(1-k');$$

and
the translation module 1602 is specifically configured to: when the quantity of retransmissions in the translation parameter is greater than the quantity of retransmissions threshold, add 1 to the MCS number, and/or subtract 1 from the quantity of retransmissions, and/or when the scheduling feature identifier is a normal scheduling feature identifier, adjust the normal scheduling feature identifier to a pre-scheduling feature identifier; or when the quantity of retransmissions in the translation parameter is less than or equal to the quantity of retransmissions threshold, adjust the quantity of retransmissions to be greater than the quantity of retransmissions threshold, and add 1 to the MCS number, and/or when the scheduling feature identifier is a normal scheduling feature identifier, adjust the normal scheduling feature identifier to a pre-scheduling feature identifier.

In another optional embodiment,
the receiving module 1601 is further configured to receive the quantity of concurrent service links and a target rate that are sent by the data processing apparatus; and
the translation module 1602 is further configured to: obtain base station configuration information, where the base station configuration information includes the first cell channel bandwidth, the cell subcarrier spacing, and the quantity of space division layers; determine a base station rate based on the first cell channel bandwidth, the cell subcarrier spacing, the quantity of concurrent service links, the MCS number, and the quantity of space division layers; and when the base station rate is greater than or equal to the target rate, trigger execution of the step of calculating a base station packet delay value based on a preset terminal processing delay, a preset base station processing delay, a first time division duplex air interface waiting delay, a preset time division duplex air interface transmission delay, and the translation parameter; or when the base station rate is less than the target rate, add 1 to the MCS number, use a sum of the MCS number and 1 as the MCS number, and trigger execution of the step of determining a base station rate based on the first cell channel bandwidth, the cell subcarrier spacing, the quantity of concurrent service links, the MCS number, and the quantity of space division layers.

In another optional embodiment,
the translation module 1602 is specifically configured to: determine a scheduling period based on the cell subcarrier spacing; determine spectrum efficiency corresponding to the MCS number; determine a quantity of available resource blocks corresponding to the first cell channel bandwidth and the cell subcarrier spacing; determine the first transport block set value based on the spectrum efficiency, the quantity of available resource blocks, the quantity of concurrent service links, and the quantity of space division layers; and divide a product of the first transport block set value and a preset reliability value by the scheduling period to obtain the base station rate.

Figure 17:
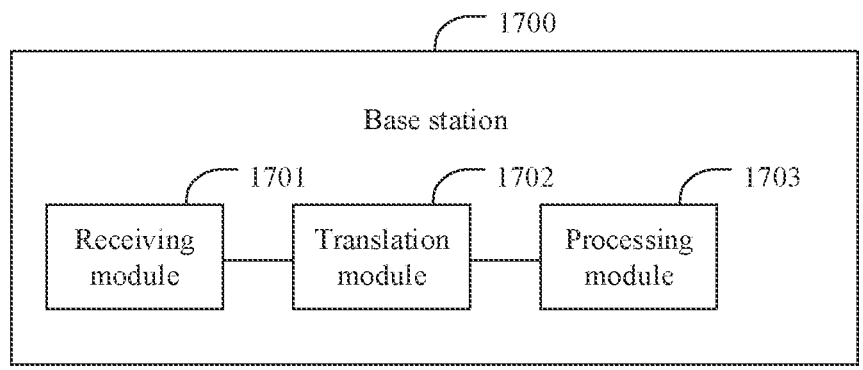
FIG. 17 is another schematic diagram of a structure of a base station according to this application.

Referring to FIG. 17, this application provides a base station 1700 that can implement functions of the base station in the embodiment or the optional embodiment shown in FIG. 8. An embodiment of the base station 1700 includes:
a receiving module 1701, configured to receive a target packet delay value sent by a data processing apparatus, where the target packet delay value is determined by the data processing apparatus based on an industry identifier and a service identifier;
a translation module 1702, configured to obtain a translation parameter, where the translation parameter includes at least one of a scheduling feature identifier, a quantity of retransmissions, and a modulation and coding scheme MCS number, where
the translation module 1702 is further configured to calculate a base station packet delay value based on a preset terminal processing delay, a preset base station processing delay, a frequency division duplex air interface waiting delay, a preset frequency division duplex air interface transmission delay, and the translation parameter; and
the translation module 1702 is further configured to: when the base station packet delay value is greater than the target packet delay value, adjust the translation parameter, use the adjusted translation parameter as the translation parameter, and trigger execution of the step of calculating a base station packet delay value based on a preset terminal processing delay, a preset base station processing delay, a preset frequency division duplex air interface waiting delay, a preset frequency division duplex air interface transmission delay, and the translation parameter; and
a processing module 1703, configured to: when the base station packet delay value is less than or equal to the target packet delay value, schedule service data based on a translation parameter corresponding to the base station packet delay value, where the service data corresponds to the industry identifier and the service identifier.

In an optional embodiment,
when the interface information further includes a quantity of concurrent service links and a service data packet size, the translation module 1702 is specifically configured to perform the following steps:
when the translation parameter includes the MCS number, the scheduling feature identifier, and the quantity of retransmissions, determining a first transport block set value based on first cell channel bandwidth, a cell subcarrier spacing, the quantity of concurrent service links, the MCS number, and a quantity of space division layers;
determining a first weighted value based on a result of comparison between the service data packet size and the first transport block set value;
determining a second weighted value based on the scheduling feature identifier; and
determining the base station packet delay value based on the preset terminal processing delay, the preset base station processing delay, the frequency division duplex air interface waiting delay, the preset frequency division duplex air interface transmission delay, the first weighted value, the second weighted value, and the quantity of retransmissions, where the preset terminal processing delay $t_{ue}$, the preset base station processing delay $t_{bs}$, the frequency division duplex air interface waiting delay $t_{tddwait}$, the preset frequency division duplex air interface transmission delay $t_{tddtran}$, the first weighted value $q_1$, the second weighted value $q_2$, the quantity $N_r$ of retransmissions, and the base station packet delay value T meet the following formula:

$$T=(t_{ue}+t_{bs}+t_{tddwait}+t_{tddtran}*q_1)*N_r*q_2.$$

In another optional embodiment,
the translation module 1702 is specifically configured to: determine, based on a second preset mapping table, spectrum efficiency corresponding to the MCS number; determine, based on a third preset mapping table, a quantity of available resource blocks corresponding to the first cell channel bandwidth and the cell subcarrier spacing; and determine the first transport block set value based on the spectrum efficiency, the quantity of available resource blocks, the quantity of concurrent service links, and the quantity of space division layers;
when the service data packet size is greater than the first transport block set value and the service data packet size can be exactly divided by the first transport block set value, determine that the first weighted value is a quotient obtained after the service data packet size is divided by the first transport block set value; when the service data packet size is greater than the first transport block set value and the service data packet size cannot be exactly divided by the first transport block set value, determine that the first weighted value is 1 plus a quotient obtained after the service data packet size is divided by the first transport block set value; or when the service data packet size is less than or equal to the first transport block set value, determine that the first weighted value is 1; and
when the scheduling feature identifier is a normal scheduling feature identifier, determining that the second weighted value is 3; or when the scheduling feature identifier is a pre-scheduling feature identifier, determining that the second weighted value is 1.

In another optional embodiment,
the translation module 1702 is specifically configured to: add 1 to the MCS number; and/or subtract 1 from the quantity of retransmissions; and/or when the scheduling feature identifier is a normal scheduling feature identifier, adjust the normal scheduling feature identifier to a pre-scheduling feature identifier.

Figure 18:
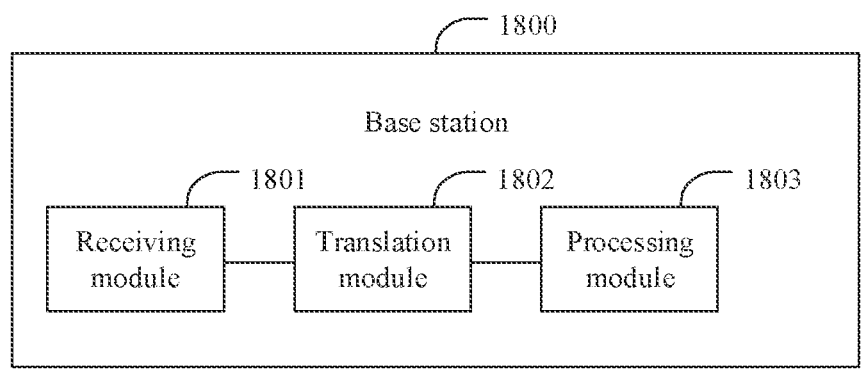
FIG. 18 is another schematic diagram of a structure of a base station according to this application.

Referring to FIG. 18, this application provides a base station 1800 that can implement the data processing method in the embodiment or the optional embodiment shown in FIG. 9. In an optional embodiment, the base station 1800 includes:
a receiving module 1801, configured to receive a target packet reliability value sent by a data processing apparatus, where the target packet reliability value is determined by the data processing apparatus based on an industry identifier and a service identifier;
a translation module 1802, configured to determine a base station reliability value based on the target packet reliability value, a preset core network packet reliability value, and a preset terminal reliability value, where the translation module 1802 is further configured to determine a quantity of retransmissions based on the base station reliability value and a preset single-transmission reliability value; and
a processing module 1803, configured to schedule service data based on the quantity of retransmissions, so that a quantity of times that the service data is retransmitted is greater than or equal to the quantity of retransmissions, where the service data corresponds to the industry identifier and the service identifier.

In an optional embodiment, the target reliability value $k_0$, the preset core network reliability value $k_1$, the base station reliability value $k_2$, and the preset terminal reliability value $k_3$ meet a first formula:

$$k_0 \le k_1 * k_2 * k_3;\text{ and}$$

the base station reliability value $k_2$, the preset single-transmission reliability value k', and the quantity $N_r$ of retransmissions meet a second formula:

$$k_2 \le 1 - \prod_{i=1}^{N_r}(1-k').$$

Figure 19:
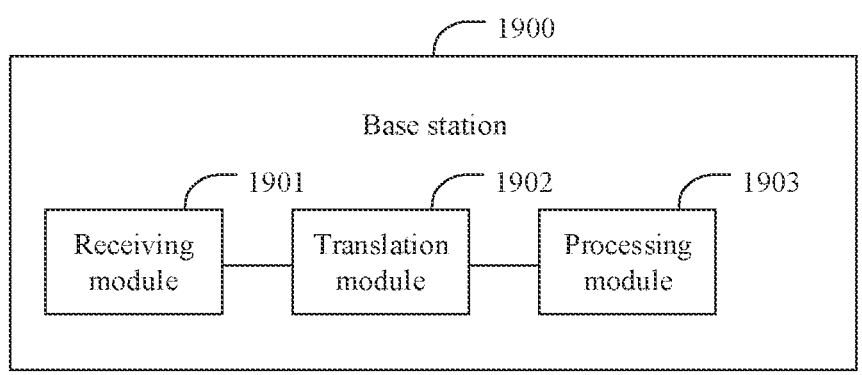
FIG. 19 is another schematic diagram of a structure of a base station according to this application.

Referring to FIG. 19, this application provides a base station 1900 that can implement functions of the base station in the embodiment or the optional embodiment shown in FIG. 10. In an embodiment, the base station 1900 includes:

a receiving module 1901, configured to receive a target rate sent by a data processing apparatus, where the target rate is determined by the data processing apparatus based on an industry identifier and a service identifier;

a translation module 1902, configured to obtain a base station configuration parameter, where the base station configuration parameter includes cell channel bandwidth, a cell subcarrier spacing, and a quantity of space division layers, where the translation module 1902 is further configured to obtain an MCS number;

the translation module 1902 is further configured to determine a base station rate based on the cell channel bandwidth, the cell subcarrier spacing, a quantity of concurrent service links, the MCS number, and the quantity of space division layers;

the translation module 1902 is further configured to: when the base station rate is less than the target rate, add 1 to the MCS number, use a sum of the MCS number and 1 as the MCS number, and trigger execution of the step of determining a base station rate based on the cell channel bandwidth, the cell subcarrier spacing, a quantity of concurrent service links, the MCS number, and the quantity of space division layers; and the translation module 1902 is further configured to: when the base station rate is greater than or equal to the target rate, use an MCS number corresponding to the base station rate as a target MCS number; and a processing module 1903, configured to perform configuration based on the target MCS number.

In another optional embodiment, the translation module 1902 is specifically configured to perform the following steps:

determining a scheduling period based on the cell subcarrier spacing;

determining spectrum efficiency corresponding to the MCS number;

determining a quantity of available resource blocks corresponding to the cell channel bandwidth and the cell subcarrier spacing;

determining a transport block set value based on the spectrum efficiency, the quantity of available resource blocks, the quantity of concurrent service links, and the quantity of space division layers; and dividing a product of the transport block set value and a preset reliability value by the scheduling period to obtain the base station rate.

Figure 20:
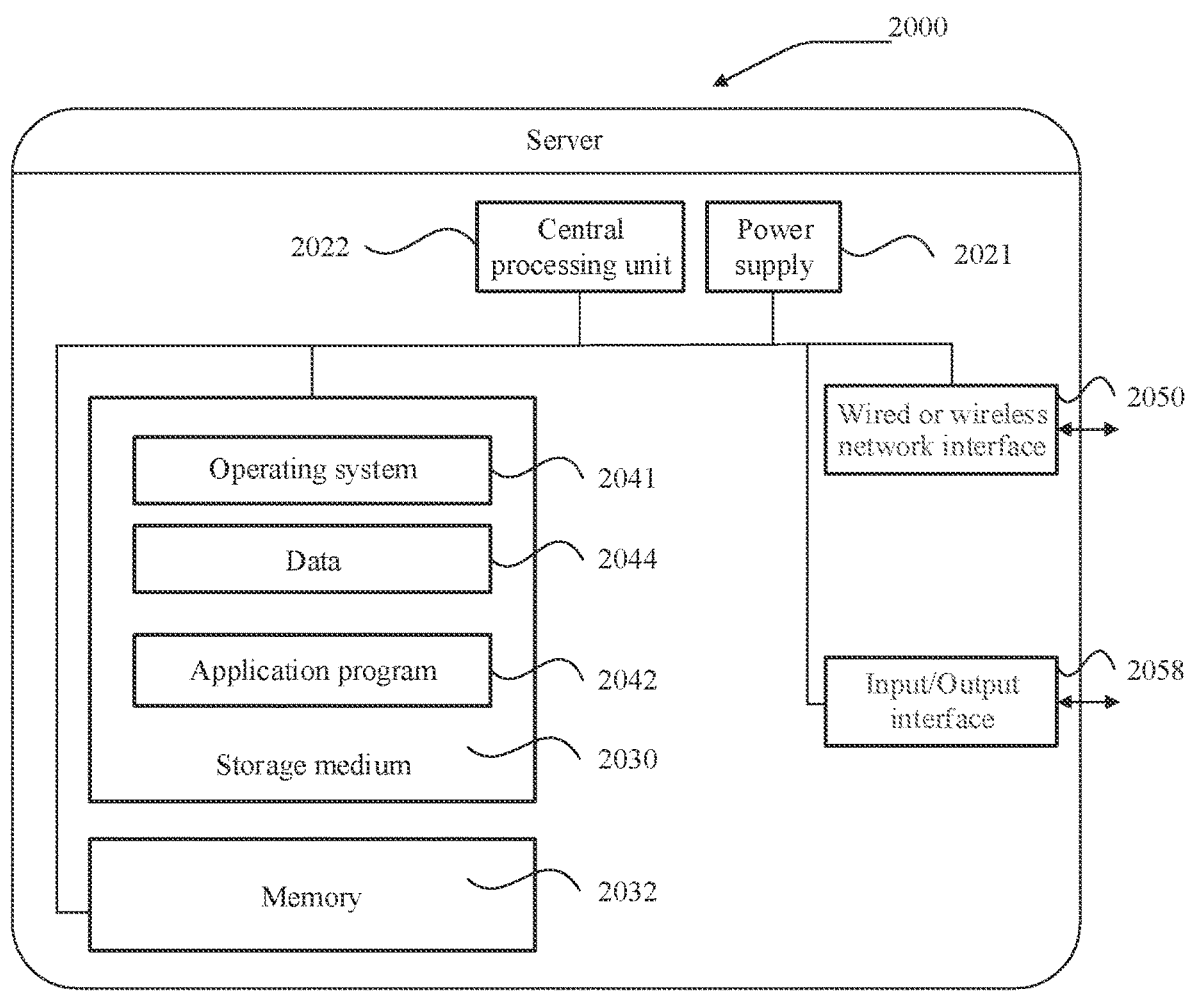
FIG. 20 is another schematic diagram of a structure of a data processing apparatus according to this application.

FIG. 20 is a schematic diagram of a structure of a server according to an embodiment of this application. The server 2000 may have a large difference due to different configurations or performance, and may include one or more central processing units (central processing units, CPU) 2022 (for example, one or more processors), a memory 2032, and one or more storage media 2030 (for example, one or more mass storage devices) that store an application program 2042 or data 2044. The memory 2032 and the storage medium 2030 may be used for temporary storage or permanent storage. A program stored in the storage medium 2030 may include one or more modules (not shown in the figure), and each module may include a series of instruction operations for the server. Further, the central processing unit 2022 may be configured to communicate with the storage medium 2030, to perform, on the server 2000, a series of instruction operations in the storage medium 2030.

The server 2000 may further include one or more power supplies 2021, one or more wired or wireless network interfaces 2050, one or more input/output interfaces 2058, and/or one or more operating systems 2041 such as Windows Server™, Mac OS X™, Unix™, Linux™, and FreeBSD™.

Steps performed by the data processing apparatus in the foregoing embodiments may be based on the server structure shown in FIG. 20.

Figure 21:
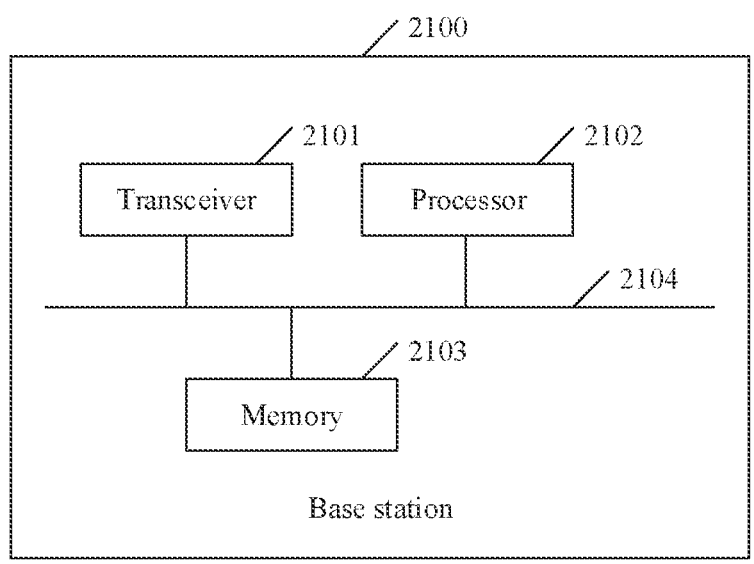
FIG. 21 is another schematic diagram of a structure of a base station according to this application.

FIG. 21 is another schematic diagram of a structure of a base station according to this application. In an embodiment, abase station 2100 includes a transceiver 2101, a processor 2102, and a memory 2103. The transceiver 2101, the processor 2102, and the memory 2103 are connected through a bus 2104. There may be one or more transceivers 2101, processors 2102, and memories 2103.

The transceiver 2101 is configured to transmit and receive a wireless signal. The transceiver 2101 may be specifically a radio frequency unit. The transceiver 2101 may include a receiving unit and a transmitting unit that are independent of each other, or may include a receiving unit and a transmitting unit that are integrated together.

The processor 2102 may be a central processing unit (central processing unit. CPU), a network processor (network processor, NP), a digital signal processor (digital signal processor, DSP), an application-specific integrated circuit (application-specific integrated circuit, ASIC), a field programmable gate array (field programmable gate array, FPGA), another programmable logic device, or the like.

The memory 2103 may include a random access memory (random access memory, RAM), or may include a non-volatile memory (non-volatile memory, NVM), for example, at least one magnetic disk memory.

The processor 2102 can implement functions of the base station in the foregoing embodiments, by executing program code stored in the memory 2103.

The base station 2100 may further include a wired network interface, a power supply, and the like. Details are not described herein again.

This application provides a computer-readable storage medium, including instructions. When the instructions are run on a computer, the computer is enabled to perform the data processing method in any one of the foregoing embodiments.

All or some of the foregoing embodiments may be implemented by using software, hardware, firmware, or any combination thereof. When software is used to implement embodiments, all or some of embodiments may be implemented in a form of a computer program product.

The computer program product includes one or more computer instructions. When the computer program instructions are loaded and executed on a computer, the procedures or the functions according to embodiments of this application are completely or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (Solid State Drive, SSD)), or the like.

The foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. A data processing method, comprising:
   obtaining interface information, wherein the interface information comprises an industry identifier and a service identifier;
   determining, based on a first preset mapping table, a target packet delay value corresponding to the industry identifier and the service identifier;
   obtaining a translation parameter, wherein the translation parameter comprises at least one of a scheduling feature identifier, a quantity of retransmissions, and a modulation and coding scheme (MCS) number;
   calculating a base station packet delay value based on a preset terminal processing delay, a preset base station processing delay, a first time division duplex air interface waiting delay, a preset time division duplex air interface transmission delay, and the translation parameter; and
   when the base station packet delay value is greater than the target packet delay value, adjusting the translation parameter, using the adjusted translation parameter as the translation parameter, and triggering execution of the step of calculating a base station packet delay value based on a preset terminal processing delay, a preset base station processing delay, a preset time division duplex air interface waiting delay, a preset time division duplex air interface transmission delay, and the translation parameter; or
   when the base station packet delay value is less than or equal to the target packet delay value, using a translation parameter corresponding to the base station packet delay value as a target translation parameter, and sending the target translation parameter to a base station to schedule service data based on the target translation parameter, wherein the service data corresponds to the industry identifier and the service identifier.

2. The method according to claim 1, wherein:
   the interface information further comprises a quantity of concurrent service links, a service data packet size, and a service data packet interval;
   the method further comprises: obtaining a base station configuration parameter, wherein the base station configuration parameter comprises first cell channel bandwidth, a cell subcarrier spacing, and a quantity of space division layers; and
   the calculating a base station packet delay value based on a preset terminal processing delay, a preset base station processing delay, a first time division duplex air interface waiting delay, a preset time division duplex air interface transmission delay, and the translation parameter comprises:
   dividing a product of the service data packet size and a time division duplex frame period by the service data packet interval to obtain an amount of to-be-scheduled data in each time division duplex frame period;
   when the translation parameter comprises the MCS number, the scheduling feature identifier, and the quantity of retransmissions, determining a first transport block set value based on the first cell channel bandwidth, the cell subcarrier spacing, the quantity of concurrent service links, the MCS number, and the quantity of space division layers;
   determining a first weighted value based on a result of comparison between the amount of to-be-scheduled data and the first transport block set value;
   determining a second weighted value based on the scheduling feature identifier; and
   determining the base station packet delay value based on the preset terminal processing delay, the preset base station processing delay, the first time division duplex air interface waiting delay, the preset time division duplex air interface transmission delay, the first weighted value, the second weighted value, and the quantity of retransmissions, wherein the preset terminal processing delay $t_{ue}$, the preset base station processing delay $t_{bs}$, the first time division duplex air interface waiting delay $t_{tddwait}$, the preset time division duplex air interface transmission delay $t_{tddtran}$, the first weighted value $q_1$, the second weighted value $q_2$, the quantity $N_r$ of retransmissions, and the base station packet delay value T meet the following formula:

$$T=(t_{ue}+t_{bs}+t_{tddwait}+t_{tddtran}*q_1)*N_r*q_2.$$

3. The method according to claim 2, wherein:
   the determining a first transport block set value based on the first cell channel bandwidth, the cell subcarrier spacing, the quantity of concurrent service links, the MCS number, and the quantity of space division layers comprises:
   determining, based on a second preset mapping table, spectrum efficiency corresponding to the MCS number;
   determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers;

the determining a first weighted value based on a result of comparison between the amount of to-be-scheduled data and the first transport block set value comprises:

when the amount of to-be-scheduled data is greater than the first transport block set value and the amount of to-be-scheduled data can be exactly divided by the first transport block set value, determining that the first weighted value is equal to a quotient obtained after the amount of to-be-scheduled data is divided by the first transport block set value;

when the amount of to-be-scheduled data is greater than the first transport block set value and the amount of to-be-scheduled data cannot be exactly divided by the first transport block set value, determining that the first weighted value is equal to 1 plus a quotient obtained after the amount of to-be-scheduled data is divided by the first transport block set value; or when the amount of to-be-scheduled data is less than or equal to the first transport block set value, determining that the first weighted value is equal to 1; and the determining a second weighted value based on the scheduling feature identifier comprises:

when the scheduling feature identifier is a normal scheduling feature identifier, determining that the second weighted value is 3; or when the scheduling feature identifier is a pre-scheduling feature identifier, determining that the second weighted value is 1.

4. The method according to claim 1, wherein the adjusting the translation parameter comprises at least one of:

adding 1 to the MCS number;

subtracting 1 from the quantity of retransmissions; or when the scheduling feature identifier is a normal scheduling feature identifier, adjusting the normal scheduling feature identifier to a pre-scheduling feature identifier.

5. The method according to claim 1, wherein before the adjusting the translation parameter, the method further comprises:

determining, based on a fourth preset mapping table, a target reliability value corresponding to the industry identifier and the service identifier;

determining a base station reliability value based on the target reliability value, a preset core network reliability value, and a preset terminal reliability value, wherein the target reliability value $k_0$, the preset core network reliability value $k_1$, the base station reliability value $k_2$, and the preset terminal reliability value $k_3$ meet a first formula:

$k_0 \leq k_1 * k_2 * k_3$; and determining a quantity of retransmissions threshold based on the base station reliability value and a preset single-transmission reliability value, wherein the base station reliability value $k_2$, the preset single-transmission reliability value k', and the quantity of retransmissions threshold $N_r'$ meet a second formula:

$$k_2 \leq 1 - \prod_{i=1}^{N_r'}(1 - k');$$

and wherein the adjusting the translation parameter comprises at least one of:

when the quantity of retransmissions in the translation parameter is greater than the quantity of retransmissions threshold, at least one of adding 1 to the MCS number, subtracting 1 from the quantity of retransmissions, or when the scheduling feature identifier is a normal scheduling feature identifier, adjusting the normal scheduling feature identifier to a pre-scheduling feature identifier; or when the quantity of retransmissions in the translation parameter is less than or equal to the quantity of retransmissions threshold, adjusting the quantity of retransmissions to be greater than the quantity of retransmissions threshold, and at least one of adding 1 to the MCS number, or when the scheduling feature identifier is a normal scheduling feature identifier, adjusting the normal scheduling feature identifier to a pre-scheduling feature identifier.

6. The method according to claim 1, wherein:

the interface information further comprises a quantity of concurrent service links; and after the obtaining a translation parameter and before the calculating a base station packet delay value based on a preset terminal processing delay, a preset base station processing delay, a first time division duplex air interface waiting delay, a preset time division duplex air interface transmission delay, and the translation parameter, the method further comprises:

determining, based on a fifth mapping table, a target rate corresponding to the industry identifier and the service identifier;

obtaining base station configuration information, wherein the base station configuration information comprises first cell channel bandwidth, cell subcarrier spacing, and a quantity of space division layers;

determining a base station rate based on the first cell channel bandwidth, the cell subcarrier spacing, the quantity of concurrent service links, the MCS number, and the quantity of space division layers; and when the base station rate is greater than or equal to the target rate, triggering execution of the step of calculating a base station packet delay value based on a preset terminal processing delay, a preset base station processing delay, a first time division duplex air interface waiting delay, a preset time division duplex air interface transmission delay, and the translation parameter; or when the base station rate is less than the target rate, adding 1 to the MCS number, using a sum of the MCS number and 1 as the MCS number, and triggering execution of the step of determining a base station rate based on the first cell channel bandwidth, the cell subcarrier spacing, the quantity of concurrent service links, the MCS number, and the quantity of space division layers.

7. The method according to claim 6, wherein the determining a base station rate based on the first cell channel bandwidth, the cell subcarrier spacing, the quantity of concurrent service links, the MCS number, and the quantity of space division layers comprises:

determining a scheduling period based on the cell subcarrier spacing;

determining spectrum efficiency corresponding to the MCS number;

determining a quantity of available resource blocks corresponding to the first cell channel bandwidth and the cell subcarrier spacing;

determining a first transport block set value based on the spectrum efficiency, the quantity of available resource blocks, the quantity of concurrent service links, and the quantity of space division layers; and dividing a product of the first transport block set value and a preset reliability value by the scheduling period to obtain the base station rate.

8. A data processing device, comprising:

at least one processor; and a memory coupled to the at least one processor, the memory comprising instructions that, when executed by the at least one processor, cause the data processing device to perform operations comprising:

obtaining interface information, wherein the interface information comprises an industry identifier and a service identifier;

determining, based on a first preset mapping table, a target packet delay value corresponding to the industry identifier and the service identifier;

obtaining a translation parameter, wherein the translation parameter comprises at least one of a scheduling feature identifier, a quantity of retransmissions, and a modulation and coding scheme (MCS) number;

calculating a base station packet delay value based on a preset terminal processing delay, a preset base station processing delay, a first time division duplex air interface waiting delay, a preset time division duplex air interface transmission delay, and the translation parameter; and when the base station packet delay value is greater than the target packet delay value, adjusting the translation parameter, using the adjusted translation parameter as the translation parameter, and triggering execution of the step of calculating a base station packet delay value based on a preset terminal processing delay, a preset base station processing delay, a preset time division duplex air interface waiting delay, a preset time division duplex air interface transmission delay, and the translation parameter; or when the base station packet delay value is less than or equal to the target packet delay value, using a translation parameter corresponding to the base station packet delay value as a target translation parameter, and sending the target translation parameter to a base station to schedule service data based on the target translation parameter, wherein the service data corresponds to the industry identifier and the service identifier.

9. The data processing device according to claim 8, wherein:

the interface information further comprises a quantity of concurrent service links, a service data packet size, and a service data packet interval;

the operations further comprise: obtaining a base station configuration parameter, wherein the base station configuration parameter comprises first cell channel bandwidth, a cell subcarrier spacing, and a quantity of space division layers; and the calculating a base station packet delay value based on a preset terminal processing delay, a preset base station processing delay, a first time division duplex air interface waiting delay, a preset time division duplex air interface transmission delay, and the translation parameter comprises:

dividing a product of the service data packet size and a time division duplex frame period by the service data packet interval to obtain an amount of to-be-scheduled data in each time division duplex frame period;

when the translation parameter comprises the MCS number, the scheduling feature identifier, and the quantity of retransmissions, determining a first transport block set value based on the first cell channel bandwidth, the cell subcarrier spacing, the quantity of concurrent service links, the MCS number, and the quantity of space division layers;

determining a first weighted value based on a result of comparison between the amount of to-be-scheduled data and the first transport block set value;

determining a second weighted value based on the scheduling feature identifier; and determining the base station packet delay value based on the preset terminal processing delay, the preset base station processing delay, the first time division duplex air interface waiting delay, the preset time division duplex air interface transmission delay, the first weighted value, the second weighted value, and the quantity of retransmissions, wherein the preset terminal processing delay $t_{ue}$, the preset base station processing delay $t_{bs}$, the first time division duplex air interface waiting delay $t_{tddwait}$, the preset time division duplex air interface transmission delay $t_{tddtran}$, the first weighted value $q_1$, the second weighted value $q_2$, the quantity $N_r$ of retransmissions, and the base station packet delay value T meet the following formula:

$$T=(t_{ue}+t_{bs}+t_{tddwait}+t_{tddtran}*q_1)*N_r*q_2.$$

10. The data processing device according to claim 9, wherein:

the determining a first transport block set value based on the first cell channel bandwidth, the cell subcarrier spacing, the quantity of concurrent service links, the MCS number, and the quantity of space division layers comprises:

determining, based on a second preset mapping table, spectrum efficiency corresponding to the MCS number;

determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers;

the determining a first weighted value based on a result of comparison between the amount of to-be-scheduled data and the first transport block set value comprises:

when the amount of to-be-scheduled data is greater than the first transport block set value and the amount of to-be-scheduled data can be exactly divided by the first transport block set value, determining that the first weighted value is equal to a quotient obtained after the amount of to-be-scheduled data is divided by the first transport block set value;

when the amount of to-be-scheduled data is greater than the first transport block set value and the amount of to-be-scheduled data cannot be exactly divided by the first transport block set value, determining that the first weighted value is equal to 1 plus a quotient obtained after the amount of to-be-scheduled data is divided by the first transport block set value; or when the amount of to-be-scheduled data is less than or equal to the first transport block set value, determining that the first weighted value is equal to 1; and the determining a second weighted value based on the scheduling feature identifier comprises:

when the scheduling feature identifier is a normal scheduling feature identifier, determining that the second weighted value is 3; or when the scheduling feature identifier is a pre-scheduling feature identifier, determining that the second weighted value is 1.

11. The data processing device according to claim 8, wherein the adjusting the translation parameter comprises at least one of:

adding 1 to the MCS number;

subtracting 1 from the quantity of retransmissions; or when the scheduling feature identifier is a normal scheduling feature identifier, adjusting the normal scheduling feature identifier to a pre-scheduling feature identifier.

12. The data processing device according to claim 8, wherein before the adjusting the translation parameter, the operations further comprise:

determining, based on a fourth preset mapping table, a target reliability value corresponding to the industry identifier and the service identifier;

determining a base station reliability value based on the target reliability value, a preset core network reliability value, and a preset terminal reliability value, wherein the target reliability value $k_0$, the preset core network reliability value $k_1$, the base station reliability value $k_2$, and the preset terminal reliability value $k_3$ meet a first formula:

$$k_0 \leq k_1 * k_2 * k_3; \text{ and}$$

determining a quantity of retransmissions threshold based on the base station reliability value and a preset single-transmission reliability value, wherein the base station reliability value $k_2$, the preset single-transmission reliability value $k'$, and the quantity of retransmissions threshold $N_r$ meet a second formula:

$$k_2 \leq 1 - \prod_{i=1}^{N'_r}(1-k');$$

and wherein the adjusting the translation parameter comprises at least one of:

when the quantity of retransmissions in the translation parameter is greater than the quantity of retransmissions threshold, at least one of adding 1 to the MCS number, and/or subtracting 1 from the quantity of retransmissions, or when the scheduling feature identifier is a normal scheduling feature identifier, adjusting the normal scheduling feature identifier to a pre-scheduling feature identifier; or when the quantity of retransmissions in the translation parameter is less than or equal to the quantity of retransmissions threshold, adjusting the quantity of retransmissions to be greater than the quantity of retransmissions threshold, and at least one of adding 1 to the MCS number, or when the scheduling feature identifier is a normal scheduling feature identifier, adjusting the normal scheduling feature identifier to a pre-scheduling feature identifier.

13. The data processing device according to claim 8, wherein;

the interface information further comprises a quantity of concurrent service links; and after the obtaining a translation parameter and before the calculating a base station packet delay value based on a preset terminal processing delay, a preset base station processing delay, a first time division duplex air interface waiting delay, a preset time division duplex air interface transmission delay, and the translation parameter, method operations further comprise:

determining, based on a fifth mapping table, a target rate corresponding to the industry identifier and the service identifier;

obtaining base station configuration information, wherein the base station configuration information comprises first cell channel bandwidth, cell subcarrier spacing, and a quantity of space division layers;

determining a base station rate based on the first cell channel bandwidth, the cell subcarrier spacing, the quantity of concurrent service links, the MCS number, and the quantity of space division layers; and when the base station rate is greater than or equal to the target rate, triggering execution of the step of calculating a base station packet delay value based on a preset terminal processing delay, a preset base station processing delay, a first time division duplex air interface waiting delay, a preset time division duplex air interface transmission delay, and the translation parameter; or when the base station rate is less than the target rate, adding 1 to the MCS number, using a sum of the MCS number and 1 as the MCS number, and triggering execution of the step of determining a base station rate based on the first cell channel bandwidth, the cell subcarrier spacing, the quantity of concurrent service links, the MCS number, and the quantity of space division layers.

14. The data processing device according to claim 13, wherein the determining a base station rate based on the first cell channel bandwidth, the cell subcarrier spacing, the quantity of concurrent service links, the MCS number, and the quantity of space division layers comprises:

determining a scheduling period based on the cell subcarrier spacing;

determining spectrum efficiency corresponding to the MCS number;

determining a quantity of available resource blocks corresponding to the first cell channel bandwidth and the cell subcarrier spacing;

determining a first transport block set value based on the spectrum efficiency, the quantity of available resource blocks, the quantity of concurrent service links, and the quantity of space division layers; and dividing a product of the first transport block set value and a preset reliability value by the scheduling period to obtain the base station rate.

15. A data processing device, comprising:

at least one processor; and a memory coupled to the at least one processor, the memory comprising instructions that, when executed by the at least one processor, cause the data processing device to perform operations comprising:

receiving a target packet delay value sent by a data processing apparatus;

obtaining a translation parameter, wherein the translation parameter comprises at least one of a scheduling feature identifier, a quantity of retransmissions, and a modulation and coding scheme (MCS) number;

calculating a base station packet delay value based on a preset terminal processing delay, a preset base station processing delay, a first time division duplex air interface waiting delay, a preset time division duplex air interface transmission delay, and the translation parameter; and when the base station packet delay value is greater than the target packet delay value, adjusting the translation parameter, using the adjusted translation parameter as the translation parameter, and triggering execution of the step of calculating a base station packet delay based on a preset terminal processing delay, a preset base station processing delay, a first time division duplex air interface waiting delay, a preset time division duplex air interface transmission delay, and the translation parameter; or when the base station packet delay value is less than or equal to the target packet delay value, scheduling service data based on a translation parameter corresponding to the base station packet delay value, wherein the service data corresponds to an industry identifier and a service identifier.

16. The data processing device according to claim 15, wherein the operations further comprise:

receiving a quantity of concurrent service links, a service data packet size, and a service data packet interval that are sent by the data processing apparatus; and obtaining a base station configuration parameter, wherein the base station configuration parameter comprises first cell channel bandwidth, a cell subcarrier spacing, and a quantity of space division layers; and wherein the calculating a base station packet delay value based on a preset terminal processing delay, a preset base station processing delay, a first time division duplex air interface waiting delay, a preset time division duplex air interface transmission delay, and the translation parameter comprises:

dividing a product of the service data packet size and a time division duplex frame period by the service data packet interval to obtain an amount of to-be-scheduled data in each time division duplex frame period;

when the translation parameter comprises the MCS number, the scheduling feature identifier, and the quantity of retransmissions, determining a first transport block set value based on the first cell channel bandwidth, the cell subcarrier spacing, the quantity of concurrent service links, the MCS number, and the quantity of space division layers;

determining a first weighted value based on a result of comparison between the amount of to-be-scheduled data and the first transport block set value;

determining a second weighted value based on the scheduling feature identifier; and determining the base station packet delay value based on the preset terminal processing delay, the preset base station processing delay, the first time division duplex air interface waiting delay, the preset time division duplex air interface transmission delay, the first weighted value, the second weighted value, and the quantity of retransmissions, wherein the base station packet delay value T determined based on the preset terminal processing delay $t_{ue}$, the preset base station processing delay $t_{bs}$, the first time division duplex air interface waiting delay $t_{tddwait}$, the preset time division duplex air interface transmission delay $t_{tddtran}$, the first weighted value $q_1$, the second weighted value $q_2$, and the quantity $N_r$ of retransmissions meets the following formula:

$$T=(t_{ue}+t_{bs}+t_{tddwait}+t_{tddtran}*q_1)*N_r*q_2.$$

17. The data processing device according to claim 16, wherein:

the determining a first transport block set value based on the first cell channel bandwidth, the cell subcarrier spacing, the quantity of concurrent service links, the MCS number, and the quantity of space division layers comprises:

determining, based on a second preset mapping table, spectrum efficiency corresponding to the MCS number;

determining, based on a third preset mapping table, a quantity of available resource blocks corresponding to the first cell channel bandwidth and the cell subcarrier spacing; and determining the first transport block set value based on the spectrum efficiency, the quantity of available resource blocks, the quantity of concurrent service links, and the quantity of space division layers;

the determining a first weighted value based on a result of comparison between the amount of to-be-scheduled data and the first transport block set value comprises:

when the amount of to-be-scheduled data is greater than the first transport block set value and the amount of to-be-scheduled data can be exactly divided by the first transport block set value, determining that the first weighted value is a quotient obtained after the amount of to-be-scheduled data is divided by the first transport block set value;

when the amount of to-be-scheduled data is greater than the first transport block set value and the amount of to-be-scheduled data cannot be exactly divided by the first transport block set value, determining that the first weighted value is 1 plus a quotient obtained after the amount of to-be-scheduled data is divided by the first transport block set value; or when the amount of to-be-scheduled data is less than or equal to the first transport block set value, determining that the first weighted value is 1; and the determining a second weighted value based on the scheduling feature identifier comprises:

when the scheduling feature identifier is a normal scheduling feature identifier, determining that the second weighted value is 3; or when the scheduling feature identifier is a pre-scheduling feature identifier, determining that the second weighted value is 1.

18. The data processing device according to claim 15, wherein the adjusting the translation parameter comprises at least one of:

adding 1 to the MCS number;

subtracting 1 from the quantity of retransmissions; or when the scheduling feature identifier is a normal scheduling feature identifier, adjusting the normal scheduling feature identifier to a pre-scheduling feature identifier.

19. The data processing device according to claim 15, wherein before the adjusting the translation parameter, the operations further comprise:

receiving a target reliability value sent by the data processing apparatus;

determining a base station reliability value based on the target reliability value, a preset core network reliability value, and a preset terminal reliability value, wherein the target reliability value $k_0$, the preset core network reliability value $k_1$, the base station reliability value $k_2$, and the preset terminal reliability value $k_3$ meet a first formula:

$k_0 \leq k_1 * k_2 * k_3$;

determining a quantity of retransmissions threshold based on the base station reliability value and a preset single-transmission reliability value, wherein the base station reliability value $k_2$, the preset single-transmission reliability value k', and the quantity of retransmissions threshold $N_r'$ meet a second formula:

$$k_2 \leq 1 - \prod_{i=1}^{N_r'}(1-k');$$

and
wherein the adjusting the translation parameter comprises at least one of:
when the quantity of retransmissions in the translation parameter is greater than the quantity of retransmissions threshold, at least one of adding 1 to the MCS number, or subtracting 1 from the quantity of retransmissions, or when the scheduling feature identifier is a normal scheduling feature identifier, adjusting the normal scheduling feature identifier to a pre-scheduling feature identifier; or
when the quantity of retransmissions in the translation parameter is less than or equal to the quantity of retransmissions threshold, adjusting the quantity of retransmissions to be greater than the quantity of retransmissions threshold, and at least one of adding 1 to the MCS number, or when the scheduling feature identifier is a normal scheduling feature identifier, adjusting the normal scheduling feature identifier to a pre-scheduling feature identifier.

20. The data processing device according to claim 15, wherein the method operations further comprise:
after the obtaining a translation parameter and before the calculating a base station packet delay value based on a preset terminal processing delay, a preset base station processing delay, a first time division duplex air interface waiting delay, a preset time division duplex air interface transmission delay, and the translation parameter, receiving a quantity of concurrent service links and a target rate that are sent by the data processing apparatus;
obtaining base station configuration information, wherein the base station configuration information comprises first cell channel bandwidth, cell subcarrier spacing, and a quantity of space division layers;
determining a base station rate based on the first cell channel bandwidth, the cell subcarrier spacing, the quantity of concurrent service links, the MCS number, and the quantity of space division layers; and
when the base station rate is greater than or equal to the target rate, triggering execution of the step of calculating a base station packet delay value based on a preset terminal processing delay, a preset base station processing delay, a first time division duplex air interface waiting delay, a preset time division duplex air interface transmission delay, and the translation parameter; or
when the base station rate is less than the target rate, adding 1 to the MCS number, using a sum of the MCS number and 1 as the MCS number, and triggering execution of the step of determining a base station rate based on the first cell channel bandwidth, the cell subcarrier spacing, the quantity of concurrent service links, the MCS number, and the quantity of space division layers.

* * * * *

UNITED STATES PATENT AND TRADEMARK OFFICE
CERTIFICATE OF CORRECTION

| | | |
|---|---|---|
| PATENT NO. | : 12,063,542 B2 | Page 1 of 1 |
| APPLICATION NO. | : 17/831537 | |
| DATED | : August 13, 2024 | |
| INVENTOR(S) | : Xiaobin Jiang, Xiaoqiong Long and Ligang Ren | |

It is certified that error appears in the above-identified patent and that said Letters Patent is hereby corrected as shown below:

On the Title Page

In Column 2 (Item (56) Other Publications), In Line 1, Delete "1 Office" and insert -- Office --.

In the Claims

In Column 67, In Line 43, In Claim 12, delete "$N_r$" and insert -- $N_r'$ --.

In Column 67, In Line 56, In Claim 12, delete "and/or" and insert -- or --.

In Column 68, In Line 4, In Claim 13, delete "wherein;" and insert -- wherein: --.

In Column 68, In Line 13, In Claim 13, delete "method operations" and insert -- the operations --.

In Column 72, In Line 4, In Claim 20, delete "method operations" and insert -- operations --.

Signed and Sealed this
Nineteenth Day of November, 2024

Katherine Kelly Vidal
*Director of the United States Patent and Trademark Office*